US012663549B2

(12) United States Patent
Kamakura et al.

(10) Patent No.: US 12,663,549 B2
(45) Date of Patent: Jun. 23, 2026

(54) RADIATION DETECTOR AND RADIATION DETECTOR ARRAY

(71) Applicant: HAMAMATSU PHOTONICS K.K., Hamamatsu (JP)

(72) Inventors: Shogo Kamakura, Hamamatsu (JP); Hayato Nishimiya, Hamamatsu (JP); Shintaro Kamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 156 days.

(21) Appl. No.: 18/693,237

(22) PCT Filed: Aug. 30, 2022

(86) PCT No.: PCT/JP2022/032648
§ 371 (c)(1),
(2) Date: Mar. 19, 2024

(87) PCT Pub. No.: WO2023/047900
PCT Pub. Date: Mar. 30, 2023

(65) Prior Publication Data
US 2025/0123412 A1 Apr. 17, 2025

(30) Foreign Application Priority Data
Sep. 22, 2021 (JP) ................................. 2021-154553

(51) Int. Cl.
*G01T 1/20* (2006.01)
(52) U.S. Cl.
CPC ................................ *G01T 1/20182* (2020.05)
(58) Field of Classification Search
CPC . G01T 1/20182; G01T 1/1642; G01T 1/2018; H10F 30/225; H10F 77/959
See application file for complete search history.

(56) References Cited

U.S. PATENT DOCUMENTS

2007/0007461 A1* 1/2007 Yanada ............... G01T 1/20183
250/370.11
2010/0090115 A1* 4/2010 Lerch ..................... G01T 1/161
250/362
(Continued)

FOREIGN PATENT DOCUMENTS

CN 103592671 A 2/2014
DE 102008063309 A1 7/2010
(Continued)

OTHER PUBLICATIONS

International Preliminary Report on Patentability mailed Apr. 4, 2024 for PCT/JP2022/032648.
(Continued)

*Primary Examiner* — Uzma Alam
*Assistant Examiner* — Mamadou Faye
(74) *Attorney, Agent, or Firm* — Faegre Drinker Biddle & Reath LLP

(57) ABSTRACT

A radiation detector includes: a scintillator including a pair of end surfaces opposing each other in a first direction and one side surface coupling the end surfaces; a semiconductor photodetector including a semiconductor substrate; and a wiring member electrically connected to the semiconductor photodetector. A length of the scintillator in the first direction is longer than that of the scintillator in a second direction orthogonal to the one side surface. A length of the one side surface in the first direction is longer than a width of the one side surface in a third direction. The semiconductor substrate includes a plurality of photodetection regions disposed in a first portion and first electrodes and a second electrode disposed in a second portion. Each of the photodetection regions includes a plurality of avalanche photodiodes arranged to operate in Geiger mode and a plurality of quenching resistors.

19 Claims, 31 Drawing Sheets

(56)     References Cited

U.S. PATENT DOCUMENTS

| | | | | |
|---|---|---|---|---|
| 2010/0171038 A1* | 7/2010 | Wirth | ................. | G01T 1/20182 |
| | | | | 438/66 |
| 2011/0116595 A1* | 5/2011 | Carmi | ....................... | G01T 1/18 |
| | | | | 378/19 |
| 2013/0009067 A1 | 1/2013 | Schmand et al. | | |
| 2013/0099130 A1* | 4/2013 | Nakahashi | ........... | A61B 6/4283 |
| | | | | 250/394 |
| 2017/0168169 A1* | 6/2017 | Liu | ....................... | G01T 1/2985 |
| 2021/0003721 A1 | 1/2021 | Loi et al. | | |

FOREIGN PATENT DOCUMENTS

| | | |
|---|---|---|
| DE | 102009004119 A1 | 7/2010 |
| JP | 2004-340968 A | 12/2004 |
| JP | 2006-343247 A | 12/2006 |
| JP | 2011-510270 A | 3/2011 |
| JP | 2014-128584 A | 7/2014 |
| JP | 2015-083956 A | 4/2015 |
| JP | 2018-528387 A | 9/2018 |
| RU | 2420763 C2 | 6/2011 |
| WO | WO-2009/090570 A2 | 7/2009 |
| WO | WO-2017/097086 A1 | 6/2017 |

OTHER PUBLICATIONS

Extended European Search Report issued on Jun. 3, 2025 in corresponding European patent application 22872656.8 (9 pages).

* cited by examiner

*Fig.24*

RADIATION DETECTOR AND RADIATION DETECTOR ARRAY

TECHNICAL FIELD

The present invention relates to a radiation detector and a radiation detector array.

BACKGROUND ART

Known radiation detectors include a scintillator having a hexahedron shape and a semiconductor photodetector including a semiconductor substrate disposed on the scintillator (for example, refer to Patent Literature 1). The scintillator generates a scintillation light in response to entry of radiation, and the semiconductor photodetector detects the generated scintillation light.

CITATION LIST

Patent Literature

Patent Literature 1: Japanese Unexamined Patent Publication No. 2015-83956

SUMMARY OF INVENTION

Technical Problem

Objects of first and second aspects of the present invention are to provide a radiation detector having high time resolution and high energy resolution. Objects of third and fourth aspects of the present invention are to provide a radiation detector array including radiation detectors having high time resolution and high energy resolution.

Solution to Problem

The present inventors have intensively studied radiation detectors having high time resolution and high energy resolution. As a result, the present inventors have newly obtained the following knowledge and conceived the present invention. Patent Literature 1 does not disclose a radiation detector having high time resolution and high energy resolution.

When radiation enters a scintillator that includes a pair of end surfaces opposing each other in a first direction and is longer in the first direction, from one of the pair of end surfaces, the scintillator reliably absorbs the radiation in a high energy range and generates a scintillation light. In a configuration in which a semiconductor photodetector is disposed on another end surface of the pair of end surfaces, the scintillator tends to absorb the radiation in the high energy range. However, this configuration tends not to obtain high time resolution.

The semiconductor photodetector detects the scintillation light emitted from another end surface. Scintillation lights generated at a position in the scintillator include, for example, the scintillation light directly incident on the other end surface and the scintillation light directly incident on the one end surface. The scintillation light directly incident on the one end surface is, for example, reflected by the one end surface and then incident on the other end surface. These two scintillation lights are emitted from the other end surface and detected by the semiconductor photodetector. When the scintillation light directly incident on the other end surface and the scintillation light directly incident on the one end surface are simultaneously generated, timings when the scintillation lights are incident on the other end surface are different. Therefore, the semiconductor photodetector detects the two scintillation lights with a large time difference. The semiconductor photodetector tends not to detect the scintillation light with high time resolution.

Therefore, in a radiation detector, the semiconductor photodetector is desirably disposed at a position where the individual scintillation lights simultaneously generated at the same position can be detected without a large time difference. The semiconductor photodetector disposed at the above-described position detects radiation entry in the scintillator with high time resolution.

A magnitude of energy of the radiation has a correlation with a distance that the radiation can reach from the one end surface of the scintillator in the first direction. The radiation having high energy generates scintillator light at a position further away from the one end surface in the first direction as compared with the radiation having low energy. In a configuration in which the semiconductor photodetector includes one photodetection region for detecting a scintillation light, a distance from the one end surface of the scintillator to the position where the scintillator light is generated tends not to be measured. In a configuration including the one photodetection region, the incident radiation with high energy resolution tends not to be detected.

Therefore, the semiconductor photodetector includes a plurality of photodetection regions are desirably disposed in the first direction. Since the semiconductor photodetector in which the plurality of photodetection regions are disposed detects generated scintillation lights by corresponding photodetection regions included in the plurality of photodetection regions, the semiconductor photodetector detects radiation entry in the scintillator with high energy resolution.

A radiation detector according to a first aspect includes: a scintillator including a pair of end surfaces opposing each other in a first direction and one side surface coupling the pair of end surfaces; a semiconductor photodetector including a semiconductor substrate disposed to oppose the one side surface; and a wiring member electrically connected to the semiconductor photodetector. A length of the scintillator in the first direction is longer than a length of the scintillator in a second direction orthogonal to the one side surface. A length of the one side surface in the first direction is longer than a width of the one side surface in a third direction orthogonal to the first direction and the second direction. The semiconductor substrate includes a first portion that is covered with the one side surface and in which a plurality of photodetection regions are disposed, and a second portion that is exposed from the one side surface. The first portion and the second portion are disposed in the first direction. The semiconductor photodetector includes the plurality of photodetection regions disposed in the first portion, a plurality of first electrodes disposed in the second portion, and a second electrode disposed in the second portion. Each of the plurality of photodetection regions includes at least one avalanche photodiode disposed in the first direction and arranged to operate in Geiger mode and at least one quenching resistor electrically connected in series with one of an anode or a cathode of a corresponding avalanche photodiode of the at least one avalanche photodiode. The at least one quenching resistor included in a corresponding photodetection region of the plurality of photodetection regions is electrically connected to the plurality of first electrodes. The second electrode is electrically connected to another of the anode or the cathode of each of the avalanche photodiodes. The wiring member includes a plurality of conductors electrically connected to a corresponding first electrode of the plurality of first electrodes and a conductor connected to the second electrode.

According to the first aspect, the radiation detector includes the scintillator that is longer in the first direction and the semiconductor photodetector disposed on the one side surface of the scintillator. The semiconductor photodetector detects a scintillation light directly incident on the one side surface on which the semiconductor photodetector is disposed. The semiconductor photodetector detects, for example, a scintillation light incident on the one side surface after being reflected by a surface opposing the one side surface on which the semiconductor photodetector is disposed. In the first aspect, the length of the scintillator in the second direction is smaller than the length of the scintillator in the first direction. Therefore, the semiconductor photodetector detects, with a small time difference, for example, a scintillation light directly incident on the one side surface and a scintillation light incident on the one side surface after being reflected by a surface opposing the one side surface. As a result, the first aspect achieves high time resolution. Hereinafter, the "surface opposing the one side surface" may be referred to as the "other surface".

The first aspect includes the semiconductor photodetector including a plurality of photodetection regions disposed in the first direction. For example, a distance between a scintillation light generation point and the one end surface of the scintillator in the first direction is obtained from a position on the photodetection region where the most scintillation lights are detected, of the plurality of photodetection regions. As a result, a magnitude of energy of radiation incident on the scintillator is accurately measured. Therefore, the first aspect achieves energy resolution.

In the first aspect, the pair of end surfaces may include one end surface inclined relative to the second direction.

In a configuration in which at least one of the end surfaces is inclined relative to the second direction, a scintillation light is more reliably incident on the one side surface opposing the semiconductor substrate. The number of times of reflection of the scintillation light by the end surface or the side surface is reduced, and reflection attenuation of the scintillation light is reduced. Therefore, this configuration more reliably increases an amount of light detected by the semiconductor photodetector.

In the first aspect, the pair of end surfaces may include one end surface extending in the second direction, and one end surface may have a triangular wave shape in a cross section.

In a configuration in which the one end surface extending in the second direction has a triangular wave shape in the cross section, a scintillation light is still more reliably incident on the one side surface opposing the semiconductor substrate. The number of times of reflection of the scintillation light by the end surface or the side surface is reduced, and reflection attenuation of the scintillation light is reduced. Therefore, this configuration still more reliably increases the amount of light detected by the semiconductor photodetector.

In the first aspect, the pair of end surfaces may include one end surface extending in the second direction, and the one end surface may include a rough surface.

In a configuration in which the one end surface extending in the second direction includes a rough surface, a scintillation light is still more reliably incident on the one side surface opposing the semiconductor substrate. The number of times of reflection of the scintillation light by the end surface or the side surface is reduced, and reflection attenuation of the scintillation light is reduced. Therefore, this configuration still more reliably increases the amount of light detected by the semiconductor photodetector.

In the first aspect, the scintillator may include another side surface having a triangular wave shape in a cross section, and the other side surface may couple the pair of end surfaces and be adjacent to the one side surface.

In a configuration in which another side surface couples the pair of end surfaces and is adjacent to the one side surface, a scintillation light is more reliably incident on the one side surface opposing the semiconductor substrate. Therefore, this configuration still more reliably increases the amount of light detected by the semiconductor photodetector.

In the first aspect, the scintillator may include another side surface that includes a rough surface, and the other side surface may couple the pair of end surfaces and be adjacent to the one side surface.

In a configuration in which another side surface couples the pair of end surfaces and is adjacent to the one side surface, a scintillation light is more reliably incident on the one side surface opposing the semiconductor substrate. Therefore, this configuration still more reliably increases the amount of light detected by the semiconductor photodetector.

In the first aspect, when viewed in the second direction, one region including outlines of the plurality of photodetection regions may have a shape corresponding to an outline shape of a one side surface.

In a configuration in which the one region including the outlines of the plurality of photodetection regions has a shape corresponding to the outline shape of the one side surface, the photodetection region tends not to be disposed in a portion of the semiconductor substrate where no scintillation lights can be detected. Therefore, this configuration suppresses increase in dark count and capacitance in the photodetection region. As a result, this configuration reliably improves time resolution and energy resolution of the radiation detector.

In the first aspect, the scintillator may include a plurality of portions being independent each other and corresponding to a plurality of photodetection regions. Each of the plurality of portions may include a pair of opposing surfaces opposing each other in the first direction and a coupling surface coupling the pair of opposing surfaces and opposing the semiconductor substrate.

In a configuration in which the scintillator includes the plurality of portions being independent each other and corresponding to a plurality of photodetection region, a scintillation light generated in each portion is confined in the corresponding portion. The photodetection region corresponding to the portion reliably detects a scintillation light generated in the portion. Therefore, this configuration reliably achieves high energy resolution.

In the first aspect, the plurality of portions may be joined to each other.

A configuration in which the plurality of portions are joined to each other increases physical strength of the scintillator. Therefore, this configuration more reliably achieves high energy resolution.

The first aspect may include a light reflecting member. The light reflecting member may be disposed between the plurality of portions.

In a configuration in which the light reflecting member is disposed between the plurality of portions, a scintillation light generated in each portion is reliably confined in the portion. The photodetection region corresponding to the portion more reliably detects a scintillation light generated in the portion. Therefore, this configuration still more reliably achieves high energy resolution.

In the first aspect, the pair of opposing surfaces may include one opposing surface inclined relative to the second direction.

In a configuration in which the pair of opposing surfaces includes the one opposing surface inclined relative to the second direction, a scintillation light is more reliably incident on the coupling surface opposing the semiconductor substrate. The number of times of reflection of the scintillation light on the opposing surfaces or the coupling surface is reduced, and reflection attenuation of the scintillation light is reduced.

Therefore, this configuration more reliably increases an amount of light detected by the semiconductor photodetector.

In the first aspect, the pair of opposing surfaces may include one opposing surface extending in the second direction. The one opposing surface may have a triangular wave shape in a cross section.

In a configuration in which the one opposing surface extending in the second direction has a triangular wave shape in a cross section, a scintillation light is more reliably incident on the coupling surface opposing the semiconductor substrate. The number of times of reflection of the scintillation light on the opposing surfaces or the coupling surface is reduced, and reflection attenuation of the scintillation light is reduced. Therefore, this configuration still more reliably increases the amount of light detected by the semiconductor photodetector.

In the first aspect, the pair of opposing surfaces may include one opposing surface extending in the second direction. The one opposing surface may include a rough surface.

In a configuration in which the opposing surface extending in the second direction includes a rough surface, a scintillation light is more reliably incident on the coupling surface opposing the semiconductor substrate. The number of times of reflection of the scintillation light on the opposing surfaces or the coupling surface is reduced, and reflection attenuation of the scintillation light is reduced. Therefore, the amount of light detected by the semiconductor photodetector is still more reliably increased.

In the first aspect, the scintillator may include another coupling surface that couples the pair of opposing surfaces and is adjacent to the coupling surface. The other coupling surface may have a triangular wave shape in a cross section.

In a configuration in which the other coupling surface has a triangular wave shape in a cross section, a scintillation light is still more reliably incident on the coupling surface opposing the semiconductor substrate. Therefore, this configuration still more reliably increases the amount of light detected by the semiconductor photodetector.

In the first aspect, the scintillator may include another coupling surface that couples the pair of opposing surfaces and is adjacent to the coupling surface. The other coupling surface may include a rough surface.

In a configuration in which the other coupling surface includes a rough surface, a scintillation light is more reliably incident on the coupling surface opposing the semiconductor substrate. Therefore, this configuration still more reliably increases the amount of light detected by the semiconductor photodetector.

In the first aspect, when viewed in the second direction, each of the plurality of photodetection regions has an outline shape of the coupling surface, of a corresponding portion of the plurality of portions, opposing the semiconductor substrate.

In a configuration in which the photodetection region has an outline shape of the coupling surface, of a corresponding portion of the plurality of portions, opposing the semiconductor substrate, the photodetection region tends not to be disposed at a position on the semiconductor substrate where no scintillation lights can be detected.

Therefore, this configuration suppresses increase in dark count and capacitance in the photodetection region. As a result, this configuration reliably improves time resolution and energy resolution of the radiation detector.

In the first aspect, the scintillator may have a rectangular shape or a triangular shape when viewed in the first direction.

In a configuration in which the scintillator has a rectangular shape or a triangular shape, a scintillation light is reliably incident on a surface opposing the semiconductor substrate. Therefore, this configuration more reliably increases the amount of light detected by the semiconductor photodetector.

In the first aspect, the plurality of photodetection regions may include a first photodetection region and a second photodetection region closer to the second portion than the first photodetection region. A width of a conductive wire electrically connecting one of the first electrodes corresponding to the first photodetection region and the first photodetection region may be larger than a width of a conductive wire electrically connecting one of the first electrodes corresponding to the second photodetection region and the second photodetection region.

In a configuration in which the width of the conductive wire electrically connecting the first electrode corresponding to the first photodetection region and the first photodetection region is larger than the width of the conductive wire electrically connecting the first electrode corresponding to the second photodetection region and the second photodetection region, an electrical resistance difference is reduced. A length of a conductive wire electrically connecting one of the first electrodes corresponding to the first photodetection region and the first photodetection region is longer than a length of a conductive wire electrically connecting one of the first electrodes corresponding to the second photodetection region and the second photodetection region. As a length of the conductive wire increases, the electrical resistance of the conductive wire increases. As the width of the conductive wire increases, the electrical resistance of the conductive wire decreases. Therefore, in a configuration in which a width of a long conductive wire is larger than a width of a short conductive wire, the electrical resistance difference between the electrical resistance of the long conductive wire and the electrical resistance of the short conductive wire is reduced. Therefore, this configuration reliably improves the time resolution and the energy resolution of the radiation detector.

The first aspect may further include: a base; and a first wire and a second wire. The base may be disposed such that the semiconductor substrate is positioned between the base and the scintillator and may include a third portion covered with the semiconductor substrate and a fourth portion exposed from the semiconductor substrate. The third portion and the fourth portion may be disposed in the first direction. The fourth portion may include a first terminal and a second terminal. The first terminal and the second terminal and the scintillator may be disposed in front of the same surface of the base. The first terminal may be electrically connected to the first electrode by the first wire, and the second terminal may be electrically connected to the second electrode by the second wire.

A configuration including a base increases mechanical strength of the radiation detector. Therefore, this configuration reliably achieves a radiation detector having high mechanical strength.

The first aspect may further include a resin that covers the first wire and the second wire.

In a configuration in which a resin is provided to cover the first wire and the second wire, the resin protects the first and second wires. Therefore, the first and second wires tend not to be damaged. As a result, this configuration decreases deterioration of electrical connection between the first and second terminals and the first and second electrodes.

The first aspect may further include a light reflector. The light reflector may be disposed such that the semiconductor substrate is positioned between the light reflector and the scintillator.

For example, in a configuration in which a plurality of radiation detectors according to the first aspect are provided, the following effects can be achieved when one radiation detector includes the light reflector. That is, the configuration in which the light reflector of the one radiation detector and the other surface of the other radiation detector oppose each other in the second direction improves reflectance of the scintillation lights on the other surface of another radiation detector even when the light reflector is not disposed on the other surface of the other radiation detector. Therefore, this configuration tends to achieve high time resolution when the plurality of radiation detectors are provided.

In the first aspect, the light reflector may be disposed such that the semiconductor substrate and base are positioned between the light reflector and the scintillator.

In the first aspect, the wiring member may be disposed on the same side as the scintillator relative to the semiconductor substrate.

In a configuration in which the wiring member is disposed on the same side as the scintillator relative to the semiconductor substrate, a substrate for connecting the wiring member to the first and second electrodes through, for example, die bonding does not need to be provided. Therefore, this configuration more reliably simplifies the configuration of the radiation detector.

In the first aspect, the light reflector may have a thickness of 0.05 to 100 µm.

A configuration in which the light reflector has the above-described thickness reliably improves reflectance of the scintillation lights on the other surface. Therefore, this configuration reliably simplifies the configuration of the radiation detector.

In the first aspect, the wiring member and the semiconductor substrate may have flexibility. The flexibility of the wiring member may be higher than the flexibility of the semiconductor substrate.

In a configuration in which the flexibility of the wiring member is higher than the flexibility of the semiconductor substrate, vibration of the wiring member tends not to be transmitted to the semiconductor substrate. A force from the wiring member tends not to be applied to the semiconductor substrate, and the semiconductor substrate tends not to be physically damaged. Therefore, this configuration reliably improves the mechanical strength of the radiation detector.

A radiation detector according to a second aspect includes: a scintillator having a rectangular shape when viewed in a first direction and including a pair of end surfaces opposing each other in the first direction, a first side surface coupling the pair of end surfaces, and a second side surface coupling the pair of end surfaces and being adjacent to the side surface; a first semiconductor photodetector including a first semiconductor substrate disposed to oppose the first side surface; a second semiconductor photodetector including a second semiconductor substrate disposed to oppose the second side surface; a first wiring member electrically connected to the first semiconductor photodetector; and a second wiring member electrically connected to the second semiconductor photodetector. The scintillator has a rectangular shape when viewed in the first direction. A length of the scintillator in the first direction is longer than both of a length of the scintillator in a second direction orthogonal to the first side surface and a length of the scintillator in a third direction orthogonal to the second side surface, and a length of the first side surface in the first direction is longer than a width of the first side surface in the third direction. A length of the second side surface in the first direction is longer than a width of the second side surface in the second direction. Each of the first semiconductor substrate and the second semiconductor substrate includes a first portion covered with any one of corresponding first side surface and second side surface, and a second portion exposed from the any one of the corresponding first side surface and second side surface. The first portion and the second portion are disposed in the first direction. Each of the first semiconductor photodetector and the second semiconductor photodetector includes a plurality of photodetection regions disposed in the first portion, a plurality of first electrodes disposed in the second portion, and a second electrode disposed in the second portion. Each of the plurality of photodetection regions includes at least one avalanche photodiode disposed in the first direction and arranged to operate in Geiger mode and at least one quenching resistor electrically connected in series with one of an anode or a cathode of a corresponding avalanche photodiode of the at least one avalanche photodiode. The at least one quenching resistor included in the corresponding photodetection region of the plurality of photodetection regions is electrically connected to the plurality of first electrodes. The second electrode is electrically connected to the other of the anode or the cathode of each of the avalanche photodiodes. The first wiring member and the second wiring member include a plurality of conductors electrically connected to a corresponding first electrode of the plurality of first electrodes and a conductor connected to the second electrode.

In the second aspect, a scintillator that is longer in a first direction is provided, and first and second semiconductor photodetectors disposed on first and second side surfaces of the scintillator, respectively, are provided. The first and second semiconductor photodetectors detect a scintillation light directly incident on the first and second side surfaces on which the first and second semiconductor photodetectors are disposed, respectively. The first and second semiconductor photodetectors detect, for example, scintillation lights incident on the first and second side surfaces after being reflected by surfaces opposing the first and second side surfaces. In the second aspect, a length of the scintillator in the second direction is smaller than a length of the scintillator in the first direction. Therefore, the first and second semiconductor photodetectors detect, with a small time difference, scintillation lights directly incident on the first and second side surfaces and scintillation lights incident on the first and second side surfaces after being reflected by the surfaces opposing the first and second side surfaces, respectively. As a result, the second aspect achieves high time resolution. Hereinafter, the "surface opposing the first side surface" may be referred to as a "first other surface". The "surface opposing the second side surface" may be referred to as a "second other surface".

When an incidence angle of a scintillation light on the first side surface exceeds a critical angle on the first side surface, the scintillation light may not be detected by the first semiconductor photodetector disposed on the first side surface. In the second aspect, the scintillation light can be detected by the second semiconductor photodetector disposed on the second side surface adjacent to the first side surface. Therefore, the second aspect achieves a radiation detector having high time resolution and reliably increases the amount of scintillation lights detected by the first and second semiconductor photodetectors.

In the second aspect, the radiation detector includes the semiconductor photodetector including a plurality of photodetection regions disposed in the first direction. For example, a distance between a scintillation light generation point and the one end surface of the scintillator in the first direction is obtained from a position on the photodetection region where the most scintillation lights are detected, of the plurality of photodetection regions. As a result, a magnitude of energy of radiation incident on the scintillator is accurately measured. Therefore, the second aspect achieves high energy resolution.

In the second aspect, the pair of end surfaces may include one end surface inclined relative to the second direction.

In a configuration in which the pair of end surfaces includes the one end surface inclined relative to the second direction, scintillation lights are still more reliably incident on the first and second side surfaces opposing the first and second semiconductor substrates. The number of times of reflection of the scintillation light by the end surface or the side surface is reduced, and reflection attenuation of the scintillation light is reduced. Therefore, this configuration more reliably increases the amount of light detected by the first and second semiconductor photodetectors.

In the second aspect, the pair of end surfaces may include one end surface extending in the second direction, and the one end surface may have a triangular wave shape in a cross section.

In a configuration in which the one end surface extending in the second direction has a triangular wave shape in a cross section, scintillation lights are still more reliably incident on the first and second side surfaces opposing the first and second semiconductor substrates. The number of times of reflection of the scintillation light by the end surface or the side surface is reduced, and reflection attenuation of the scintillation light is reduced. Therefore, this configuration still more reliably increases the amount of light detected by the first and second semiconductor photodetectors.

In the second aspect, the pair of end surfaces may include one end surface extending in the second direction, and the one end surface may include a rough surface.

In a configuration in which the one end surface extending in the second direction includes a rough surface, scintillation lights are still more reliably incident on the first and second side surfaces opposing the first and second semiconductor substrates. The number of times of reflection of the scintillation light by the end surface or the side surface is reduced, and reflection attenuation of the scintillation light is reduced. Therefore, this configuration still more reliably increases the amount of light detected by the first and second semiconductor photodetectors.

In the second aspect, when viewed in the second direction, one region including outlines of the plurality of photodetection regions may have a shape corresponding to an outline shape of the first side surface. When viewed in the third direction, one region including outlines of the plurality of photodetection regions may have a shape corresponding to an outline shape of the second side surface.

In a configuration in which the one region including the outlines of the plurality of photodetection regions has the shape corresponding to the outline shape of the first and second side surfaces, the photodetection regions tend not to be disposed at positions on the first and second semiconductor substrates where no scintillation lights can be detected. Therefore, increase in dark count and capacitance in the photodetection regions is reduced. As a result, this configuration reliably improves the time resolution and the energy resolution of the first and second semiconductor photodetectors.

In the second aspect, the scintillator may include a plurality of portions being independent each other and corresponding to corresponding to the plurality of photodetection regions. Each of the plurality of portions may include a pair of opposing surfaces opposing each other in the first direction, a first coupling surface that couples the pair of opposing surfaces and opposes the first semiconductor substrate, and a second coupling surface that couples the pair of opposing surfaces, opposes the second semiconductor substrate, and is adjacent to the first coupling surface.

In a configuration in which the scintillator includes the plurality of portions being independent each other and corresponding to the plurality of photodetection regions, a scintillation light generated in each portion is confined in the corresponding portion. The photodetection region corresponding to the portion reliably detects a scintillation light generated in the portion. Therefore, this configuration reliably achieves high energy resolution.

In the second aspect, the plurality of portions may be joined to each other.

A configuration in which the plurality of portions are joined to each other increases physical strength of the scintillator. Therefore, this configuration more reliably achieves high energy resolution.

The second aspect may include a light reflecting member. The light reflecting member may be disposed between the plurality of portions.

In a configuration in which the light reflecting member is disposed between the plurality of portions, a scintillation light generated in each portion is reliably confined in the portion. The photodetection region corresponding to the portion more reliably detects a scintillation light generated in the portion. Therefore, this configuration still more reliably achieves high energy resolution.

In the second aspect, the pair of opposing surfaces may include one opposing surface inclined relative to the second direction.

In a configuration in which the pair of opposing surfaces includes the one opposing surface inclined relative to the second direction, scintillation lights are more reliably incident on the coupling surfaces opposing the first and second semiconductor substrates. The number of times of reflection of the scintillation light on the opposing surfaces or the coupling surface is reduced, and reflection attenuation of the scintillation light is reduced. Therefore, the amount of light detected by the first and second semiconductor photodetectors is more reliably increased.

In the second aspect, the pair of opposing surfaces may include one opposing surface extending in the second direction. The one opposing surface may have a triangular wave shape in a cross section.

In a configuration in which the one opposing surface extending in the second direction has a triangular wave shape in a cross section, scintillation lights are more reliably incident on the coupling surfaces opposing the first and second semiconductor substrates. The number of times of reflection of the scintillation light on the opposing surfaces or the coupling surface is reduced, and reflection attenuation of the scintillation light is reduced. Therefore, this configuration still more reliably increases the amount of light detected by the first and second semiconductor photodetectors.

In the second aspect, the pair of opposing surfaces may include one opposing surface extending in the second direction. The one opposing surface may include a rough surface.

In a configuration in which the one opposing surface extending in the second direction includes a rough surface, scintillation lights are more reliably incident on the coupling surfaces opposing the first and second semiconductor substrates. The number of times of reflection of the scintillation light on the opposing surfaces or the coupling surface is reduced, and reflection attenuation of the scintillation light is reduced. Therefore, this configuration still more reliably increases the amount of light detected by the first and second semiconductor photodetectors.

In the second aspect, when viewed in the second direction, each of the plurality of photodetection regions may have an outline shape of the first coupling surface, of a corresponding portion of the plurality of portions, opposing the first semiconductor substrate. When viewed in the third direction, each of the plurality of photodetection regions may have an outline shape of the second coupling surface, of a corresponding portion of the plurality of portions, opposing the second semiconductor substrate.

In a configuration in which each of the plurality of photodetection regions has the outline shape corresponding to the outline shapes of the first and second coupling surfaces opposing the first and second semiconductor substrates of the corresponding portion of the plurality of portions, the individual photodetection regions tend not to be disposed at positions on the first and second semiconductor substrates where no scintillation lights can be detected. Therefore, increase in dark count and capacitance in the photodetection regions is suppressed. As a result, the time resolution and the energy resolution of the first and second semiconductor photodetectors are reliably improved.

In the second aspect, the plurality of photodetection regions may include a first photodetection region and a second photodetection region closer to the second portion than the first photodetection region. A width of a conductive wire electrically connecting one of the first electrodes corresponding to the first photodetection region and the first photodetection region may be larger than a width of a conductive wire electrically connecting one of the first electrodes corresponding to the second photodetection region and the second photodetection region.

In a configuration in which the width of the conductive wire electrically connecting the first electrode corresponding to the first photodetection region and the first photodetection region is larger than the width of the conductive wire electrically connecting the first electrode corresponding to the second photodetection region and the second photodetection region, an electrical resistance difference is reduced. A length of a conductive wire electrically connecting one of the first electrodes corresponding to the first photodetection region and the first photodetection region is longer than a length of a conductive wire electrically connecting one of the first electrodes corresponding to the second photodetection region and the second photodetection region. As a length of the conductive wire increases, the electrical resistance of the conductive wire increases. As the width of the conductive wire increases, the electrical resistance of the conductive wire decreases. Therefore, in a configuration in which a width of a long conductive wire is larger than a width of a short conductive wire, the electrical resistance difference between the electrical resistance of the long conductive wire and the electrical resistance of the short conductive wire is reduced. As a result, this configuration more reliably improves the time resolution and the energy resolution of the radiation detector.

The second aspect may further include: a first base and a second base; and a first wire and a second wire. The first base may be disposed such that the first semiconductor substrate is positioned between the corresponding first base and the scintillator. The second base may be disposed such that the second semiconductor substrate is positioned between the corresponding second base and the scintillator. The first base may include a third portion covered with the first semiconductor substrate and a fourth portion exposed from the first semiconductor substrate, and the second base may include a third portion covered with the second semiconductor substrate and a fourth portion exposed from the second semiconductor substrate. The third portion and the fourth portion may be disposed in the first direction. Each of the fourth portions may include a first terminal and a second terminal. The first terminal and the scintillator may be disposed in front of the same surface of the first base, and the second terminal and the scintillator may be disposed in front of the same surface of the second base. The first terminal may be electrically connected to the first electrode by the first wire, and the second terminal may be electrically connected to the second electrode by the second wire.

A configuration in which the first and second bases are provided increases the mechanical strength of the radiation detector. Therefore, this configuration reliably achieves a radiation detector having high mechanical strength.

The second aspect may further include a resin that covers the first wire and the second wire.

In a configuration in which a resin is provided to cover the first wire and the second wire, the resin protects the first and second wires. Therefore, the first and second wires tend not to be damaged. As a result, this configuration decreases deterioration of electrical connection between the first and second terminals and the first and second electrodes.

The second aspect may include a first light reflector and a second light reflector. The first light reflector may be disposed such that the first semiconductor substrate is positioned between the first light reflector and the scintillator. The second light reflector may be disposed such that the second semiconductor substrate is positioned between the second light reflector and the scintillator.

For example, in a configuration in which a plurality of radiation detectors according to the second aspect are provided, the following effects can be achieved when one radiation detector includes the first light reflector. That is, a configuration in which the first light reflector of the one radiation detector and the first other surface of another radiation detector oppose each other in the second direction improves reflectance of the scintillation lights on the first other surface of the other radiation detector even when the first light reflector is not disposed on the first other surface of the other radiation detector.

For example, in a configuration in which the plurality of radiation detectors according to the second aspect are provided, the following effects can be achieved when one radiation detector includes the second light reflector. That is, a configuration in which the second light reflector of the one radiation detector and the second other surface of the other radiation detector and the second other surface of the other radiation detector oppose each other in the third direction improves reflectance of the scintillation lights on the second other surface of the other radiation detector even when the second light reflector is not disposed on the second other surface of the other radiation detector.

Therefore, this configuration tends to achieve high time resolution when the plurality of radiation detectors are provided.

In the second aspect, the first light reflector may be disposed such that the first semiconductor substrate and the first base are positioned between the first light reflector and the scintillator. The second light reflector may be disposed such that the second semiconductor substrate and the second base are positioned between the second light reflector and the scintillator.

In the second aspect, the first wiring member may be disposed on the same side as the scintillator relative to the first semiconductor substrate. The second wiring member may be disposed on the same side as the scintillator relative to the second semiconductor substrate.

In a configuration in which the first and second wiring members are disposed on the same side as the scintillator relative to the first and second semiconductor substrates, a substrate for connecting the first and second wiring members to the first and second electrodes, respectively, through die bonding, for example does not need to be provided. Therefore, this configuration more reliably simplifies the configuration of the radiation detector.

In the second aspect, the first light reflector and the second light reflector may have a thickness of 0.05 to 100 μm.

A configuration in which the first and second light reflectors have the above-described thickness reliably improves reflectance of the scintillation lights on the first and second other surfaces. Therefore, this configuration reliably simplifies the configuration of the radiation detector.

In the second aspect, the first wiring member, the second wiring member, the first semiconductor substrate, and the second semiconductor substrate may have flexibility. The flexibility of the first wiring member may be higher than the flexibility of the first semiconductor substrate. The flexibility of the second wiring member may be higher than the flexibility of the second semiconductor substrate.

In a configuration in which the flexibility of the first and second wiring members is higher than the flexibility of the first and second semiconductor substrates, respectively, vibration of the first and second wiring members tends not to be transmitted to the first and second semiconductor substrates. Forces from the first and second wiring members tend not to be applied to the first and second semiconductor substrates, and the first and second semiconductor substrates tend not to be physically damaged. Therefore, this configuration reliably improves the mechanical strength of the radiation detector.

A radiation detector array according to a third aspect includes a plurality of radiation detectors two-dimensionally disposed in a matrix when viewed in a first direction. Each of the plurality of radiation detectors is the radiation detector according to the first aspect. The semiconductor photodetector of one of the radiation detectors is disposed with the semiconductor photodetector of another one of the radiation detectors adjacent to the one of the radiation detectors in a direction parallel to the one side surface.

In the third aspect, the radiation detector array in which the radiation detectors having high time resolution and high energy resolution are two-dimensionally disposed in a matrix is achieved.

In the third aspect, the semiconductor photodetectors adjacent to each other in the direction parallel to the one side surface may be integrally formed with each other.

In a configuration in which the individual semiconductor photodetectors are integrally formed with each other, when the radiation detector array in which the plurality of radiation detectors are two-dimensionally disposed in a matrix is produced, forming the semiconductor photodetectors is simplified.

A radiation detector array according to a fourth aspect includes a plurality of radiation detectors two-dimensionally disposed in a matrix when viewed in a first direction. Each of the plurality of radiation detectors is the radiation detector according to the second aspect. The first semiconductor photodetector of one of the radiation detectors is disposed with the first semiconductor photodetector of another one of the radiation detectors adjacent in the third direction. The second semiconductor photodetector of the one radiation detector is disposed with the second semiconductor photodetector of still another one of the radiation detectors adjacent in the second direction.

In the fourth aspect, the radiation detector array in which the radiation detector having high time resolution and high energy resolution are two-dimensionally disposed in a matrix is achieved.

In the fourth aspect, the first semiconductor photodetectors adjacent to each other in the third direction may be integrally formed with each other.

In a configuration in which the individual first semiconductor photodetectors are integrally formed with each other, when the radiation detector array in which the plurality of radiation detectors are two-dimensionally disposed in a matrix is produced, forming the first semiconductor photodetectors is simplified.

In the fourth aspect, the second semiconductor photodetectors adjacent to each other in the second direction may be integrally formed with each other.

In a configuration in which the individual second semiconductor photodetectors are integrally formed with each other, when the radiation detector array in which the plurality of radiation detectors are two-dimensionally disposed in a matrix is produced, forming the second semiconductor photodetectors is simplified.

Advantageous Effects of Invention

The first and second aspects of the present invention provide a radiation detector having high time resolution and high energy resolution.

The third and fourth aspects of the present invention provide radiation detector arrays including a radiation detector having high time resolution and high energy resolution.

BRIEF DESCRIPTION OF DRAWINGS

FIG. 24 is a perspective view illustrating a radiation detector according to a second embodiment.

DESCRIPTION OF EMBODIMENTS

Figure 1:
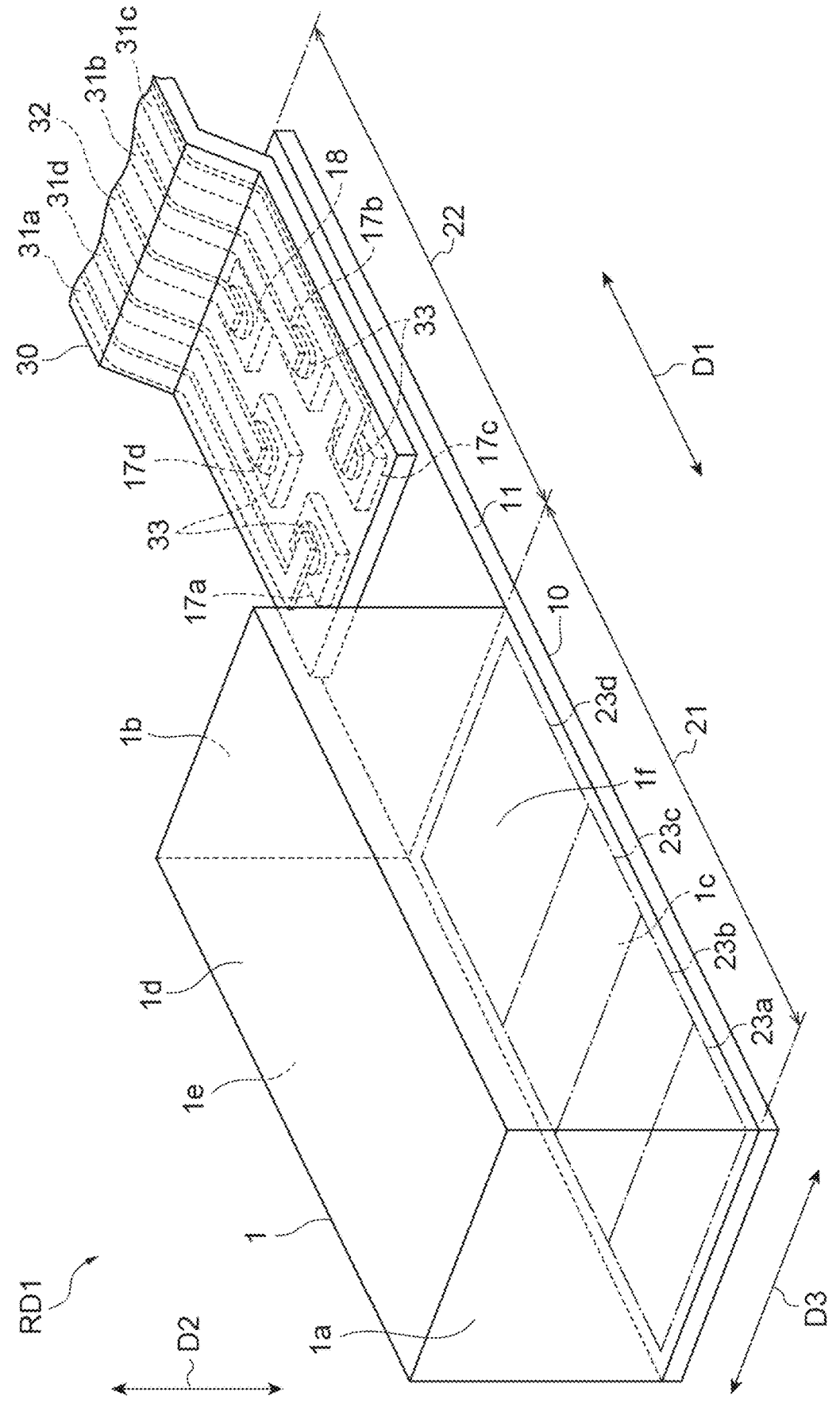
FIG. 1 is a perspective view illustrating a radiation detector according to a first embodiment.

Hereinafter, embodiments of the present invention will be described in detail with reference to the accompanying drawings. Note that, in the description, the same reference numerals will be used for the same elements or elements having the same functions, and redundant description will be omitted.

First Embodiment

Figure 2:
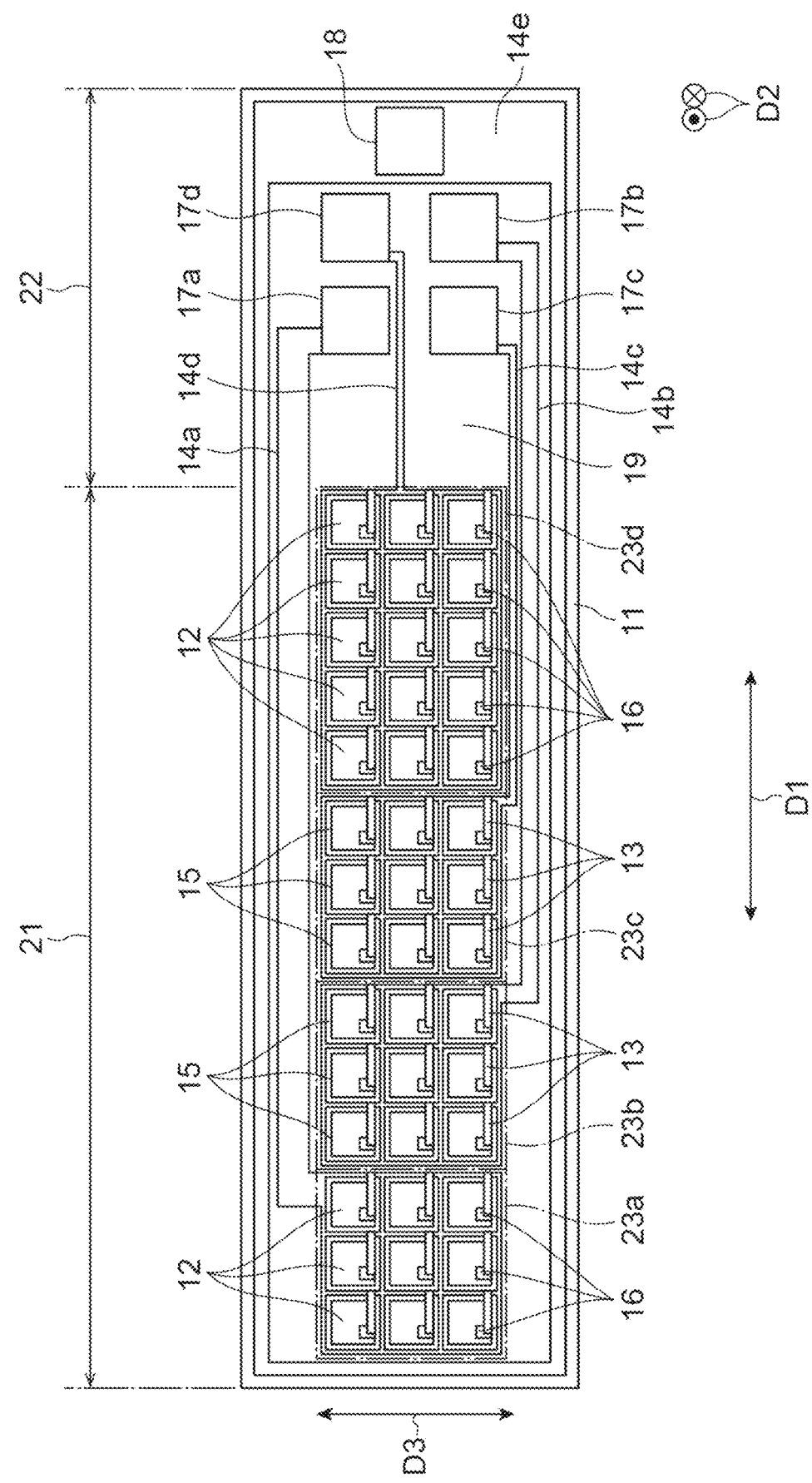
FIG. 2 is a plan view illustrating a semiconductor photodetector.
Figure 3:
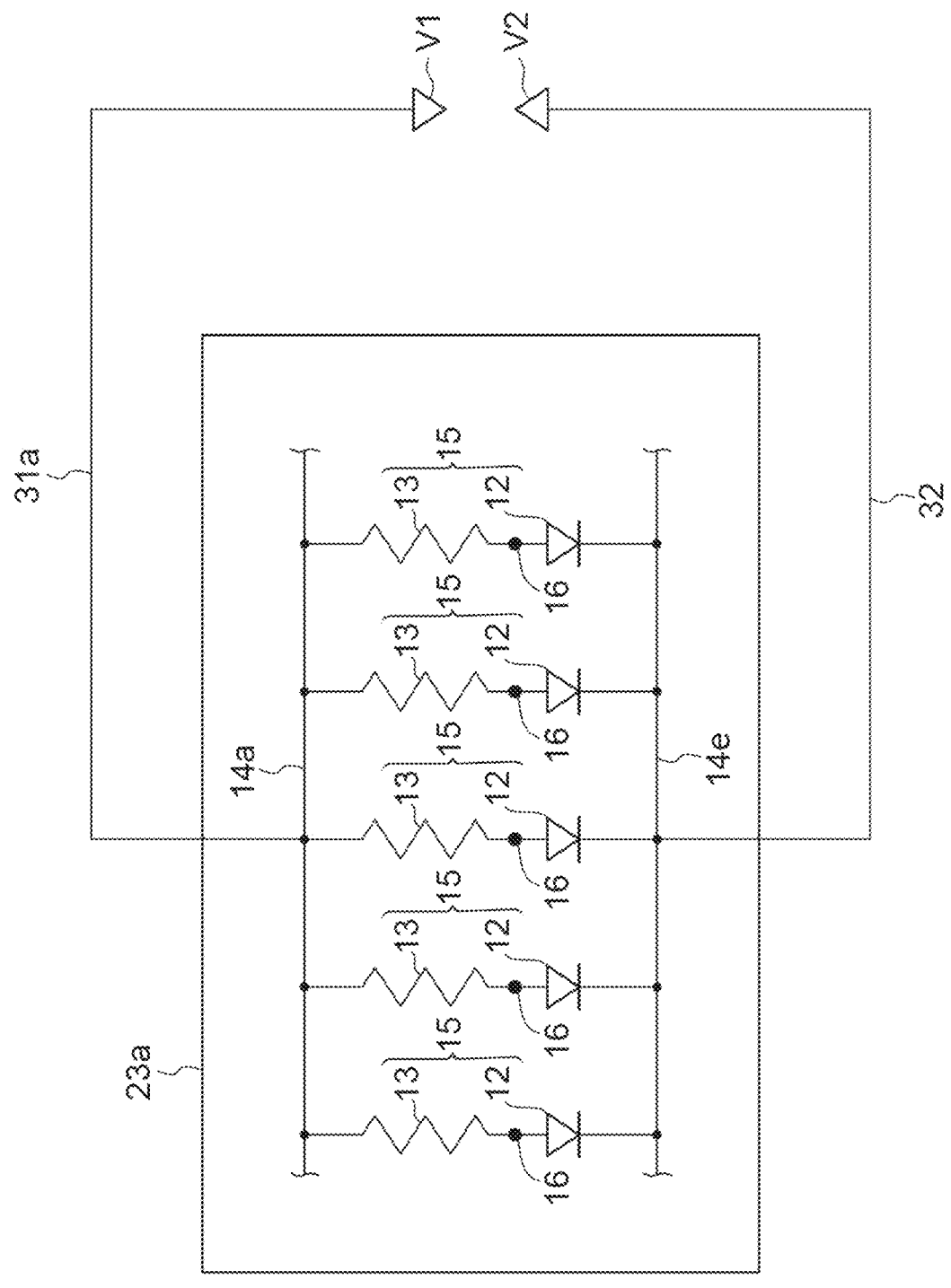
FIG. 3 is a diagram illustrating an equivalent circuit of a photodetection region.
Figure 4:
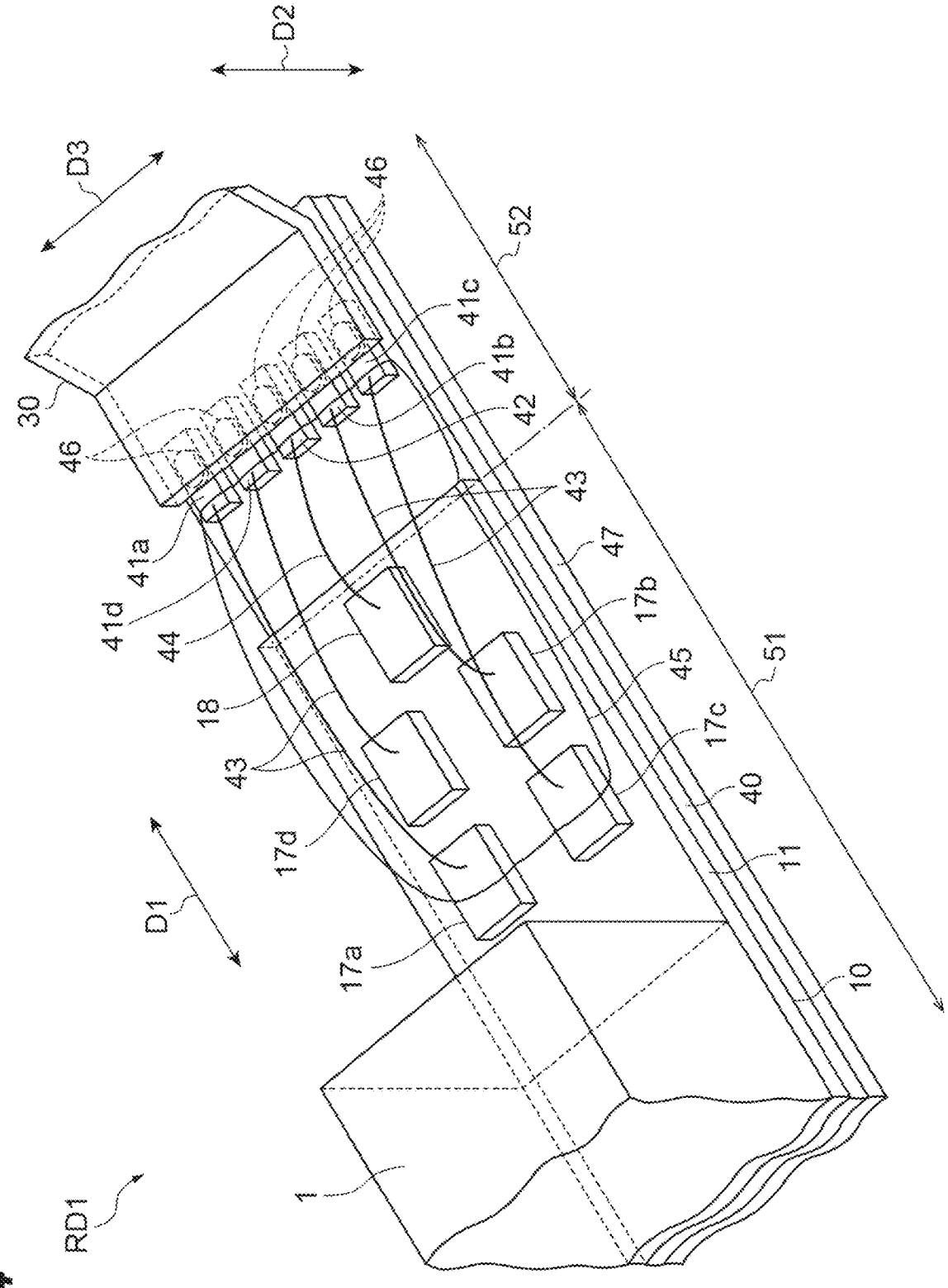
FIG. 4 is a perspective view illustrating the radiation detector according to the first embodiment.

A configuration of a radiation detector RD1 according to a first embodiment will be described with reference to FIGS. 1 to 4. FIG. 1 is a perspective view illustrating the radiation detector according to the first embodiment. FIG. 2 is a plan view illustrating a semiconductor photodetector. FIG. 3 is a diagram illustrating an equivalent circuit of a photodetection region. FIG. 4 is a perspective view illustrating the radiation detector according to the first embodiment.

As illustrated in FIG. 1, the radiation detector RD1 includes a scintillator 1, a semiconductor photodetector 10, and a wiring member 30. The scintillator 1 generates a scintillation light in response to radiation entry in the scintillator. The scintillation light includes, for example, fluorescence. The semiconductor photodetector 10 detects the scintillation light generated in the scintillator 1. The semiconductor photodetector 10 includes a semiconductor substrate 11 and is electrically connected to the wiring member 30.

The scintillator 1 includes a pair of end surfaces $1a$ and $1b$ opposing each other, a pair of side surfaces $1c$ and $1d$ opposing each other, and a pair of side surfaces $1e$ and $1f$ opposing each other. An outer surface of the scintillator 1 includes the end surfaces $1a$ and $1b$, the side surfaces $1c$ and $1d$, and the side surfaces $1e$ and $1f$. The end surfaces $1a$ and $1b$ oppose each other in a first direction D1. The end surfaces $1a$ and $1b$ define both ends of the scintillator 1 in the first direction D1. The side surfaces $1c$ and $1d$ oppose each other in a second direction D2 intersecting the first direction D1. The side surface $1d$ is a surface opposing the side surface $1c$. In the present embodiment, the second direction D2 coincides with a direction orthogonal to the side surface $1c$. The side surfaces $1c$ and $1d$ define both ends of the scintillator 1 in the second direction D2. The side surfaces $1e$ and $1f$ oppose each other in a third direction D3 intersecting the first direction D1 and the second direction D2. In the present embodiment, the first direction D1, the second direction D2, and the third direction D3 are orthogonal to each other. The side surfaces $1e$ and $1f$ define both ends of the scintillator 1 in the third direction D3. A length of the scintillator 1 in the first direction D1 is longer than a length of the scintillator 1 in the second direction D2 orthogonal to the side surface $1c$. The first direction D1 is a longitudinal direction of the scintillator 1.

The end surface $1a$ and the end surface $1b$ extend in the second direction D2 to couple the side surface $1c$ and the side surface $1d$. The end surface $1a$ and the end surface $1b$ extend in the third direction D3 to couple the side surface $1e$ and the side surface $1f$. The side surface $1c$ and the side surface $1d$ extend in the first direction D1 to couple the end surface $1a$ and the end surface $1b$. The side surface $1c$ and the side surface $1d$ extend in the third direction D3 to couple the side surface $1e$ and the side surface $1f$. The side surface $1e$ and the side surface $1f$ extend in the first direction D1 to couple the end surface $1a$ and the end surface $1b$. The side surface $1e$ and the side surface $1f$ extend in the second direction D2 to couple the side surface $1c$ and the side surface $1d$. The side surface $1e$ and the side surface $1f$ are adjacent to the side surface $1c$. In the present embodiment, a length of the side surface $1c$ in the first direction D1 is longer than a width of the side surface $1c$ in the third direction D3. In the present embodiment and the modification examples according to the present embodiment, for example, when the side surface 1c includes one side surface, the side surfaces 1e and 1f include other side surfaces.

The length of the scintillator 1 in the first direction D1 is, for example, about 20 mm. The length of the scintillator 1 in the second direction D2 is, for example, about 4 mm. A length of the scintillator 1 in the third direction D3 is, for example, about 4 mm.

In the present embodiment, the end surfaces 1a and 1b each have a rectangular shape when viewed in a direction orthogonal to the end surfaces 1a and 1b. The side surfaces 1c and 1d each have a rectangular shape when viewed in a direction orthogonal to the side surfaces 1c and 1d. The side surfaces 1e and 1f each have a rectangular shape when viewed in a direction orthogonal to the side surfaces 1e and 1f. The scintillator 1 has a rectangular shape when viewed in the second direction D2 and the third direction D3. The scintillator 1 has a rectangular shape when viewed in the first direction D1. In the present embodiment, the scintillator 1 has a rectangular parallelepiped shape. The "rectangular shape" in this specification includes, for example, a shape in which each corner is chamfered and a shape in which each corner is rounded. The "rectangular parallelepiped shape" in this specification includes a rectangular parallelepiped shape in which corner portions and ridge portions are chamfered or a rectangular parallelepiped shape in which corner portions and ridge portions are rounded.

The scintillator 1 includes, for example, a crystalline scintillator, a ceramic scintillator, or a plastic scintillator. The crystalline scintillator includes, for example, CsI, NaI, LaBr$_3$, cerium-doped lutetium yttrium orthosilicate (LYSO (Ce)), gadolinium aluminum gallium garnet (GAGG), lutetium oxyorthosilicate (LSO), bismuth germanate (BGO), or ruthenium aluminum garnet (LuAG). The ceramic scintillator includes, for example, a sintered body of an inorganic phosphor. The plastic scintillator includes, for example, polyethylene terephthalate (PET).

As illustrated in FIGS. 1 and 2, the semiconductor substrate 11 is disposed to oppose the side surface 1c. The semiconductor substrate 11 is disposed on the side surface 1c with an adhesive, for example. The semiconductor substrate 11 includes, for example, Si and includes a portion 21 and a portion 22. In the present embodiment, the portion 22 is covered with the side surface 1c. The portion 22 is disposed with the portion 21 in the first direction D1 and is exposed from the side surface 1c. For example, when the portion 21 includes a first portion, the portion 22 includes a second portion.

As illustrated in FIGS. 2 and 3, the semiconductor photodetector 10 includes a plurality of photodetection regions 23a, 23b, 23c, and 23d, and the plurality of photodetection regions 23a, 23b, 23c, and 23d are disposed in the portion 21. The plurality of photodetection regions 23a, 23b, 23c, and 23d are disposed in the first direction D1. In the present embodiment, the four photodetection regions 23a, 23b, 23c, and 23d are disposed. Each of the plurality of photodetection regions 23a, 23b, 23c, and 23d includes at least one avalanche photodiode 12 and at least one quenching resistor 13. In the example illustrated in FIG. 2, each of the plurality of photodetection regions 23a, 23b, 23c, and 23d includes a plurality of avalanche photodiodes 12 and a plurality of quenching resistors 13. The avalanche photodiode 12 detects a scintillation light and generates photoelectrons from the detected scintillation light through photoelectric conversion. In the portion 21, for example, four conductive wires 14a, 14b, 14c, and 14d and a conductive wire 14e are disposed.

The conductive wires 14a, 14b, 14c, and 14d include a wired pattern for signal readout. The conductive wires 14a, 14b, 14c, and 14d are patterned in, for example, a grid shape when viewed in the second direction D2.

A grid pattern of the conductive wires 14a, 14b, 14c, and 14d surrounds one photodetection section 15. The one photodetection section 15 includes one avalanche photodiode 12 and one quenching resistor 13. The one quenching resistor 13 is electrically connected in series with the avalanche photodiode 12 corresponding to the one quenching resistor 13. A plurality of photodetection sections 15 are disposed in the portion 21. The photodetection sections 15 are two-dimensionally disposed in a matrix, for example. In the example illustrated in FIG. 2, the photodetection regions 23a, 23b, 23c, and 23d are in contact with each other. In practice, the photodetection regions 23a, 23b, 23c, and 23d may be in contact with each other or may be separated from each other. One photodetection section 15 may be disposed in each photodetection region 23. Therefore, each of the plurality of photodetection regions 23a, 23b, 23c, and 23d may include one avalanche photodiode 12 and one quenching resistor 13.

Each of the at least one quenching resistor 13 is electrically connected in series with one of an anode or a cathode of the corresponding avalanche photodiode 12 of the at least one avalanche photodiode 12. The avalanche photodiode 12 includes a contact electrode 16 electrically connected to one of the anode or the cathode. One end of the quenching resistor 13 is electrically connected in series with the contact electrode 16. The other end of each quenching resistor 13 is electrically connected in series with each of the conductive wires 14a, 14b, 14c, and 14d including the wired pattern. Each of the conductive wires 14a, 14b, 14c, and 14d is electrically connected in parallel with the plurality of quenching resistors 13. The conductive wire 14e is electrically connected in parallel with the other of the anodes or the cathodes of the plurality of avalanche photodiodes 12.

In the portion 22, a plurality of electrodes 17a, 17b, 17c, and 17d and an electrode 18 are disposed. That is, the semiconductor photodetector 10 includes the electrodes 17a, 17b, 17c, and 17d and the electrode 18. Each of the electrodes 17a, 17b, 17c, and 17d electrically connects the at least one quenching resistor 13 included in the corresponding photodetection region 23a, 23b, 23c, or 23d of the plurality of photodetection regions 23 through each of the conductive wire 14a, 14b, 14c, and 14d. In the example illustrated in FIG. 2, each of the electrodes 17a, 17b, 17c, and 17d are electrically connected in parallel with the plurality of quenching resistors 13 included in the corresponding photodetection region 23a, 23b, 23c, or 23d of the plurality of photodetection regions 23, through each of the conductive wire 14a, 14b, 14c, and 14d. The electrode 17a is connected to the photodetection region 23a through the conductive wire 14a. The electrode 17b is connected to the photodetection region 23b through the conductive wire 14b. The electrode 17c is connected to the photodetection region 23c through the conductive wire 14c. The electrode 17d is connected to the photodetection region 23d through the conductive wire 14d. In a configuration in which the photodetection regions 23a, 23b, 23c, and 23d each include one quenching resistor 13, each of the electrodes 17a, 17b, 17c, and 17d electrically connect each one quenching resistor 13 included in each of the photodetection regions 23a, 23b, 23c, and 23d in series through each of the conductive wires 14a, 14b, 14c, and 14d.

The electrode 18 is electrically connected to the other of the anodes or the cathodes of the at least one avalanche photodiode 12 through the conductive wire 14*e*. In the example illustrated in FIG. 2, the electrode 18 is electrically connected in parallel with the other of the anodes or the cathodes of the plurality of avalanche photodiodes 12 through the conductive wire 14*e*. In a configuration in which each of the photodetection regions 23*a*, 23*b*, 23*c*, and 23*d* includes one avalanche photodiode 12, the electrode 18 is electrically connected in parallel with the other of the anode or the cathode of the one avalanche photodiode 12 included in each of the photodetection regions 23*a*, 23*b*, 23*c*, and 23*d*, through the conductive wire 14*e*.

The electrodes 17*a*, 17*b*, 17*c*, and 17*d* and the electrode 18 include, for example, aluminum or an aluminum composite. The aluminum composite includes, for example, AlSi, AlCu, or AlSiCu. The electrodes 17*a*, 17*b*, 17*c*, and 17*d* and the electrode 18 are formed through, for example, a plating method, a vapor deposition method, or a sputtering method.

An electrical resistivity of the quenching resistor 13 is higher than an electrical resistivity of the electrodes 17*a*, 17*b*, 17*c*, and 17*d* and the electrode 18. The quenching resistor 13 includes, for example, polysilicon. A material of the quenching resistor 13 may include, for example, SiCr, NiCr, or FeCr. The quenching resistor 13 is formed through, for example, a chemical vapor deposition (CVD) method or a sputtering method. For example, when the electrodes 17*a*, 17*b*, 17*c*, and 17*d* include a first electrode, the electrode 18 includes a second electrode.

In the present embodiment, each of the at least one quenching resistor 13 electrically connects, for example, the anode of the corresponding avalanche photodiode 12 of the at least one avalanche photodiode 12. In this case, the electrode 18 is electrically connected to the cathodes of the plurality of avalanche photodiodes 12. The at least one quenching resistor 13 may electrically connect the cathode of the corresponding avalanche photodiode 12 of the at least one avalanche photodiode 12. In this case, the electrode 18 electrically connects the anodes of the at least one avalanche photodiode 12.

Each avalanche photodiode 12 operates in Geiger mode. In Geiger mode, a reverse bias voltage is applied to the avalanche photodiode 12. The reverse bias voltage is, for example, a reverse voltage higher than a breakdown voltage of the avalanche photodiode 12. For example, an electrical potential V1 is applied to the anode of the avalanche photodiode 12, and an electrical potential V2 positive relative to the electrical potential V1 is applied to the cathode of the avalanche photodiode 12. These electrical potentials have relative polarities, and for example, one of the electrical potentials may be an electrical ground potential. The photodetection sections 15 are electrically connected in parallel.

Each of the avalanche photodiodes 12 may be a so-called reach-through avalanche photodiode or a so-called reverse avalanche photodiode. The reach-through avalanche photodiode 12 is included in, for example, the radiation detector RD1 including the scintillator 1 that generates a scintillation light having a long wavelength. For example, the reach-through avalanche photodiode is used when the scintillation light is a long-wavelength light. The reverse avalanche photodiode 12 is used, for example, when the scintillation light is a short-wavelength light. The reach-through or reverse avalanche photodiode 12 operates in Geiger mode. The radiation detector RD1 may include an avalanche photodiode 12 arranged to operate in a linear mode. The avalanche photodiode 12 arranged to operate in the linear mode may also be a so-called reach-through avalanche photodiode or a so-called reverse avalanche photodiode.

In the semiconductor substrate 11, for example, the conductive wires 14*a*, 14*b*, 14*c*, and 14*d*, the conductive wire 14*e*, the electrodes 17*a*, 17*b*, 17*c*, and 17*d* connected to the conductive wires 14*a*, 14*b*, 14*c*, and 14*d*, respectively, and the electrode 18 connected to the conductive wire 14*e* are disposed. In the semiconductor substrate 11, for example, an insulating layer 19 is disposed on the conductive wires 14*a*, 14*b*, 14*c*, and 14*d* and the conductive wire 14*e*. The insulating layer 19 extends over the portion 21 and the portion 22. In the portion 22, the electrodes 17*a*, 17*b*, 17*c*, and 17*d* and the conductive wires 14*a*, 14*b*, 14*c*, and 14*d* are insulated from the electrode 18 and the conductive wire 14*e* by the insulating layer 19. In the portion 21, the insulating layer 19 is formed on the plurality of photodetection sections 15. The insulating layer 19 includes, for example, $SiO_2$ or SiN. The insulating layer 19 is formed through, for example, a thermal oxidation method, a sputtering method, or a CVD method.

The wiring member 30 is disposed on the same side as the scintillator 1 relative to the semiconductor substrate 11. That is, at least a part of the wiring member 30 and the scintillator 1 are disposed in front of the same surface of the semiconductor substrate 11, for example. The wiring member 30 includes conductors 31*a*, 31*b*, 31*c*, and 31*d* and a conductor 32. The conductors 31*a*, 31*b*, 31*c*, and 31*d* are electrically connected to the electrodes 17*a*, 17*b*, 17*c*, and 17*d*, and the conductor 32 is electrically connected to the electrode 18. The conductors 31*a*, 31*b*, 31*c*, and 31*d* are electrically connected to the electrodes 17*a*, 17*b*, 17*c*, and 17*d* through corresponding conductive bumps 33. The conductor 32 is connected to the electrode 18 through the conductive bump 33. The conductive bump 33 includes, for example, solder, an anisotropic conductive film (ACF), or an anisotropic conductive paste (ACP). The solder includes, for example, Sn—Ag—Cu solder. The conductive bump 33 may include, for example, an Au bump, an Ni bump, or a Cu bump.

In the present embodiment, when the radiation detector RD1 is driven, the electrical potential V1 is applied to the anodes of the avalanche photodiodes 12 through the conductors 31*a*, 31*b*, 31*c*, and 31*d*, and the electrical potential V2 is applied to the cathodes of the avalanche photodiodes 12 through the conductor 32. The electrical potential V1 may be applied to the cathodes of the avalanche photodiodes 12 through the conductor 32, and the electrical potential V2 may be applied to the anodes of the avalanche photodiodes 12 through the conductors 31*a*, 31*b*, 31*c*, and 31*d*. In FIG. 3, only the conductor 31*a* is depicted. The conductors 31*a*, 31*b*, 31*c*, and 31*d* and the conductor 32 include, for example, Al, Cu, Cu/Ni/Au, or Cu/Ni/Pd/Au. The conductors 31*a*, 31*b*, 31*c*, and 31*d* and the conductor 32 are formed through, for example, a sputtering method or a plating method. The wiring member 30 and the photodetection regions 23*a*, 23*b*, 23*c*, and 23*d* have flexibility, and the flexibility of the wiring member 30 is higher than the flexibility of the photodetection regions 23.

When viewed in the second direction D2, one region including the plurality of photodetection regions 23*a*, 23*b*, 23*c*, and 23*d* is along an outline of the side surface 1*c*. The edges including the outlines of the photodetection regions 23*a*, 23*b*, 23*c*, and 23*d* are formed along a corresponding edge of the edges including the outline of the side surface 1*c* when viewed in the second direction D2. When viewed in the second direction D2, one region including the outlines of the plurality of photodetection regions 23*a*, 23*b*, 23*c*, and 23*d* has a shape corresponding to an outline shape of the side surface 1c. The photodetection sections 15 are all disposed such that the one region including the photodetection regions 23a, 23b, 23c, and 23d has the outline shape corresponding to the outline shape of the side surface 1c when viewed in the second direction D2. The photodetection regions 23a, 23b, 23c, and 23d have, for example, a rectangular outline shape corresponding to the outline shape of the side surface 1c.

As will be described below, the side surface 1c has, for example, trapezoidal and parallelogrammatic outline shapes in addition to the rectangular shape. In a configuration in which the side surface 1c has the trapezoidal outline shape when viewed in the second direction D2, the one region including the photodetection regions 23a, 23b, 23c, and 23d has the trapezoidal outline shape corresponding to the outline shape of the side surface 1c. In a configuration in which the side surface 1c has a parallelogram-shaped outline shape when viewed in the second direction D2, the one region including the photodetection regions 23a, 23b, 23c, and 23d has a parallelogram-shaped outline shape corresponding to the outline shape of the side surface 1c.

In the example illustrated in FIG. 2, in the photodetection regions 23a, 23b, and 23c, three photodetection sections 15 are disposed in each row in the first direction D1, and three photodetection sections 15 are disposed in each row in the third direction D3. The photodetection region 23a includes a total of nine photodetection sections 15. In the photodetection region 23d, five photodetection sections 15 are disposed in each row in the first direction D1, and three photodetection sections 15 are disposed in each row in the third direction D3. The photodetection region 23d includes a total of fifteen photodetection sections 15.

The photodetection regions 23a, 23b, 23c, and 23d are disposed in the first direction D1, for example. In the present embodiment, the photodetection region 23a, the photodetection region 23b, the photodetection region 23c, and the photodetection region 23d are disposed in this order. The photodetection region 23d is closer to the portion 22 than the photodetection region 23a, the photodetection region 23b, and the photodetection region 23c. The photodetection region 23c is closer to the portion 22 than the photodetection region 23a and the photodetection region 23b. The photodetection region 23b is closer to the portion 22 than the photodetection region 23a. In the present embodiment, a width of the conductive wire 14a is larger than any widths of the conductive wires 14b, 14c, and 14d. The width of the conductive wire 14b is larger than any widths of the conductive wires 14c and 14d. The width of the conductive wire 14c is larger than the width of the conductive wire 14d. For example, the conductive wire 14a and the conductive wires 14b and 14c extend between both ends of the semiconductor substrate 11 in the third direction D3 and the photodetection regions 23a, 23b, 23c, and 23d, when viewed in the second direction D2. When viewed in the second direction D2, the conductive wire 14d is disposed, for example, between the conductive wire 14a and the conductive wires 14b and 14c. The conductive wires 14a, 14b, 14c, and 14d extend in the first direction D1. The widths of the conductive wires 14a, 14b, 14c, and 14d are widths in a direction perpendicular to an extending direction of the conductive wires 14a, 14b, 14c, and 14d. The widths of the conductive wires 14a, 14b, 14c, and 14d are widths in the third direction D3. For example, when the photodetection region 23a includes a first photodetection region, the photodetection region 23d includes a second photodetection region.

As illustrated in FIG. 4, the radiation detector RD1 includes, for example, a base 40. The base 40 is disposed such that the semiconductor substrate 11 is positioned between the base 40 and the scintillator 1. In a configuration in which the radiation detector RD1 includes the base 40, at least a part of the wiring member 30 and the scintillator 1 are disposed in front of the same surface of the base 40, for example. The base 40 includes a portion 51 and a portion 52. The portion 51 is covered with the semiconductor substrate 11. The portion 52 is disposed with the portion 51 in the first direction D1 and is exposed from the semiconductor substrate 11. For example, when the portion 51 includes a third portion, the portion 52 includes a fourth portion.

The radiation detector RD1 includes, for example, a wire 43 and a wire 44, and the portion 52 includes terminals 41a, 41b, 41c, and 41d and a terminal 42. The terminals 41a, 41b, 41c, and 41d and the terminal 42 are disposed, for example, on the same side as the scintillator 1 relative to the semiconductor substrate 11. Therefore, the terminals 41a, 41b, 41c, and 41d, the terminal 42, and the scintillator 1 are disposed in front of the same surface of the base 40, for example. The terminals 41a, 41b, 41c, and 41d are electrically connected to the electrodes 17a, 17b, 17c, and 17d by the wire 43, and the terminal 42 is electrically connected to the electrode 18 by the wire 44. For example, when the terminals 41a, 41b, 41c, and 41d includes a first terminal, the terminal 42 includes a second terminal. For example, when the wire 43 includes a first wire, the wire 44 includes a second wire.

The radiation detector RD1 includes, for example, a resin 45. The resin 45 covers, for example, the wire 43 and the wire 44. The resin 45 covers the wire 43 and the wire 44 individually or covers both the wire 43 and the wire 44. In a configuration in which the resins 45 covers the wire 43 and the wire 44 individually, the resin 45 covering the wire 43 and the resin 45 covering the wire 44 may be separated from each other or connected to each other. In this specification, that the "resin 45 covers the wire 43" also means that the resin covers a connection position between the terminals 41a, 41b, 41c, and 41d and the wire 43 and a connection position between the electrodes 17a, 17b, 17c, and 17d and the wire 43.

That the "resin 45 covers the wire 44" also means that the resin covers a connection position between the terminal 42 and the wire 44 and a connection position between the electrode 18 and the wire 44. The wiring member 30 is electrically connected to the electrodes 17a, 17b, 17c, and 17d and the electrode 18 through conductive bumps 46.

The radiation detector RD1 includes, for example, a light reflector 47. The light reflector 47 is disposed such that the semiconductor substrate 11 is positioned between the light reflector 47 and the scintillator 1. In a configuration in which the radiation detector RD1 includes the base 40, the light reflector 47 is, for example, disposed such that the semiconductor substrate 11 and the base 40 are positioned between the light reflector 47 and the scintillator 1. In this configuration, for example, the scintillator 1, the semiconductor substrate 11, the base 40, and the light reflector 47 are disposed in this order. In a configuration in which the radiation detector RD1 does not include the base 40, for example, the scintillator 1, the semiconductor substrate 11, and the light reflector 47 are disposed in this order. The light reflector 47 may also be disposed on at least one of the end surfaces 1a and 1b and the side surfaces 1d, 1e, and 1f.

The light reflector 47 includes, for example, metal. The metal of the light reflector 47 includes, for example, Al, Ag, or Au. The light reflector 47 may include a multilayer optical film or Teflon (registered trademark). The light reflector 47 is formed through, for example, a plating method, a vapor deposition method, or a sputtering method. A thickness of the light reflector 47 is, for example, 0.05 to 100 μm. The radiation detector RD1 may not include the light reflector 47.

Figure 5:
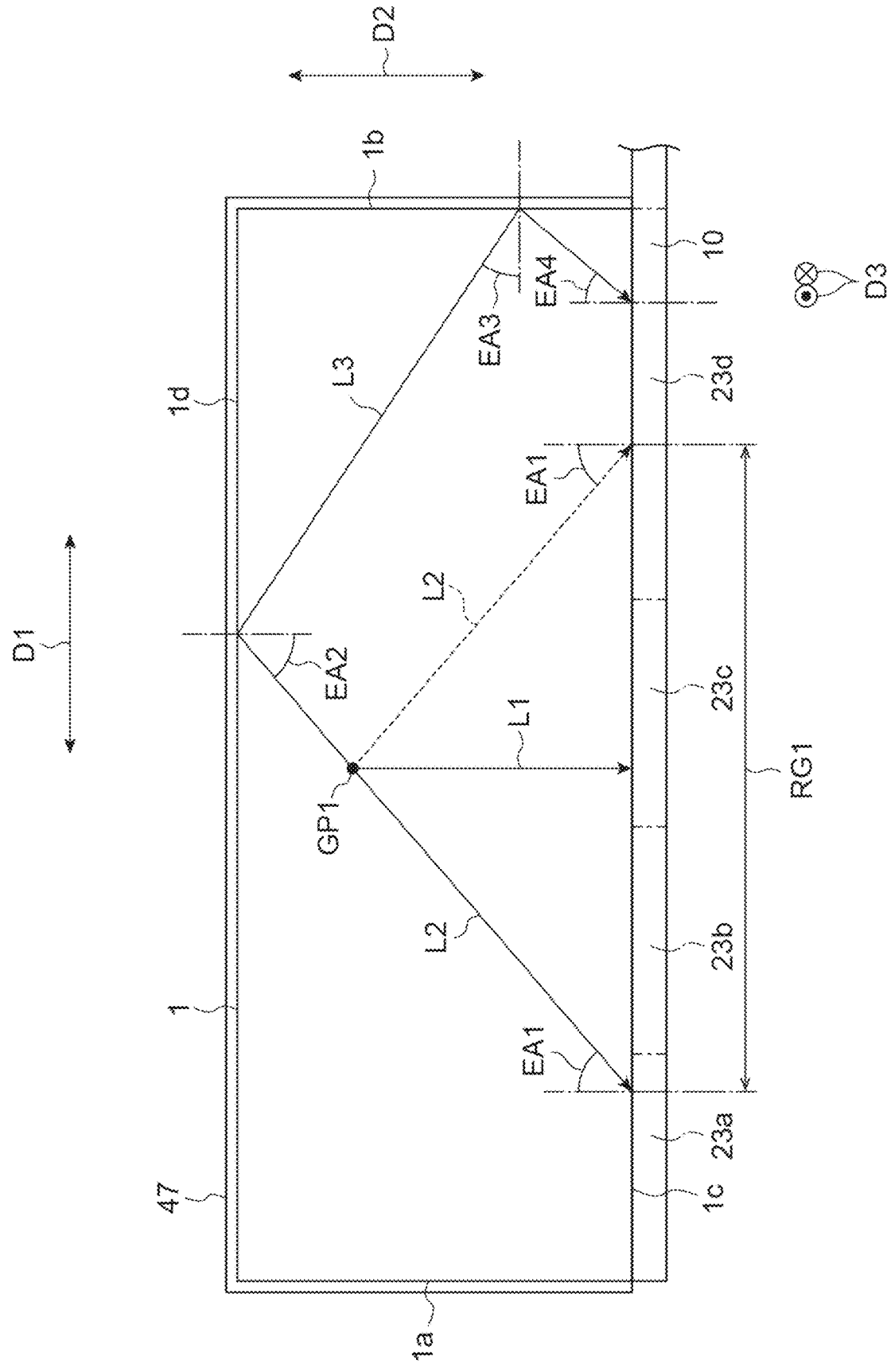
FIG. 5 is a view illustrating paths of some scintillation lights.

A scintillation light path and the scintillator 1 that generates the scintillation light path will be described with reference to FIGS. 5 to 8. FIG. 5 is a view illustrating paths of some scintillation lights. FIG. 5 illustrates paths of some scintillation lights when the scintillator 1 is viewed in the third direction D3. As described above, the scintillation light is generated by radiation entry in the scintillator 1. The radiation is incident on the scintillator 1 from the end surface 1a in the first direction D1, for example. The semiconductor photodetector 10 is disposed to oppose the side surface 1c. In the present embodiment, the scintillator 1 has a refractive index of, for example, 1.8, and an adhesive for bonding the semiconductor photodetector 10 and the scintillator 1 has a refractive index of, for example, 1.5. In this case, a critical angle of the scintillation light on the side surface 1c is about 56.4 degrees. The illustrated radiation detector RD1 includes the light reflectors 47 on the end surfaces 1a and 1b and the side surfaces 1d, 1e, and 1f. The scintillation light incident on the end surfaces 1a and 1b and the side surfaces 1d, 1e, and 1f is totally reflected by the light reflectors 47.

Scintillation light generated in the scintillator 1 travel, for example, in the scintillator 1 as follows. The scintillation lights travel in all directions of 360 degrees from a scintillation light generation point GP1. The scintillation light includes, for example, lights L1 and L2 incident on the side surface 1c directly from the generation point GP1. A range of an incidence angle at which the lights L1 and L2 can be incident on the side surface 1c is 0 to about 56.4 degrees. In the example illustrated in FIG. 5, the light L1 is incident on the side surface 1c at an incidence angle of 0 degrees that is the lower limit of the incidence angle. The light L1 is incident on the side surface 1c and is incident on the photodetection region 23c. The light L2 is incident on the side surface 1c at an incidence angle EA1, and the incidence angle EA1 is smaller than 56.4 degrees that is the upper limit of the incidence angle. The light L2 is not totally reflected by the side surface 1c and is emitted from the side surface 1c within a region RG1 illustrated in the side surface 1c. The region RG1 indicates a maximum region in which the light L2 can be emitted from the side surface 1c when viewed in the third direction D3. The light L2 is also incident on the side surface 1c by a path indicated by a broken line in FIG. 5. The light L2 emitted from the side surface 1c is incident on any one of the photodetection regions 23a, 23b, 23c, and 23d and is detected by the semiconductor photodetector 10 disposed on the side surface 1c. For example, when the scintillation light is generated in a region of the scintillator corresponding to the photodetection region 23a, for example, of the plurality of photodetection regions 23a, 23b, 23c, and 23d, the photodetection region 23a detects the most scintillation lights. In the present embodiment, for example, a signal processing circuit connected to the wiring member 30 performs calculation by adding electrical signals output in response to light incidence on the photodetection regions 23a, 23b, 23c, and 23d.

The scintillation lights include, for example, a light L3 first incident on the side surface 1d at an incidence angle EA2 in addition to the lights L1 and L2. The light L3 is totally reflected by the side surface 1d. The light L3 is totally reflected by the side surface 1d and then is incident on the end surface 1b at an incidence angle EA3. The light L3 is totally reflected by the end surface 1b and then is incident on the side surface 1c. In the example illustrated in FIG. 5, an incidence angle EA4 of the light L3 on the side surface 1c is smaller than the critical angle on the side surface 1c. The light L3 is not totally reflected by the side surface 1c and is emitted from the side surface 1c. The light L3 is incident on the photodetection region 23d, for example.

Figure 6:
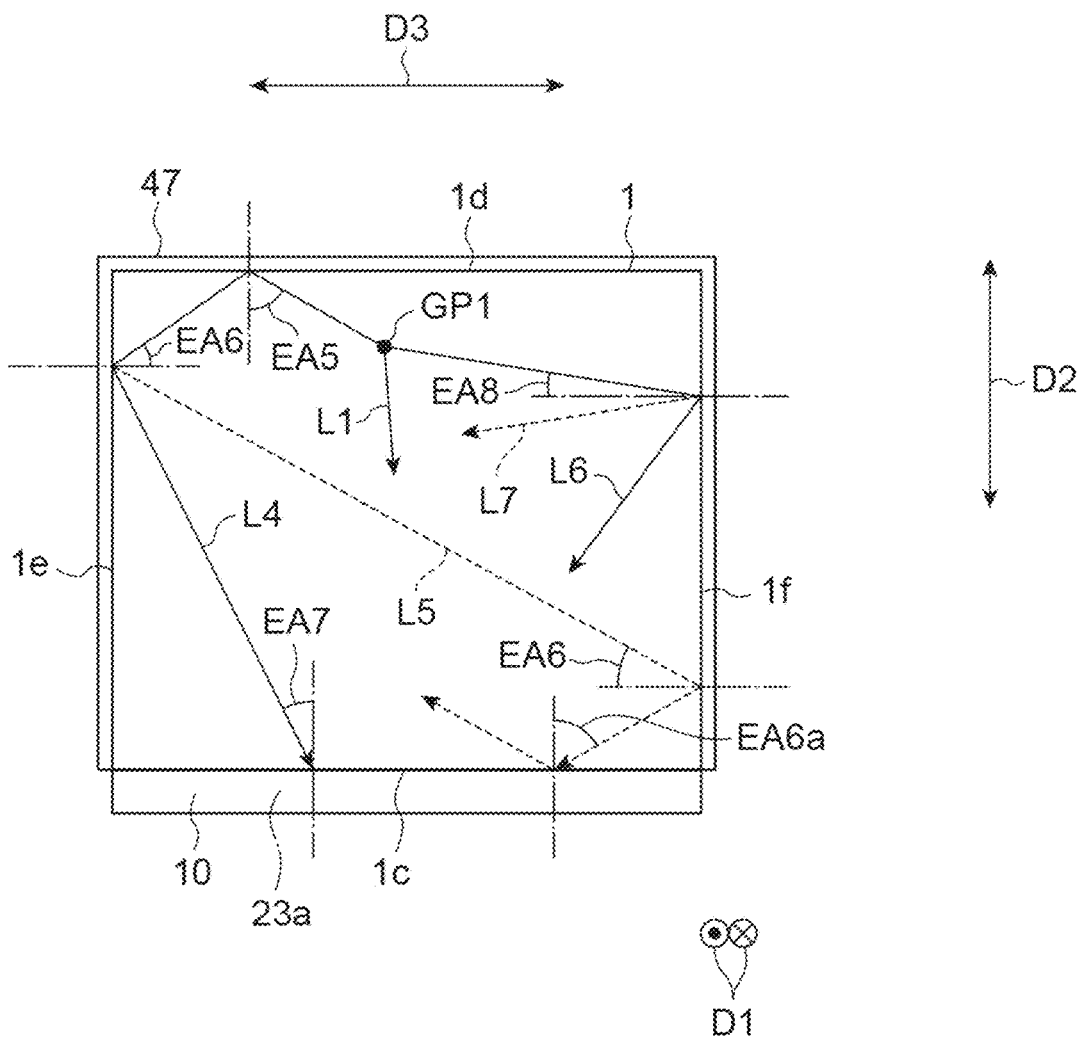
FIG. 6 is a view illustrating paths of some scintillation lights.

FIG. 6 is a view illustrating paths of some scintillation lights. FIG. 6 illustrates the paths of some scintillation lights when the scintillator 1 is viewed in the first direction D1. As illustrated in FIG. 6, a path of the scintillation light from the generation point GP1 to the side surface 1c varies with states of the side surfaces 1e and 1f. The semiconductor photodetector 10 is disposed to oppose the side surface 1c.

In the scintillator 1 used as an example in FIG. 6, two surfaces of the side surfaces 1e and 1f include rough surfaces. The two surfaces of the side surfaces 1c and 1d include mirror surfaces. The scintillation light includes, for example, a light L4 incident on the side surface 1d at an incidence angle EA5 from the generation point GP1, in addition to the light L1. The light L4 incident on the side surface 1d is totally reflected by the side surface 1d. The light L4 is totally reflected by the side surface 1d and then is incident on the side surface 1e at an incidence angle EA6. Since the side surface 1e includes a rough surface, the light L4 incident on the side surface 1e is reflected and diffused from the side surface 1e toward the side surface 1c. The reflected and diffused light L4 is incident on the side surface 1c. When an incidence angle EA7 of the light L4 on the side surface 1c is smaller than the critical angle on the side surface 1c, the light L4 incident on the side surface 1c is detected by the semiconductor photodetector 10 disposed on the side surface 1c. The light L4 is incident on any one of the photodetection regions 23a, 23b, 23c, and 23d. In the example of FIG. 6, the light L4 is incident on the photodetection region 23a. Even when the incidence angle EA7 is larger than the critical angle on the side surface 1c, the light L4 is reflected by the side surface 1c and then is incident on the side surface 1f. Since the side surface 1f includes a rough surface, the light L4 can be reflected toward the side surface 1c.

When the incidence angle EA7 is larger than the critical angle on the side surface 1c, the light L4 is reflected by the side surface 1c and then is incident on the side surface 1e again through the side surface 1d. The light L4 incident on the side surface 1e again can be reflected by the side surface 1e to be incident on the side surface 1c at an incidence angle smaller than the critical angle on the side surface 1c. Since the side surface 1e includes a rough surface, the light L4 incident on the side surface 1e is reflected at a different reflection angle for each reflection even if the incidence angles EA6 are substantially the same. The light L4 incident on the side surface 1c at an incidence angle smaller than the critical angle on the side surface 1c is detected by the semiconductor photodetector 10. In a configuration in which the side surface 1e includes a mirror surface, when the incidence angles EA6 are substantially the same, the light L4 reflected by the side surface 1e tends not to be reflected at a different reflection angle for each reflection.

Here, a path of a light in a configuration in which the side surfaces 1e and 1f include mirror surfaces is compared with a path of a light in a configuration in which the side surfaces 1e and 1f include rough surfaces. In FIG. 6, in the configuration in which the side surfaces 1e and 1f include mirror surfaces, a path of a light L5 that is totally reflected by the side surface 1d and then incident on the side surface 1e is indicated by a broken line. The light L5 incident on the side surface 1e at an incidence angle EA6 is totally reflected by the side surface 1e. The light L5 totally reflected by the side surface 1e is incident on the side surface 1f at the incidence angle EA6. The light L5 incident on the side surface 1f is totally reflected by the side surface 1f. The light L5 totally reflected by the side surface 1f is incident on the side surface 1c at an incidence angle EA6a. When the incidence angle EA6a is smaller than the critical angle on the side surface 1c, the light L5 is detected by the semiconductor photodetector 10. A path of the light L5 from the generation point GP1 to the side surface 1c is longer than a path of the light L4 from the generation point GP1 to the side surface 1c. Therefore, the light L4 is detected by the semiconductor photodetector 10 with a time difference smaller than that of the light L5 relative to the light L1. The number of times of reflection of the light L4 by the side surfaces is smaller than the number of times of reflection of the light L5 by the side surfaces.

In the example of FIG. 6, when the incidence angle EA6 is 30 degrees, the incidence angle EA6a is 60 degrees. The incidence angle EA6a is larger than the critical angle (about 56.4 degrees) on the side surface 1c. In this case, the light L5 is totally reflected by the side surface 1c and is incident on the side surface 1e again. The light L5 is totally reflected by the side surface 1e and is reflected again from each of the side surfaces 1d, 1e, and 1f. Therefore, the light L5 is attenuated by reflection on the side surfaces 1d, 1e, and 1f as compared with the light L4.

As illustrated in FIG. 6, the scintillation light includes, for example, a light L6 incident on the side surface 1f from the generation point GP1. The side surface 1f includes a rough surface. The light L6 incident on the side surface 1f is incident on the side surface 1f at an incidence angle EA8. The light L6 can travel toward the side surface 1c by diffuse reflection from the side surface 1f. The light L6 is emitted from the side surface 1c. Here, a path of a light in a configuration in which the side surface 1f includes a mirror surface is compared with a path of a light in a configuration in which the side surface 1f includes a rough surface. In FIG. 6, in the configuration in which the side surface 1f includes a mirror surface, a path of a light L7 incident on the side surface 1f is indicated by a broken line. The light L7 incident on the side surface 1f at the incidence angle EA8 is totally reflected by the side surface 1f and travels toward the side surface 1e. Thereafter, the light L7 is repeatedly reflected by the side surfaces 1f and 1e and then is incident on the side surface 1c to be detected by the semiconductor photodetector 10. Reflection attenuation of the light L7 is larger than reflection attenuation of the light L6.

Figure 7:
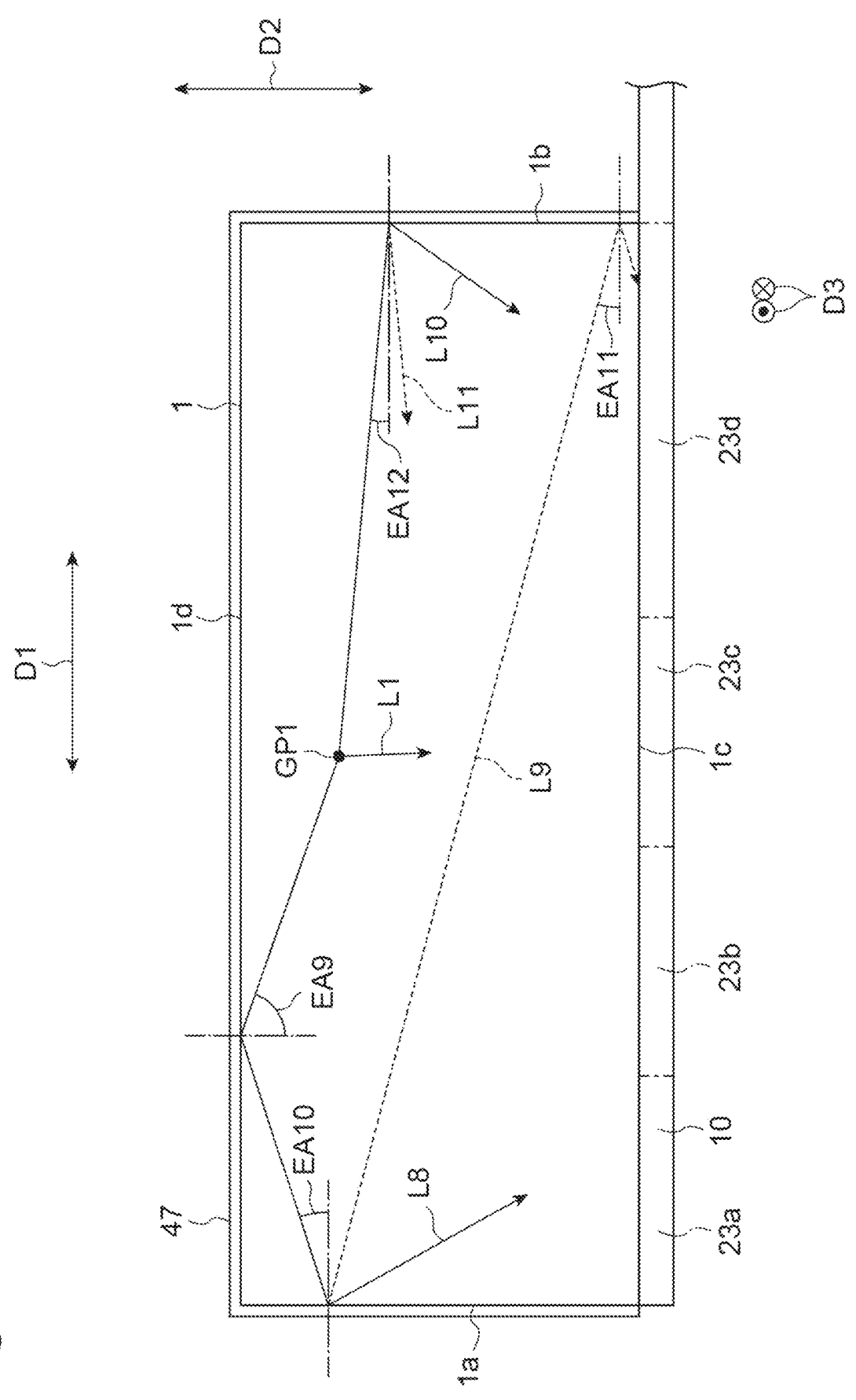
FIG. 7 is a view illustrating paths of some scintillation lights.

FIG. 7 is a diagram illustrating paths of some scintillation lights. FIG. 7 illustrates the paths of some scintillation lights when the scintillator 1 is viewed in the third direction D3. As illustrated in FIG. 7, a path of a scintillation light from the generation point GP1 to the side surface 1c varies with states of the end surfaces 1a and 1b. The semiconductor photodetector 10 is disposed to oppose the side surface 1c.

In the scintillator 1 used as an example in FIG. 7, two surfaces of the end surfaces 1a and 1b include rough surfaces. The two surfaces of the side surfaces 1c and 1d include mirror surfaces. As illustrated in FIG. 7, the scintillation light includes a light L8 incident on the side surface 1d from the generation point GP1, in addition to the light L1. The light L8 incident on the side surface 1d at an incidence angle EA9 is totally reflected by the side surface 1d. The light L8 is totally reflected by the side surface 1d and then is incident on the end surface 1a at an incidence angle EA10. Since the end surface 1a includes a rough surface, the light L8 incident on the end surface 1a is reflected and diffused from the end surface 1a toward the side surface 1c. The reflected and diffused light L8 is incident on the side surface 1c. The light L8 is emitted from the side surface 1c and is incident on the semiconductor photodetector 10.

Here, a path of a light in a configuration in which the end surfaces 1a and 1b include mirror surfaces is compared with a path of a light in a configuration in which the end surfaces 1a and 1b include rough surfaces. In FIG. 7, in the configuration in which the end surfaces 1a and 1b include mirror surfaces, a path of a light L9 that is totally reflected by the side surface 1d and then incident on the end surface 1a is indicated by a broken line. The light L9 incident on the end surface 1a at an incidence angle EA10 is totally reflected by the end surface 1a. The light L9 totally reflected by the end surface 1a is incident on the end surface 1b at an incidence angle EA11. The light L9 incident on the end surface 1b is totally reflected by the end surface 1b. The light L9 totally reflected by the end surface 1b is incident on the side surface 1c. A path of the light L9 from the generation point GP1 to the side surface 1c is longer than a path of the light L8 from the generation point GP1 to the side surface 1c. The light L8 is detected by the semiconductor photodetector 10 with a time difference smaller than that of the light L9 relative to the light L1. Reflection attenuation of the light L8 is smaller than reflection attenuation of the light L9. The amount of the detected light L8 detected by the semiconductor photodetector 10 is larger than the amount of the detected light L9.

As illustrated in FIG. 7, the scintillation light includes, for example, a light L10 incident on the end surface 1b from the generation point GP1. The end surface 1b includes a rough surface. The light L10 incident on the end surface 1b at an incidence angle EA12 is reflected and diffused from the end surface 1b toward the side surface 1c. The light L10 is emitted from the side surface 1c. For comparison, FIG. 7 illustrates a path of a light L11 incident on the end surface 1b by a broken line in a configuration in which the end surface 1b is assumed to include a mirror surface. The light L11 incident on the end surface 1b at the incidence angle EA12 is totally reflected by the end surface 1b and travels toward the end surface 1a. Thereafter, the light L11 is repeatedly reflected by the end surfaces 1b and 1a and then is incident on the side surface 1c to be detected by the semiconductor photodetector 10.

Figure 8:
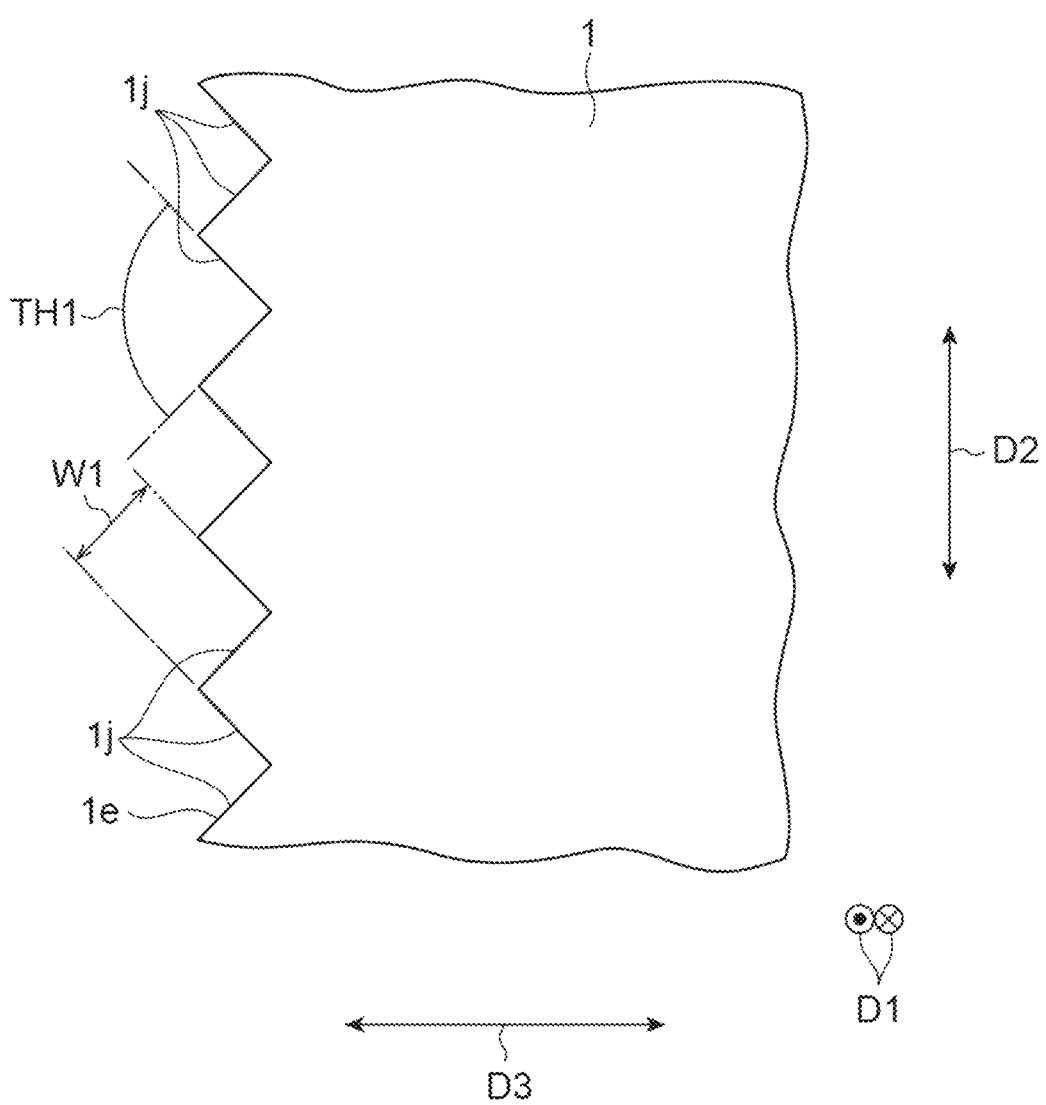
FIG. 8 is a view illustrating an example of an outline shape of a side surface.

As illustrated in FIG. 8, the side surface 1e adjacent to the side surface 1c may include a rough surface. FIG. 8 is a view illustrating an example of an outline shape of the side surface 1e. FIG. 8 illustrates an example of the outline shape of the side surface 1e when the scintillator 1 is viewed in the first direction D1. In the present embodiment, in a configuration in which at least one of the side surfaces 1e and 1f and the end surfaces 1a and 1b includes a rough surface, the side surfaces 1e and 1f and the end surfaces 1a and 1b that include rough surfaces have, for example, an outline shape as illustrated in FIG. 8.

In the configuration in which the side surface 1e includes a rough surface, the side surface 1e has, for example, the triangular wave shape in the cross section. The triangular wave shape in the cross section of the side surface 1e includes, for example, edges 1j. When viewed in the first direction D1, a length W1 of each edge 1j is, for example, about 1.0 to 400 μm. Directions parallel to the edges 1j intersect each other. An angle TH1 at which the edges 1j intersect each other is, for example, about 20 to 160 degrees.

In a configuration in which the side surface 1e includes a rough surface, the side surface 1e has, for example, a triangular wave shape in a cross section when viewed in the second direction D2. When viewed in the second direction D2, a length of each edge 1j is, for example, about 1.0 to 400 μm. The angle at which the edges 1j intersect each other when viewed in the second direction D2 is, for example, about 20 to 160 degrees. When the end surfaces 1*a* and 1*b* and the side surface 1*f* include rough surfaces, the end surfaces 1*a* and 1*b* and the side surface 1*f* have, for example, a triangular wave shape as illustrated in FIG. 8. The end surfaces 1*a* and 1*b* and the side surface 1*f* have a triangular wave shape in a cross section.

At least one of the side surfaces 1*e* and 1*f* and the end surfaces 1*a* and 1*b* includes, for example, a rough surface. Regarding the rough surface, the surface roughness is, for example, 0.5 to 200 μm. When the surface roughness of the side surfaces 1*e* and 1*f* and the end surfaces 1*a* and 1*b*, that include rough surfaces, has a value within the above-described range, the side surfaces 1*e* and 1*f* and the end surfaces 1*a* and 1*b* may not have the triangular wave shape in the cross section. In this specification, the maximum height (Rz) is used as the surface roughness of the surface. The maximum height (Rz) is defined in JIS B 0601: 2001 (ISO 4287: 1997).

In the present embodiment, at least one of the side surfaces 1*e* and 1*f* may include a rough surface, and at least one of the end surfaces 1*a* and 1*b* may include a rough surface. All of the side surfaces 1*e* and 1*f* and the end surfaces 1*a* and 1*b* may include rough surfaces. The side surfaces 1*e* and 1*f* may include mirror surfaces, and at least one of the end surfaces 1*a* and 1*b* may include a rough surface. At least one of the side surfaces 1*e* and 1*f* may include a rough surface, and at end surfaces 1*a* and 1*b* may include mirror surfaces. All of the side surfaces 1*e* and 1*f* and the end surfaces 1*a* and 1*b* may include mirror surfaces.

When at least one of the side surfaces 1*c*, 1*d*, 1*e*, and 1*f* and the end surfaces 1*a* and 1*b* includes, for example, a mirror surface, the surface roughness of the mirror surface is, for example, 0.001 to 0.1 μm. For example, the side surfaces 1*c* and 1*d* include mirror surfaces.

Figure 9:
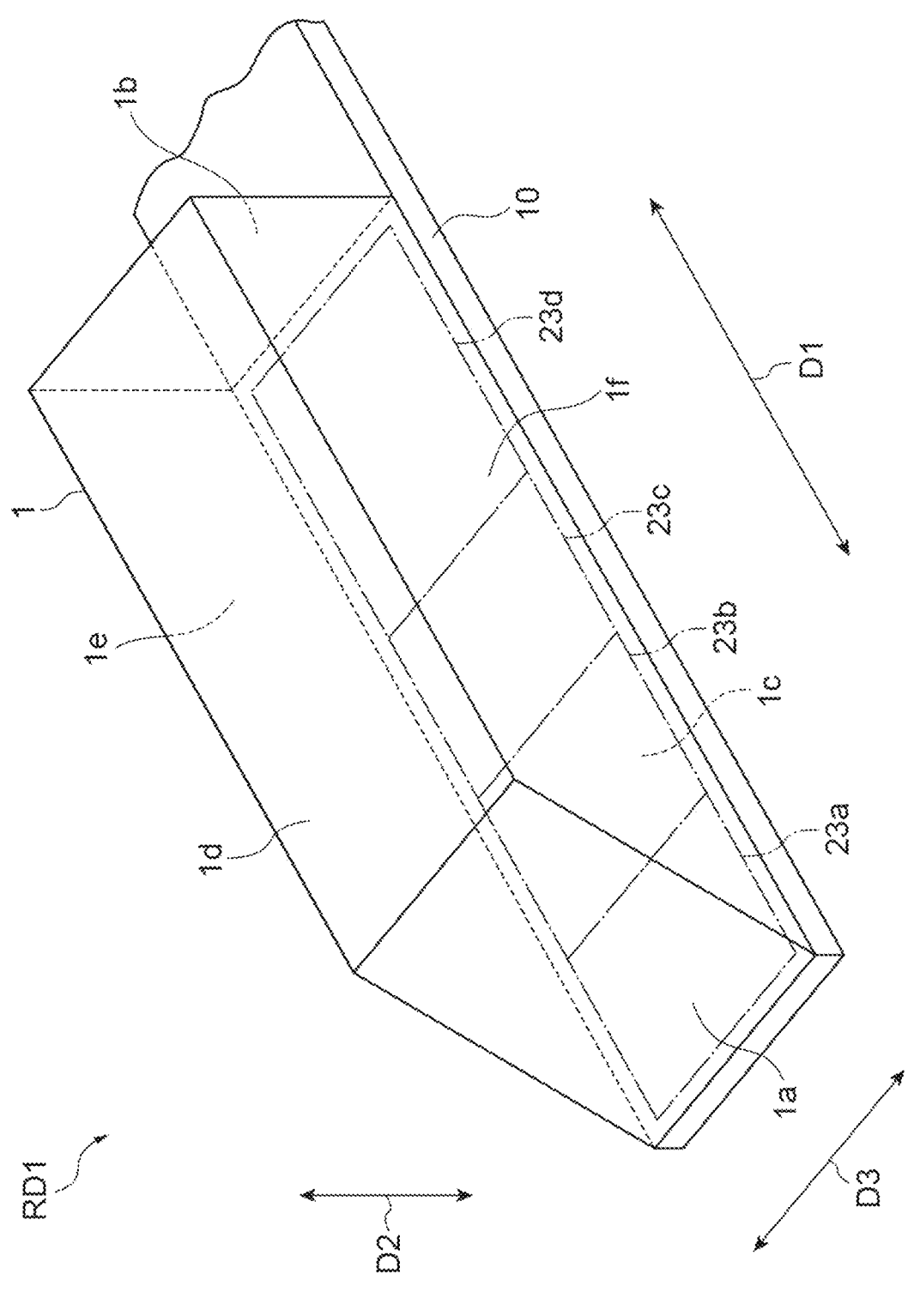
FIG. 9 is a perspective view illustrating a radiation detector according to a first modification example of the first embodiment.
Figure 10:
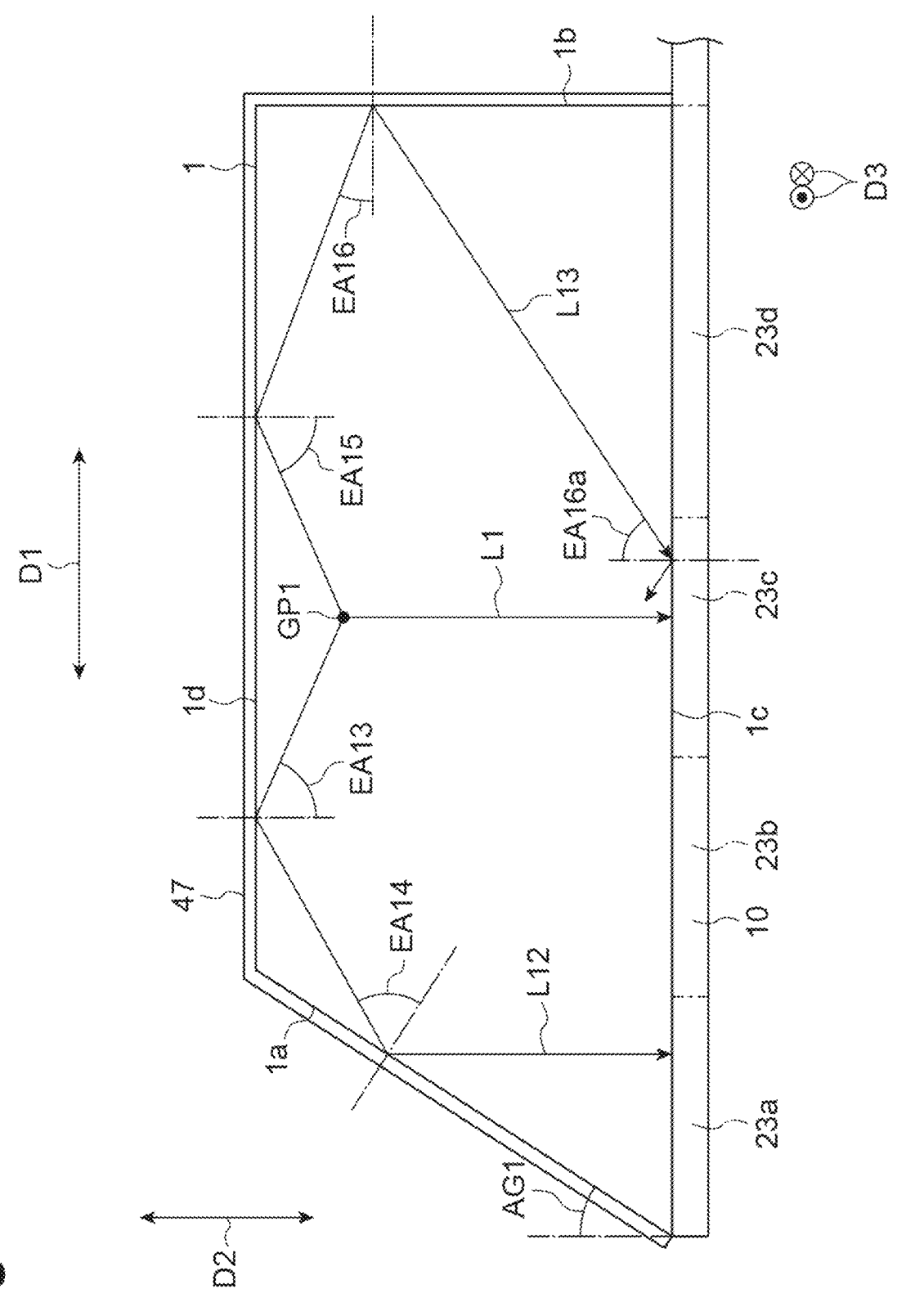
FIG. 10 is a view illustrating paths of some scintillation lights.

A first modification example of the radiation detector RD1 according to the first embodiment will be described with reference to FIGS. 9 and 10. FIG. 9 is a perspective view illustrating a radiation detector RD1 according to the first modification example of the first embodiment. FIG. 10 is a view illustrating paths of some scintillation lights. FIG. 10 illustrates the paths of some scintillation lights when the scintillator 1 is viewed in the third direction D3. The radiation detector RD1 according to the present modification example has the same configuration as the radiation detector RD1 according to the first embodiment except for a configuration of the scintillator 1.

The scintillator 1 according to the present modification example includes a pair of end surfaces 1*a* and 1*b* opposing each other in the first direction D1, a pair of side surfaces 1*c* and 1*d* opposing each other in the second direction D2, and a pair of side surfaces 1*e* and 1*f* opposing each other in the third direction D3. The end surfaces 1*a* and 1*b*, the side surfaces 1*c* and 1*d*, and the side surfaces 1*e* and 1*f* include outer surfaces of the scintillator 1. In the present modification example, unlike the first embodiment, the end surface 1*a* is inclined relative to the second direction D2. The end surface 1*a* is also inclined relative to the first direction D1. That is, the pair of end surfaces 1*a* and 1*b* includes one end surface 1*a* inclined relative to the second direction D2. The end surface 1*b* extends in the second direction D2. When the side surface 1*f* is viewed in the third direction D3, an angle AG1 formed by the end surface 1*a* in the second direction D2 is, for example, 10 to 80 degrees in a clockwise direction. A length of the side surface 1*d* in the first direction D1 is smaller than a length of the side surface 1*c* in the first direction D1. The end surfaces 1*a* and 1*b* each have, for example, a rectangular shape when viewed in the direction orthogonal to the end surfaces 1*a* and 1*b*. The side surfaces 1*c* and 1*d* each have, for example, a rectangular shape when viewed in the direction orthogonal to the side surfaces 1*c* and 1*d*. The scintillator 1 has a rectangular shape when viewed in the first direction D1 and the second direction D2. The first direction D1 is a longitudinal direction of the scintillator 1.

In the present modification example, at least one of the side surfaces 1*e* and 1*f* and the end surfaces 1*a* and 1*b* may include a rough surface. At least one of the side surfaces 1*e* and 1*f* and the end surface 1*b* may include a rough surface. The end surface 1*a* may not include a rough surface. The side surfaces 1*c* and 1*d* include, for example, mirror surfaces. When viewed in the second direction D2, one region including the outlines of the plurality of photodetection regions 23*a*, 23*b*, 23*c*, and 23*d* has an outline shape corresponding to an outline shape of the side surface 1*c*. In the present modification example, the outline shape of the side surface 1*c* is a rectangular shape when viewed in the second direction D2. The one region including the outlines of the plurality of photodetection regions 23*a*, 23*b*, 23*c*, and 23*d* has a rectangular outline shape corresponding to the outline shape of the side surface 1*c*. The photodetection regions 23*a*, 23*b*, 23*c*, and 23*d* have, for example, a rectangular outline shape corresponding to the outline shape of the side surface 1*c*.

As illustrated in FIG. 10, the scintillation light includes, for example, the light L1 directly incident on the side surface 1*c* from the generation point GP1. The scintillation light includes a light L12 in addition to light L1. The light L12 is first incident on the side surface 1*d*, is totally reflected by the side surface 1*d*, and then is incident on the end surface 1*a*. An incidence angle EA13 of the light L12 on the side surface 1*d* is larger than the critical angle on the side surface 1*d*. In the present modification example, the end surface 1*a* is inclined relative to the second direction D2. Therefore, the light L12 reflected by the side surface 1*d* is totally reflected by the end surface 1*a*. The end surface 1*a* is inclined relative to the second direction D2 so that the light L12 tends not to be totally reflected toward the side surface 1*c*. The light L12 totally reflected by the end surface 1*a* is incident on the side surface 1*c*. The light L12 is emitted from the side surface 1*c* and is incident on the photodetection region 23*a*. The light L12 incident on the photodetection region 23*a* is detected by the semiconductor photodetector 10. The light reflectors 47 are disposed on the end surfaces 1*a* and 1*b* and the side surface 1*d*.

The scintillation light includes, for example, a light L13. The light L13 is first incident on the side surface 1*d*, is totally reflected by the side surface 1*d*, and then is incident on the end surface 1*b*. The light L13 is illustrated for comparison with the light L12. A size of an incidence angle EA15 of the light L13 on the side surface 1*d* is the same as a size of the incidence angle EA13 of the light L12 on the side surface 1*d*. The light L13 is totally reflected by the side surface 1*d* and then is incident on the end surface 1*b* at an incidence angle EA16. Therefore, although the light L13 is incident on the side surface 1*d* at the same incidence angle as the light L12, the light L13 tends not to be emitted from the side surface 1*c*. The light L13 incident on the end surface 1*b* is totally reflected by the end surface 1*b* and is incident on the side surface 1*c* at an incidence angle EA16*a*. In the example illustrated in FIG. 10, the incidence angle EA16*a* is larger than the critical angle on the side surface 1*c*. The light L13 is totally reflected by the side surface 1*c*. In the example illustrated in FIG. 10, when the size of the incidence angle EA15 is changed, the light L13 is totally reflected by the end surface 1b and then is incident on the side surface 1c. The scintillation light totally reflected by the end surface 1b is incident on the photodetection region 23c. The scintillation light incident on the photodetection region 23a is detected by the semiconductor photodetector 10.

Figure 11:
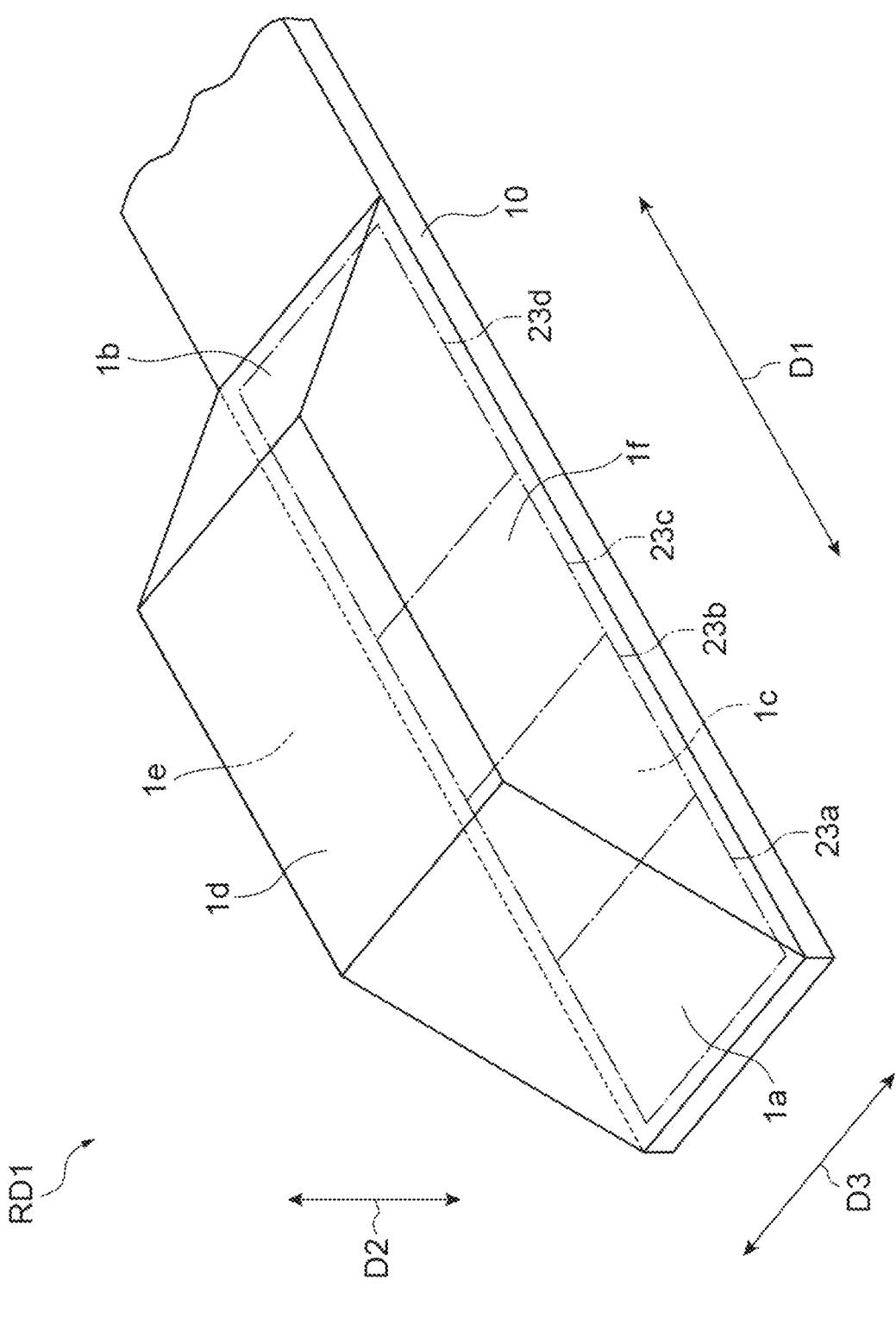
FIG. 11 is a perspective view illustrating a radiation detector according to a second modification example of the first embodiment.

A second modification example of the radiation detector RD1 according to the first embodiment will be described with reference to FIG. 11. FIG. 11 is a perspective view illustrating a radiation detector RD1 according to the second modification example of the first embodiment. The radiation detector RD1 according to the present modification example has the same configuration as the radiation detector RD1 according to the first embodiment except for a configuration of the scintillator 1.

The scintillator 1 according to the present modification example includes a pair of end surfaces 1a and 1b opposing each other in the first direction D1, a pair of side surfaces 1c and 1d opposing each other in the second direction D2, and a pair of side surfaces 1e and 1f opposing each other in the third direction D3. The end surfaces 1a and 1b, the side surfaces 1c and 1d, and the side surfaces 1e and 1f include outer surfaces of the scintillator 1. In the present modification example, unlike the first embodiment, the end surfaces 1a and 1b are inclined relative to the second direction D2. That is, the pair of end surfaces 1a and 1b includes one of the end surfaces 1a and 1b inclined relative to the second direction D2. The end surfaces 1a and 1b are also inclined relative to the first direction D1. When the side surface 1f is viewed in the third direction D3, an angle formed by the end surface 1a relative to the second direction D2 is, for example, 10 to 80 degrees in a clockwise direction. When the side surface 1f is viewed in the third direction D3, an angle formed by the end surface 1b relative to the second direction D2 is, for example, 10 to 80 degrees in a counterclockwise direction. The side surfaces 1e and 1f have, for example, a trapezoidal shape when viewed in the third direction D3. A length of the side surface 1d in the first direction D1 is smaller than a length of the side surface 1c in the first direction D1. The end surfaces 1a and 1b each have, for example, a rectangular shape when viewed in the direction orthogonal to the end surfaces 1a and 1b. The side surfaces 1c and 1d each have, for example, a rectangular shape when viewed in the direction orthogonal to the side surfaces 1c and 1d. The scintillator 1 has, for example, a trapezoidal shape when viewed in the third direction D3. The scintillator 1 has a rectangular shape when viewed in the first direction D1 and the second direction D2. The first direction D1 is a longitudinal direction of the scintillator 1.

In the present modification example, at least one of the side surfaces 1e and 1f and the end surfaces 1a and 1b may include a rough surface. At least one of the side surfaces 1e and 1f may include a rough surface. The end surfaces 1a and 1b may not include a rough surface. The side surfaces 1c and 1d include, for example, mirror surfaces. When viewed in the second direction D2, one region including the outlines of the plurality of photodetection regions 23a, 23b, 23c, and 23d has a shape corresponding to an outline shape of the side surface 1c. In the present modification example, the outline shape of the side surface 1c is a rectangular shape when viewed in the second direction D2. The one region including the outlines of the plurality of photodetection regions 23a, 23b, 23c, and 23d has a rectangular outline shape corresponding to the outline shape of the side surface 1c. The photodetection regions 23a, 23b, 23c, and 23d have, for example, a rectangular outline shape corresponding to the outline shape of the side surface 1c.

When viewed in the third direction D3, the end surfaces 1a and 1b are inclined relative to the second direction D2 so that a scintillation light tends not to be totally reflected toward the side surface 1c. Therefore, a scintillation light incident on the end surface 1a is reflected by the end surface 1a and then is easily incident on the side surface 1c. A scintillation light incident on the end surface 1b is reflected by the end surface 1b and then is easily incident on the side surface 1c.

Figure 12:
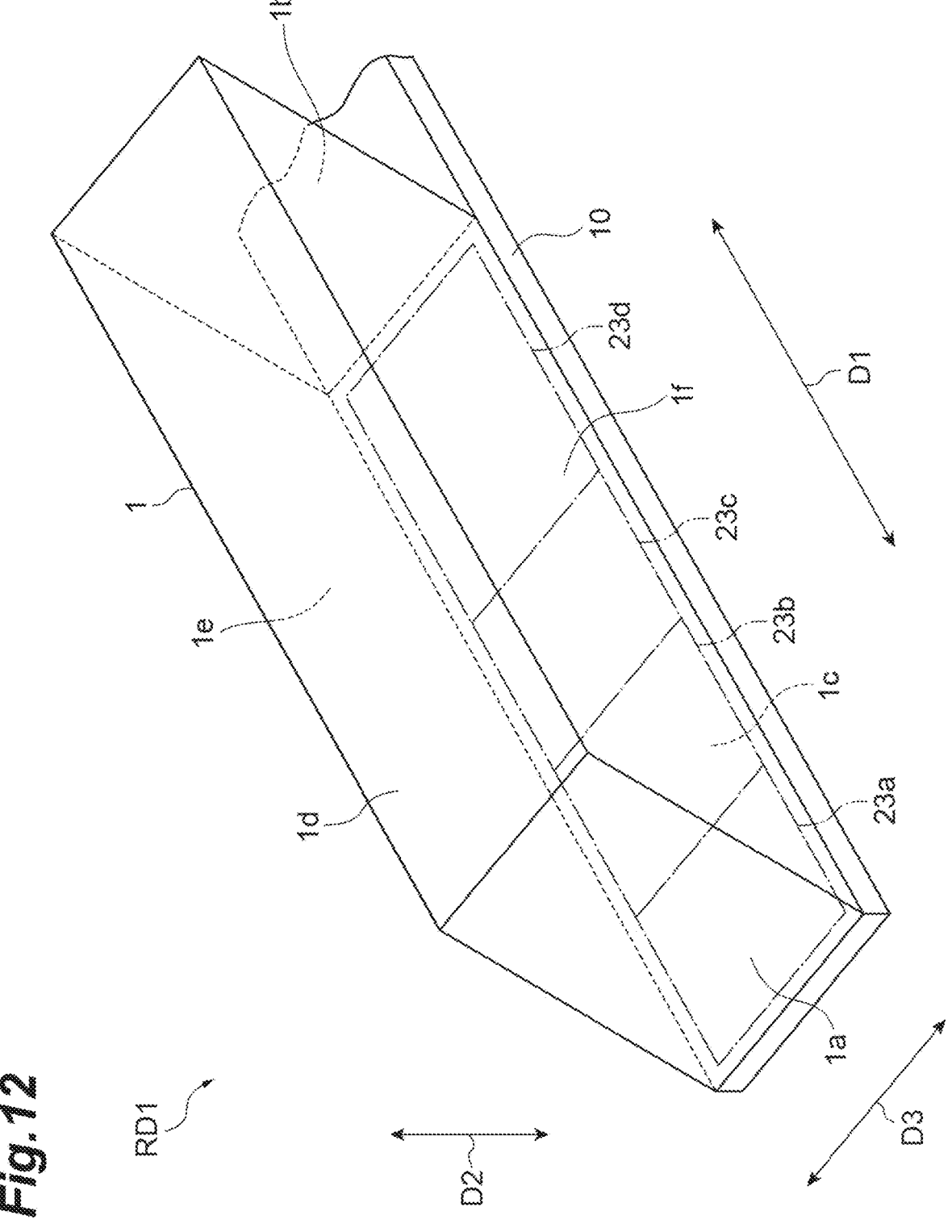
FIG. 12 is a perspective view illustrating a radiation detector according to a third modification example of the first embodiment.
Figure 13:
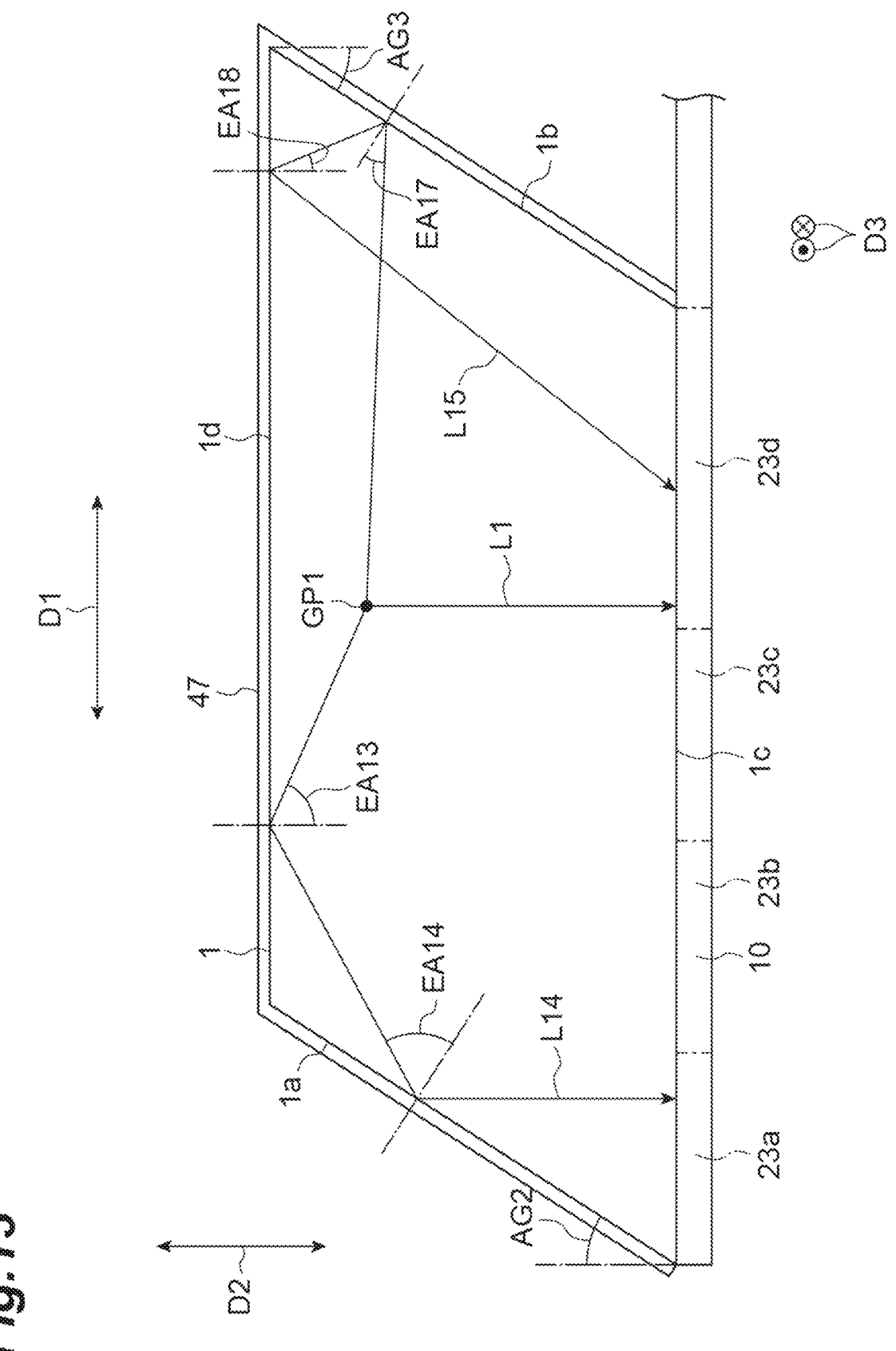
FIG. 13 is a view illustrating paths of some scintillation lights.

A third modification example of the radiation detector RD1 according to the first embodiment will be described with reference to FIGS. 12 and 13. FIG. 12 is a perspective view illustrating a radiation detector RD1 according to the third modification example of the first embodiment. FIG. 13 is a view illustrating paths of some scintillation lights. FIG. 13 illustrates the paths of some scintillation lights when the scintillator 1 is viewed in the third direction D3. The radiation detector RD1 according to the present modification example has the same configuration as the radiation detector RD1 according to the first embodiment except for a configuration of the scintillator 1.

The scintillator 1 according to the present modification example includes a pair of end surfaces 1a and 1b opposing each other in the first direction D1, a pair of side surfaces 1c and 1d opposing each other in the second direction D2, and a pair of side surfaces 1e and 1f opposing each other in the third direction D3. The end surfaces 1a and 1b, the side surfaces 1c and 1d, and the side surfaces 1e and 1f include outer surfaces of the scintillator 1. In the present modification example, unlike the first embodiment, the end surfaces 1a and 1b are inclined relative to the second direction D2. That is, the pair of end surfaces 1a and 1b includes one of the end surfaces 1a and 1b inclined relative to the second direction D2. The end surfaces 1a and 1b are also inclined relative to the first direction D1. When the side surface 1f is viewed in the third direction D3, an angle AG2 formed by the end surface 1a in the second direction D2 is, for example, 10 to 80 degrees in a clockwise direction. When the side surface 1f is viewed in the third direction D3, an angle AG3 formed by the end surface 1b in the second direction D2 is, for example, 10 to 80 degrees in a clockwise direction. The side surfaces 1e and 1f have, for example, a parallelogrammatic shape when viewed in the third direction D3. A length of the side surface 1d in the first direction D1 is substantially equal to a length of the side surface 1c in the first direction D1. The end surfaces 1a and 1b each have, for example, a rectangular shape when viewed in the direction orthogonal to the end surfaces 1a and 1b. The side surfaces 1c and 1d each have, for example, a rectangular shape when viewed in the direction orthogonal to the side surfaces 1c and 1d. The scintillator 1 has, for example, a parallelogrammatic shape when viewed in the third direction D3. The scintillator 1 has a rectangular shape when viewed in the first direction D1 and the second direction D2. The first direction D1 is a longitudinal direction of the scintillator 1.

In the present modification example, at least one of the side surfaces 1e and 1f and the end surfaces 1a and 1b may include a rough surface. At least one of the side surfaces 1e and 1f may include a rough surface. The end surfaces 1a and 1b may not include a rough surface. The side surfaces 1c and 1d include, for example, mirror surfaces. When viewed in the second direction D2, one region including the outlines of the plurality of photodetection regions 23a, 23b, 23c, and 23d has an outline shape corresponding to an outline shape of the side surface 1c. In the present modification example, the outline shape of the side surface 1c is a rectangular shape when viewed in the second direction D2. The one region including the outlines of the plurality of photodetection regions 23a, 23b, 23c, and 23d has a rectangular outline shape corresponding to the outline shape of the side surface 1c. The photodetection regions 23a, 23b, 23c, and 23d have, for example, a rectangular outline shape corresponding to the outline shape of the side surface 1c.

As illustrated in FIG. 13, the scintillation light includes, for example, the light L1 directly incident on the side surface 1c from the generation point GP1. The scintillation light includes a light L14 in addition to light L1. The light L14 is first incident on the side surface 1d at the incidence angle EA13, is totally reflected by the side surface 1d, and then is incident on the end surface 1a at an incidence angle EA14. The end surface 1a of the present modification example has the same inclination as the end surface 1a of the first modification example of the first embodiment (see FIG. 10). The light L14 travels through the same path as the light L12 of the first modification example of the first embodiment. Therefore, the light L14 is easily incident on the side surface 1c. The light L14 is emitted from the side surface 1c and is incident on the photodetection region 23a. The light L14 incident on the photodetection region 23a is detected by the semiconductor photodetector 10. The light reflectors 47 are disposed on the end surfaces 1a and 1b and the side surface 1d.

The scintillation light includes, for example, a light L15. The light L15 is first incident on the end surface 1b at an incidence angle EA17. In the present modification example, the end surface 1b is inclined relative to the second direction D2. The light L15 is totally reflected by the end surface 1b. The light L15 reflected by the end surface 1b is incident on the side surface 1d at an incidence angle EA18. The light L15 is totally reflected by the side surface 1d and is incident on the side surface 1c. The end surface 1b is inclined relative to the second direction D2 so that the light L15 is easily incident on the side surface 1c. The light L15 is emitted from the side surface 1c and is detected by the semiconductor photodetector 10.

Figure 14:
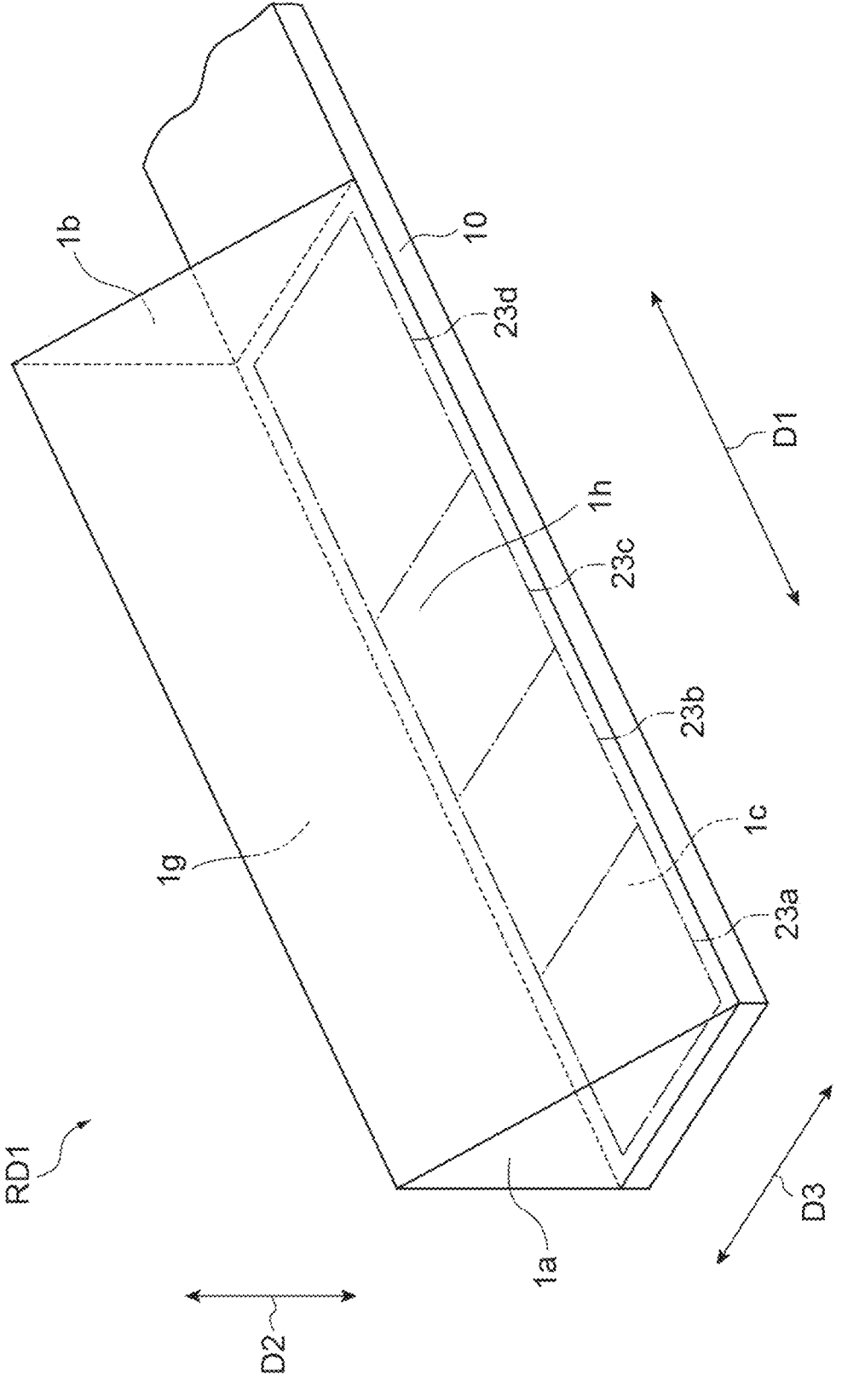
FIG. 14 is a perspective view illustrating a radiation detector according to a fourth modification example of the first embodiment.
Figure 15:
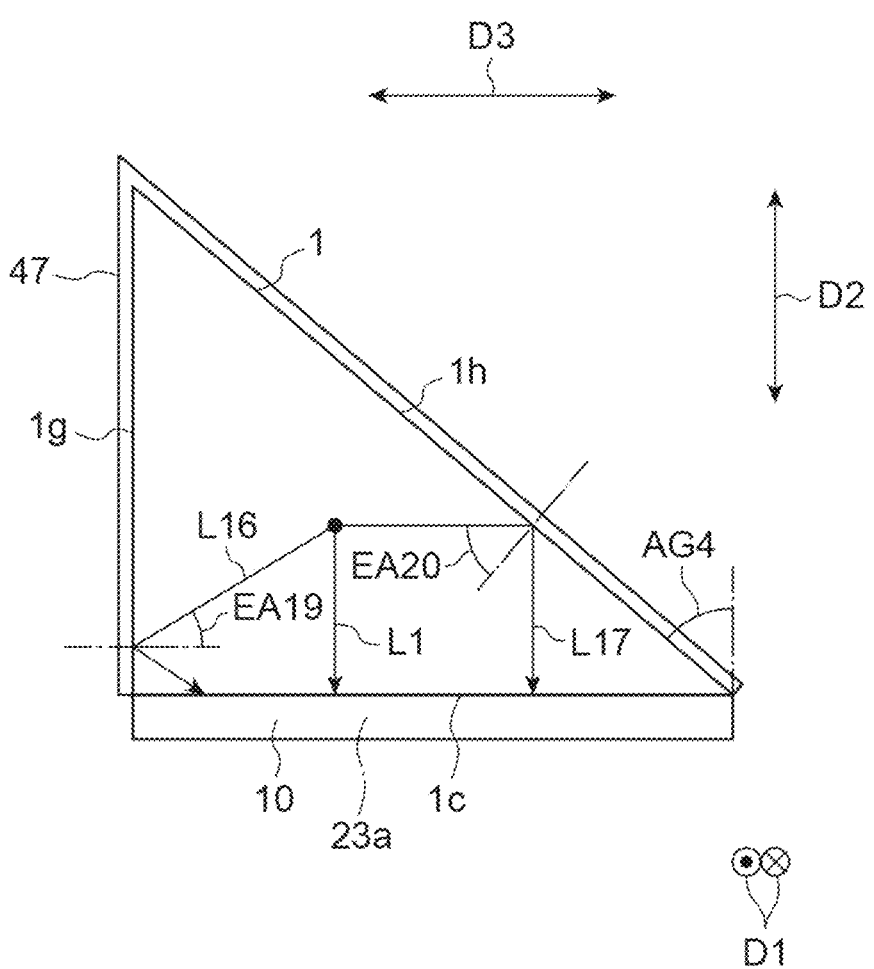
FIG. 15 is a view illustrating paths of some scintillation lights.

A fourth modification example of the radiation detector RD1 according to the first embodiment will be described with reference to FIGS. 14 and 15. FIG. 14 is a perspective view illustrating a radiation detector RD1 according to the fourth modification example of the first embodiment. FIG. 15 is a view illustrating paths of some scintillation lights. FIG. 15 illustrates the paths of some scintillation lights when the scintillator 1 is viewed in the first direction D1. The radiation detector RD1 according to the present modification example has the same configuration as the radiation detector RD1 according to the first embodiment except for a configuration of the scintillator 1.

The scintillator 1 according to the present modification example includes a pair of end surfaces 1a and 1b opposing each other in the first direction D1 and side surfaces 1c, 1g, and 1h extending in the first direction D1 to couple the end surfaces 1a and 1b. The end surfaces 1a and 1b and the side surfaces 1c, 1g, and 1h include outer surfaces of the scintillator 1. The end surfaces 1a and 1b define both end surfaces of the scintillator 1 in the first direction D1. In the present modification example, the end surfaces 1a and 1b extend in the second direction D2 and the third direction D3. The side surfaces 1c and 1g are adjacent to each other. The side surfaces 1c and 1h are adjacent to each other. The side surfaces 1g and 1h are adjacent to each other. The first direction D1 is a longitudinal direction of the scintillator 1. In the present modification example, a direction perpendicular to the side surface 1c coincides with the second direction D2, and a direction parallel to the side surface 1c coincides with the third direction D3. In the present embodiment and the modification example according to the present embodiment, for example, when the side surface 1c includes one side surface, the side surfaces 1g and 1h include other side surfaces.

When viewed in the first direction D1, the side surface 1g extends, for example, in the second direction D2. When viewed in the first direction D1, the side surface 1h is inclined relative to the third direction D3, for example. When the end surface 1a is viewed in the first direction D1, an angle AG4 formed by the side surface 1h in the second direction D2 is, for example, 10 to 80 degrees in a counterclockwise direction. The end surfaces 1a and 1b have, for example, a triangular shape when viewed in the first direction D1. The side surfaces 1c, 1g, and 1h each have, for example, a rectangular shape when viewed in the direction orthogonal to the side surfaces 1c, 1g, and 1h. The scintillator 1 has, for example, a triangular shape when viewed in the first direction D1. The scintillator 1 has, for example, a rectangular shape when viewed in the second direction D2 and the third direction D3.

In the present modification example, at least one of the side surfaces 1g and 1h and the end surfaces 1a and 1b may include a rough surface. At least one of the side surface 1g and the end surfaces 1a and 1b may include a rough surface. The side surface 1h may not include a rough surface. At least one of the end surfaces 1a and 1b may include a rough surface. All of the side surface 1g and the end surfaces 1a and 1b may include rough surfaces. The side surface 1c includes, for example, a mirror surface. The side surface 1h is inclined relative to the second direction D2 so that a scintillation light tends not to be totally reflected toward the side surface 1c. Of scintillation lights, a light incident on the side surface 1h and reflected by the side surface 1h tends to be incident on the side surface 1c, for example. When viewed in the second direction D2, one region including the outlines of the plurality of photodetection regions 23a, 23b, 23c, and 23d has a shape corresponding to an outline shape of the side surface 1c. In the present modification example, the outline shape of the side surface 1c is, for example, a rectangular shape when viewed in the second direction D2. The one region including the outlines of the plurality of photodetection regions 23a, 23b, 23c, and 23d has a rectangular outline shape corresponding to the outline shape of the side surface 1c. The photodetection regions 23a, 23b, 23c, and 23d have, for example, a rectangular outline shape corresponding to the outline shape of the side surface 1c.

A length of the scintillator 1 in the first direction D1 is longer than a length of the scintillator 1 in the second direction D2. A length of the side surface 1c in the first direction D1 is longer than a width of the side surface 1c in the third direction D3. The length of the scintillator 1 in the first direction D1 is, for example, about 20 mm. The length of the scintillator 1 in the second direction D2 is, for example, about 4 mm. A length of the scintillator 1 in the third direction D3 is, for example, about 4 mm.

As illustrated in FIG. 15, the scintillation light includes, for example, the light L1 directly incident on the side surface 1c from the generation point GP1. The scintillation lights include a light L16 in addition to the light L1, and for example, the light L16 is first incident on the side surface 1g at the incidence angle EA19, is totally reflected by the side surface 1g, and then is incident on the side surface 1c. The light L16 is emitted from the side surface 1c. The light L16 emitted from the side surface 1c is incident on any one of the photodetection regions 23a, 23b, 23c, and 23d and is detected by the semiconductor photodetector 10. For example, when the scintillation light is generated in a region of the scintillator corresponding to the photodetection region 23a, for example, of the plurality of photodetection regions 23a, 23b, 23c, and 23d, the photodetection region 23a detects the most scintillation lights. The light reflectors 47 are disposed on the side surfaces 1g and 1h.

The scintillation light includes, for example, alight L17. The light L17 is first incident on the side surface 1h at an incidence angle EA20, is reflected by the side surface 1h, and then is incident on the side surface 1c. The side surface 1h is inclined relative to the second direction D2. Therefore, the light L17 is totally reflected by the side surface 1h and is incident on the side surface 1c. The side surface 1h is inclined relative to the second direction D2 so that the light L17 tends not to be totally reflected toward the side surface 1c. The light L17 is emitted from the side surface 1c and is incident on any one of the photodetection regions 23a, 23b, 23c, and 23d.

Figure 16:
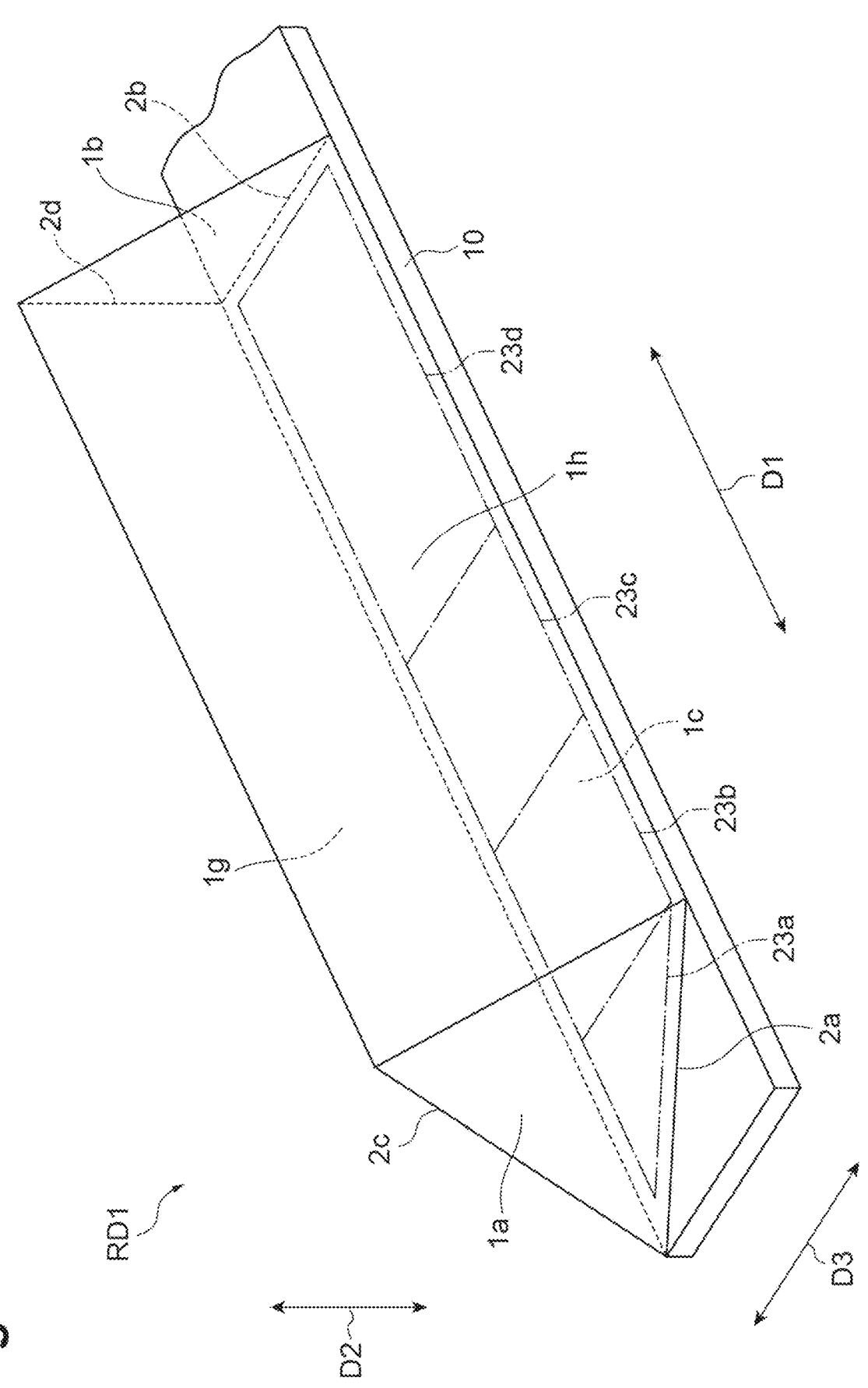
FIG. 16 is a perspective view illustrating a radiation detector according to a fifth modification example of the first embodiment.
Figure 17:
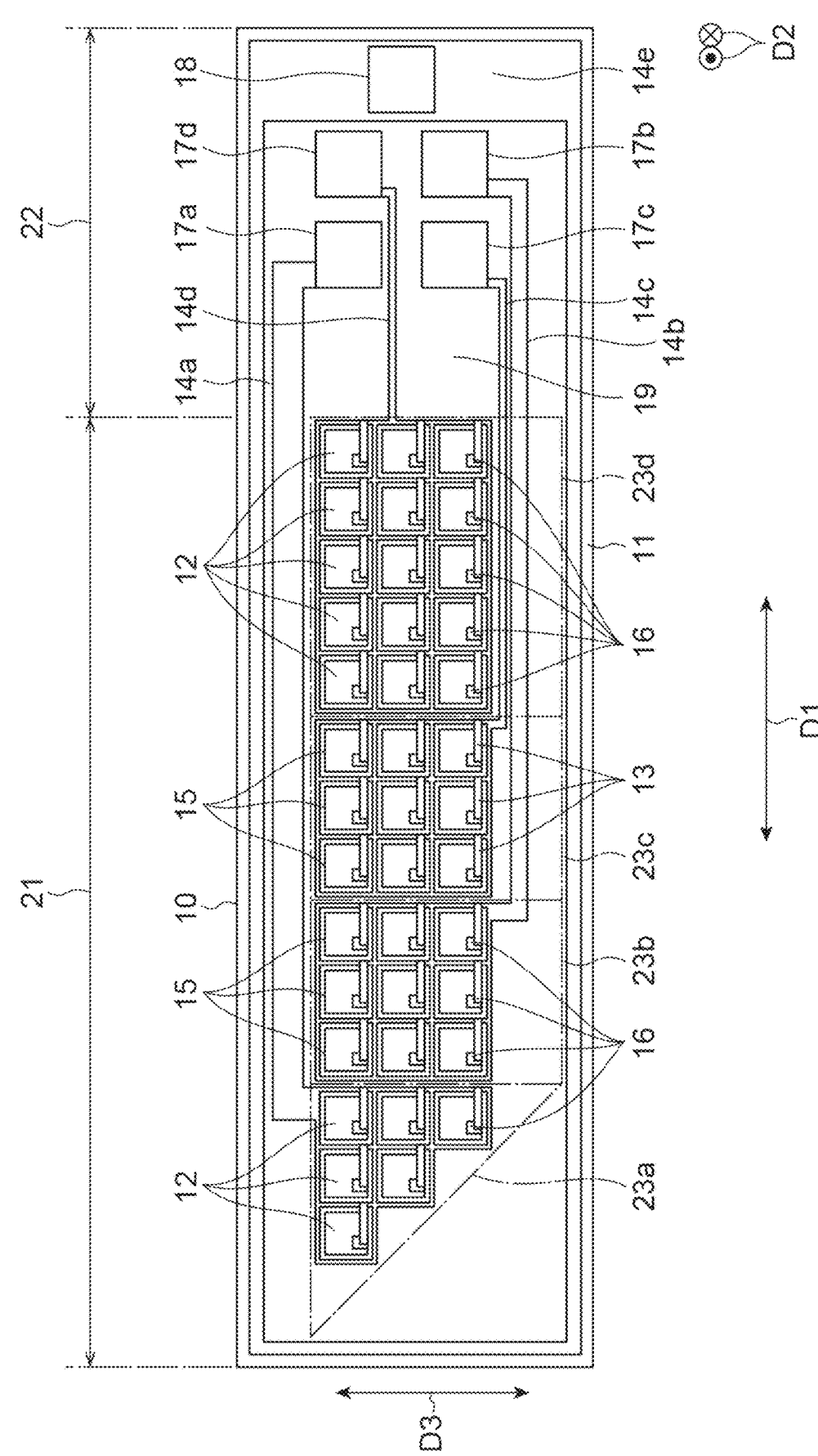
FIG. 17 is a plan view illustrating a semiconductor photodetector.

A fifth modification example of the radiation detector RD1 according to the first embodiment will be described with reference to FIGS. 16 and 17. FIG. 16 is a perspective view illustrating a radiation detector RD1 according to the fifth modification example of the first embodiment. FIG. 17 is a plan view illustrating a semiconductor photodetector. The radiation detector RD1 according to the present modification example has the same configuration as the radiation detector RD1 according to the first embodiment except for configurations of the scintillator 1 and the photodetection region 23a.

As illustrated in FIG. 16, the scintillator 1 according to the present modification example includes a pair of end surfaces 1a and 1b opposing each other in the first direction D1 and side surfaces 1c, 1g, and 1h extending in the first direction D1 to couple the end surfaces 1a and 1b. The end surfaces 1a and 1b and the side surfaces 1c, 1g, and 1h include outer surfaces of the scintillator 1. The end surfaces 1a and 1b define both end surfaces of the scintillator 1 in the first direction D1. In the present modification example, unlike the fourth modification example of the first embodiment, the end surface 1a is inclined relative to the second direction D2. That is, the pair of end surfaces 1a and 1b includes one end surface 1a inclined relative to the second direction D2. The end surface 1a is also inclined relative to the first direction D1. The end surface 1b extends in the second direction D2. The side surfaces 1c and 1g are adjacent to each other. The side surfaces 1c and 1h are adjacent to each other. The side surfaces 1g and 1h are adjacent to each other. The first direction D1 is a longitudinal direction of the scintillator 1. In the present modification example, a direction perpendicular to the side surface 1c coincides with the second direction D2, and a direction parallel to the side surface 1c coincides with the third direction D3.

When viewed in the first direction D1, the side surface 1g extends, for example, in the second direction D2. When the end surface 1a is viewed in the first direction D1, the side surface 1h forms, for example, an angle of 10 to 80 degrees in a counterclockwise direction relative to the second direction D2. The end surfaces 1a and 1b have, for example, a triangular shape when viewed in the first direction D1. The side surfaces 1c and 1h each have, for example, a rectangular shape when viewed in the direction orthogonal to the side surfaces 1c and 1h. The scintillator 1 has, for example, a triangular shape when viewed in the first direction D1.

Of a pair of edges 2a and 2b of the side surface 1c in the first direction D1, the edge 2a on the end surface 1a side forms, for example, an angle of 10 to 80 degrees in a counterclockwise direction relative to the third direction D3, when viewed in the second direction D2. When viewed in the second direction D2, the edge 2b on the end surface 1b side extends, for example, in the third direction D3.

Of a pair of edges 2c and 2d of the side surface 1g in the first direction D1, the edge 2d on the end surface 1b side extends in the second direction D2, when viewed in the third direction D3. When the side surface 1g is viewed in the third direction D3, the edge 2c on the end surface 1a side forms, for example, an angle of 10 to 80 degrees in a counterclockwise direction relative to the second direction D2.

A length of the scintillator 1 in the first direction D1 is longer than a length of the scintillator 1 in the second direction D2. A length of the side surface 1c in the first direction D1 is longer than a width of the side surface 1c in the third direction D3. At least one of the side surfaces 1g and 1h and the end surfaces 1a and 1b may include a rough surface. At least one of the side surface 1g and the end surface 1b may include a rough surface. The side surface 1h and the end surface 1b may not include a rough surface. The side surface 1c includes, for example, a mirror surface.

As illustrated in FIG. 17, when viewed in the second direction D2, one region including the outlines of the plurality of photodetection regions 23a, 23b, 23c, and 23d has a shape corresponding to an outline shape of the side surface 1c. In the present modification example, when viewed in the second direction D2, the outline shape of the side surface 1c is rectangular, and the one region including the outlines of the plurality of photodetection regions 23a, 23b, 23c, and 23d has a rectangular outline shape corresponding to the outline shape of the side surface 1c. The photodetection region 23a has, for example, a triangular outline shape corresponding to the outline shape of the side surface 1c. The photodetection regions 23b, 23c, and 23d have, for example, a rectangular outline shape.

The photodetection regions 23a, 23b, 23c, and 23d are disposed in the first direction D1, for example. In the present embodiment, the photodetection region 23a, the photodetection region 23b, the photodetection region 23c, and the photodetection region 23d are disposed in this order. The photodetection region 23d is closer to the portion 22 than the photodetection region 23a, the photodetection region 23b, and the photodetection region 23c. The photodetection region 23c is closer to the portion 22 than the photodetection region 23a and the photodetection region 23b. The photodetection region 23b is closer to the portion 22 than the photodetection region 23a. In the present modification example, a width of the conductive wire 14a is larger than any widths of the conductive wires 14b, 14c, and 14d. The width of the conductive wire 14b is larger than any widths of the conductive wires 14c and 14d. The width of the conductive wire 14c is larger than the width of the conductive wire 14d. For example, the conductive wire 14a and the conductive wires 14b and 14c extend between both ends of the semiconductor substrate 11 in the third direction D3 and the photodetection regions 23a, 23b, 23c, and 23d, when viewed in the second direction D2. When viewed in the second direction D2, the conductive wire 14d is disposed, for example, between the conductive wire 14a and the conductive wires 14b and 14c. The conductive wires 14a, 14b, 14c, and 14d extend in the first direction D1.

In the present modification example, the end surface 1a is inclined relative to both the second direction D2 and the first direction D1 so that a scintillation light tends not to be totally reflected toward the side surface 1c. Of scintillation lights, a light incident on the end surface 1a and reflected by the end surface 1a tends to be incident on the side surface 1c. The side surface 1h is inclined relative to the second direction D2 so that a scintillation light tends to be totally reflected toward the side surface $1c$. Of scintillation lights, a light incident on the side surface $1h$ and reflected by the side surface $1h$ tends to be incident on the side surface $1c$.

Figure 18:
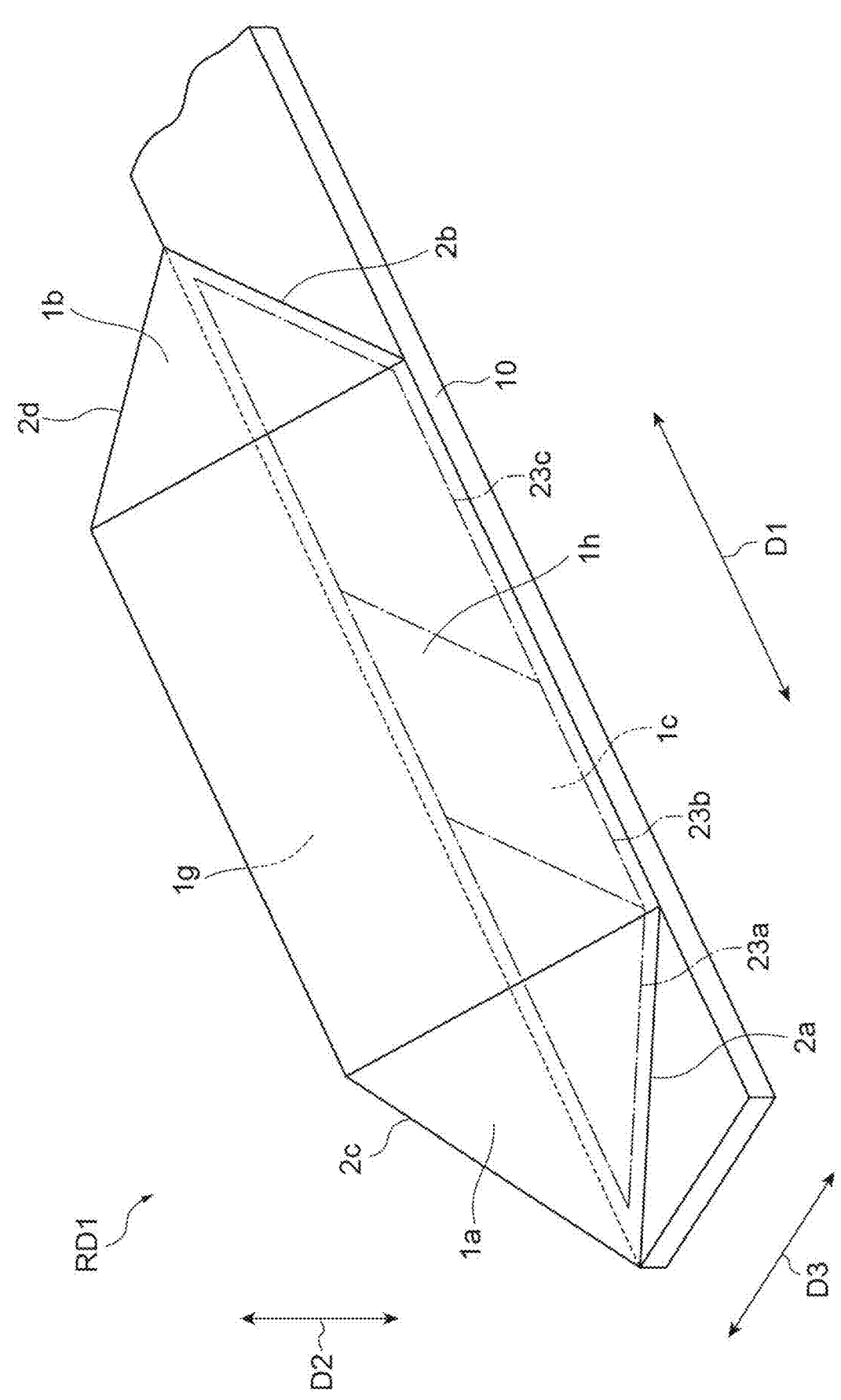
FIG. 18 is a perspective view illustrating a radiation detector according to a sixth modification example of the first embodiment.
Figure 19:
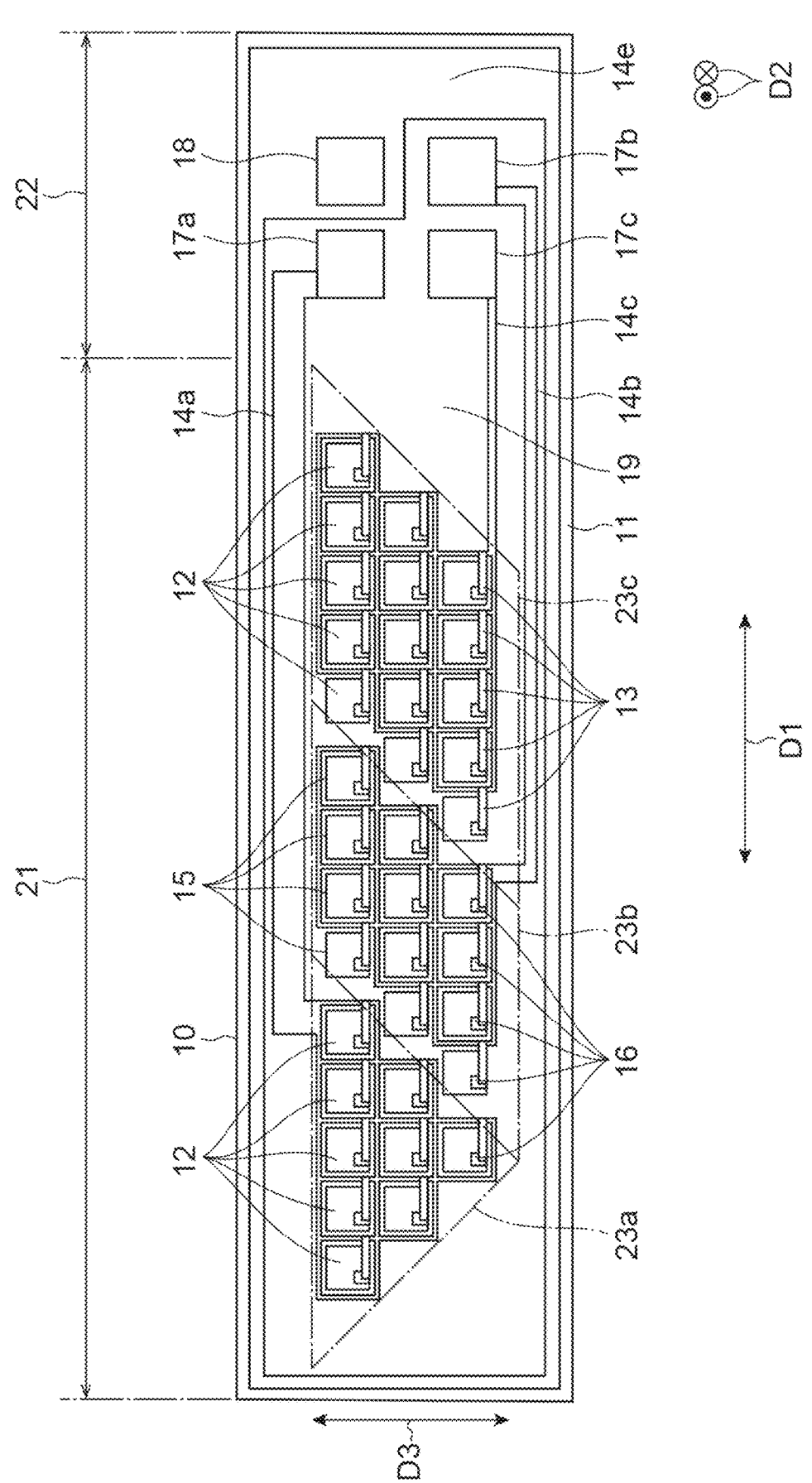
FIG. 19 is a plan view illustrating a semiconductor photodetector.

A sixth modification example of the radiation detector RD1 according to the first embodiment will be described with reference to FIGS. 18 and 19. FIG. 18 is a perspective view illustrating a radiation detector RD1 according to the sixth modification example of the first embodiment. FIG. 19 is a plan view illustrating a semiconductor photodetector. The radiation detector RD1 according to the present modification example has the same configuration as the radiation detector RD1 according to the first embodiment except for configurations of the scintillator 1 and the photodetection regions $23a$, $23b$, and $23c$.

The scintillator 1 according to the present modification example includes a pair of end surfaces $1a$ and $1b$ opposing each other in the first direction D1 and side surfaces $1c$, $1g$, and $1h$ extending in the first direction D1 to couple the end surfaces $1a$ and $1b$. The end surfaces $1a$ and $1b$ and the side surfaces $1c$, $1g$, and $1h$ include outer surfaces of the scintillator 1. The end surfaces $1a$ and $1b$ define both end surfaces of the scintillator 1 in the first direction D1. In the present modification example, the end surfaces $1a$ and $1b$ are inclined relative to the second direction D2. That is, the pair of end surfaces $1a$ and $1b$ includes one of the end surfaces $1a$ and $1b$ inclined relative to the second direction D2. The side surfaces $1c$ and $1g$ are adjacent to each other. The side surfaces $1c$ and $1h$ are adjacent to each other. The side surfaces $1g$ and $1h$ are adjacent to each other. The first direction D1 is a longitudinal direction of the scintillator 1. In the present modification example, a direction perpendicular to the side surface $1c$ coincides with the second direction D2, and a direction parallel to the side surface $1c$ coincides with the third direction D3.

When viewed in the first direction D1, the side surface $1g$ extends, for example, in the second direction D2. When the end surface $1a$ is viewed in the first direction D1, the side surface $1h$ forms, for example, an angle of 10 to 80 degrees in a counterclockwise direction relative to the second direction D2. The end surfaces $1a$ and $1b$ each have, for example, a triangular shape when viewed in the direction orthogonal to the end surfaces $1a$ and $1b$. The side surface $1h$ has, for example, a rectangular shape when viewed in a direction orthogonal to this surface. The scintillator 1 has, for example, a triangular shape when viewed in the first direction D1.

Of a pair of edges $2a$ and $2b$ of the side surface $1c$ in the first direction D1, the edge $2a$ on the end surface $1a$ side forms, for example, an angle of 10 to 80 degrees in a counterclockwise direction relative to the third direction D3, when viewed in the second direction D2. When viewed in the second direction D2, the edge $2b$ on the end surface $1b$ side forms, for example, an angle of 10 to 80 degrees in a clockwise direction relative to the third direction D3.

When the side surface $1g$ is viewed in the third direction D3, of the pair of edges $2c$ and $2d$ of the side surface $1g$ in the first direction D1, the edge $2c$ on the end surface $1a$ side forms, for example, an angle of 10 to 80 degrees in a counterclockwise direction relative to the second direction D2. When the side surface $1g$ is viewed in the third direction D3, the edge $2d$ on the end surface $1b$ side forms, for example, an angle of 10 to 80 degrees in a clockwise direction relative to the second direction D2. When viewed in the third direction D3, the side surface $1g$ has, for example, a trapezoidal shape, and a distance between the edge $2c$ and the edge $2d$ decreases as a distance from the side surface $1c$ increases. The side surface $1h$ has, for example, a rectangular shape when viewed in the third direction D3.

A length of the scintillator 1 in the first direction D1 is longer than a length of the scintillator 1 in the second direction D2. In the present modification example, a length of the side surface $1c$ in the first direction D1 is longer than a width of the side surface $1c$ in the third direction D3. When viewed in the second direction D2, the side surface $1c$ has, for example, a trapezoidal shape, and a distance between the edge $2a$ and the edge $2b$ decreases as a distance from the side surface $1g$ increases.

In the present modification example, for example, three photodetection regions $23a$, $23b$, and $23c$ are disposed in the portion 21. In the portion 21, for example, the three conductive wires $14a$, $14b$, and $14c$ and the conductive wire $14e$ are disposed. The plurality of electrodes $17a$, $17b$, and $17c$ and the electrode 18 are disposed in the portion 22. The electrodes $17a$, $17b$, and $17c$ are electrically connected in parallel with the plurality of quenching resistors 13 included in the corresponding photodetection regions $23a$, $23b$, and $23c$ through the conductive wires $14a$, $14b$, and $14c$, respectively. The electrode $17a$ is connected to the photodetection region $23a$ through the conductive wire $14a$. The electrode $17b$ is connected to the photodetection region $23b$ through the conductive wire $14b$. The electrode $17c$ is connected to the photodetection region $23c$ through the conductive wire $14c$. The other of the anode or the cathode of each of the plurality of avalanche photodiodes 12 is electrically connected in parallel with the electrode 18 through the conductive wire $14e$.

When viewed in the second direction D2, one region including outlines of the plurality of photodetection regions $23a$, $23b$, and $23c$ has a shape corresponding to an outline shape of the side surface $1c$. In the present modification example, the outline shape of the side surface $1c$ is a trapezoidal shape when viewed in the second direction D2. The one region including the outlines of the plurality of photodetection regions $23a$, $23b$, and $23c$ has a trapezoidal outline shape corresponding to the outline shape of the side surface $1c$. When viewed in the second direction D2, the photodetection regions $23a$, $23b$, and $23c$ have an outline shape corresponding to the outline shape of the side surface $1c$. The photodetection region $23a$ has, for example, a triangular outline shape corresponding to the outline shape of the side surface $1c$. The photodetection regions $23b$ and $23c$ have, for example, a parallelogrammatic outline shape.

The photodetection regions $23a$, $23b$, and $23c$ are disposed in the first direction D1, for example. In the present modification example, the photodetection region $23a$, the photodetection region $23b$, and the photodetection region $23c$ are disposed in this order. The photodetection region $23c$ is closer to the portion 22 than the photodetection region $23a$ and the photodetection region $23b$. The photodetection region $23b$ is closer to the portion 22 than the photodetection region $23a$. In the present modification example, a width of the conductive wire $14a$ is larger than any widths of the conductive wires $14b$ and $14c$. The width of the conductive wire $14b$ is larger than the width of the conductive wire $14c$. For example, the conductive wire $14a$ and the conductive wires $14b$ and $14c$ extend between both ends of the semiconductor substrate 11 in the third direction D3 and the photodetection regions $23a$, $23b$, and $23c$, when viewed in the second direction D2. The conductive wires $14a$, $14b$, and $14c$ extend in the first direction D1.

In the present modification example, the end surfaces $1a$ and $1b$ are inclined relative to both the second direction D2 and the first direction D1 so that a scintillation light tends to be totally reflected toward the side surface 1*c*. Of scintillation lights, a light incident on the end surface 1*a* and reflected by the end surface 1*a* tends to be incident on the side surface 1*c*. The light incident on the end surface 1*b* and reflected by the end surface 1*b* tends to be incident on the side surface 1*c*. The side surface 1*h* is inclined relative to the second direction D2 so that a scintillation light tends to be totally reflected toward the side surface 1*c*. Of scintillation lights, a light incident on the side surface 1*h* and reflected by the side surface 1*h* tends to be incident on the side surface 1*c*. In the present modification example, at least one of the side surfaces 1*g* and 1*h* and the end surfaces 1*a* and 1*b* may include a rough surface. Only the side surface 1*g* may include a rough surface. The side surface 1*h* and the end surfaces 1*a* and 1*b* may not include rough surfaces. The side surface 1*c* includes, for example, a mirror surface.

Figure 20:
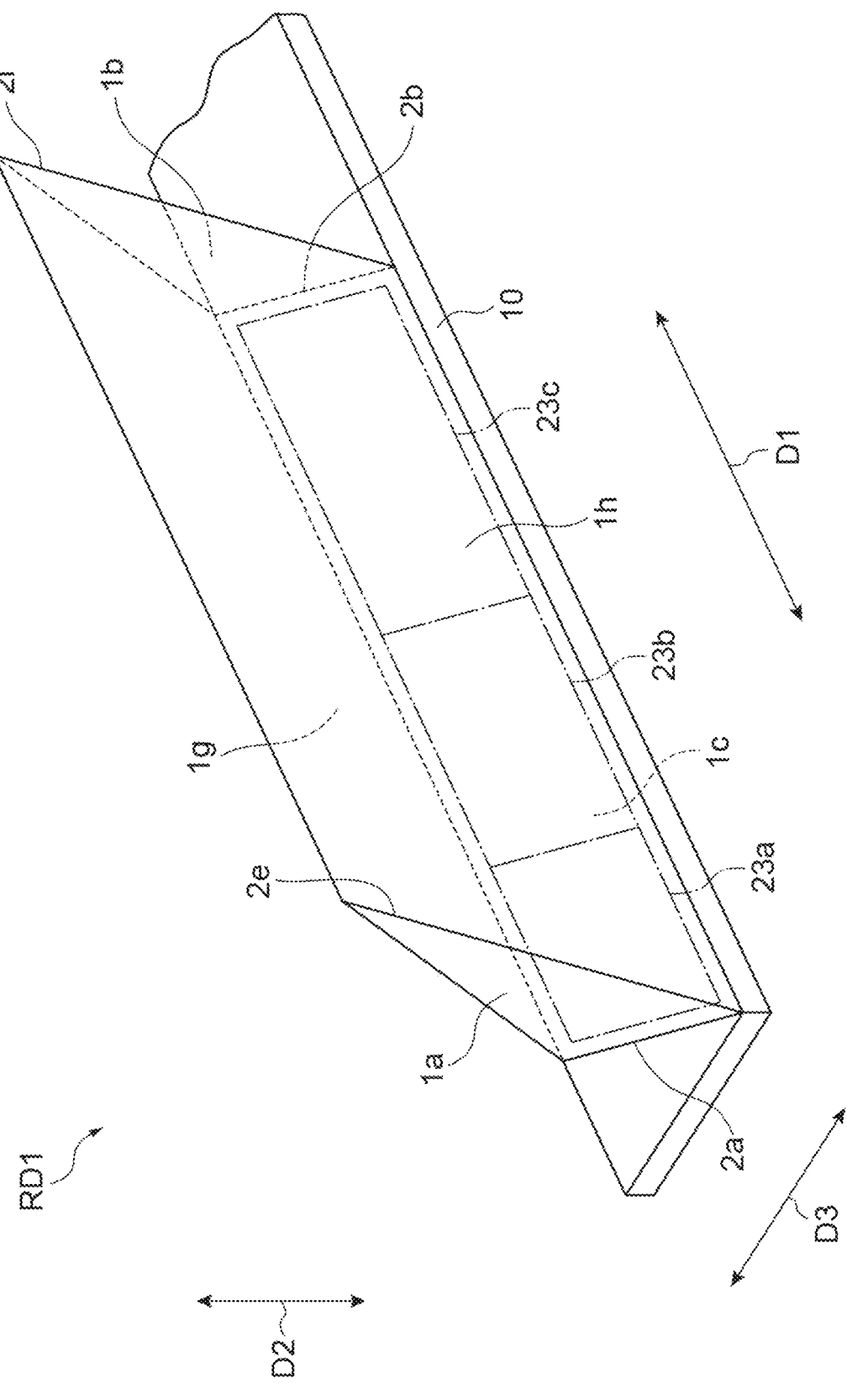
FIG. 20 is a perspective view illustrating a radiation detector according to a seventh modification example of the first embodiment.
Figure 21:
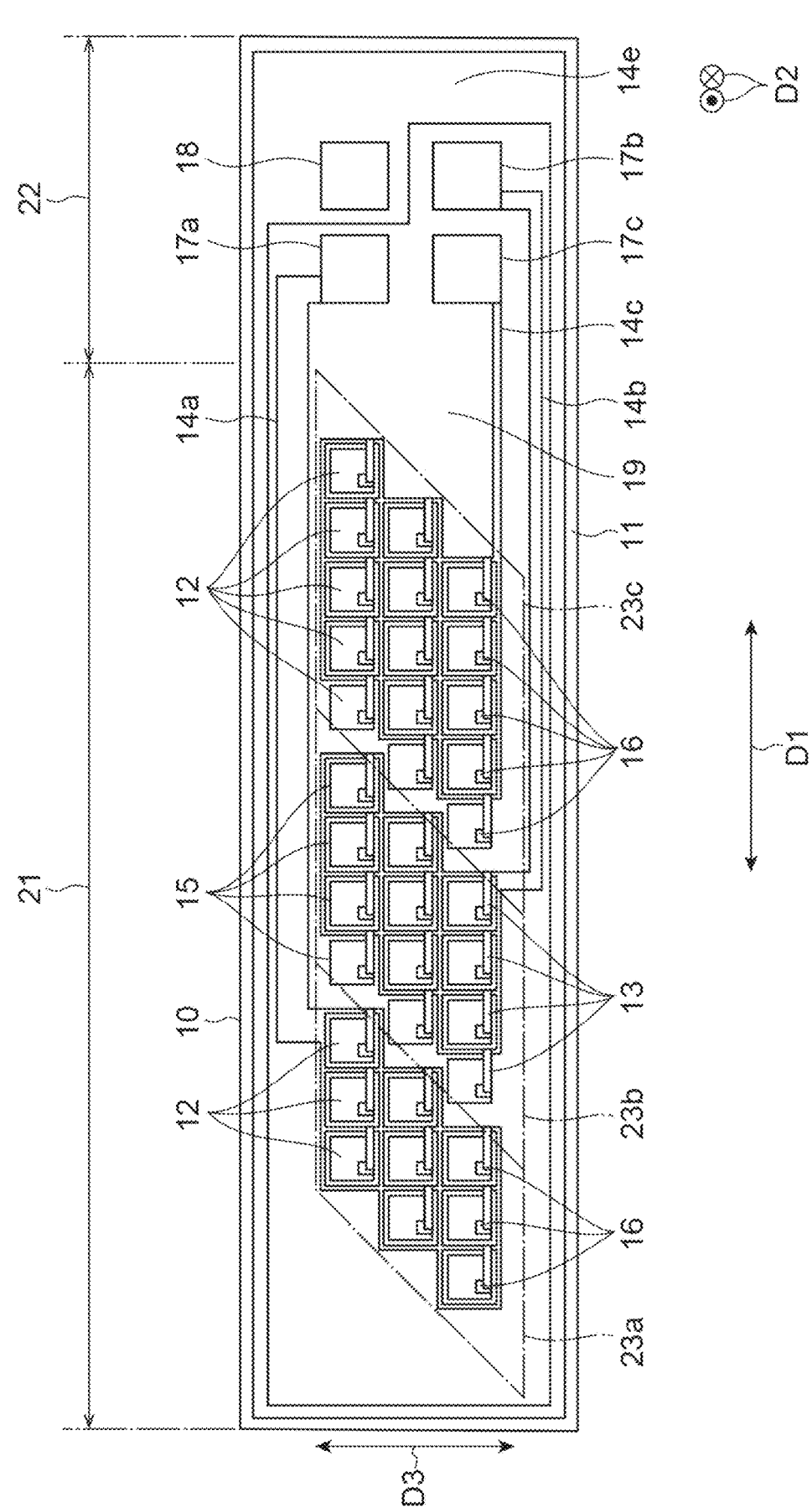
FIG. 21 is a plan view illustrating a semiconductor photodetector.

A seventh modification example of the radiation detector RD1 according to the first embodiment will be described with reference to FIGS. 20 and 21. FIG. 20 is a perspective view illustrating a radiation detector RD1 according to the seventh modification example of the first embodiment. FIG. 21 is a plan view illustrating a semiconductor photodetector. The radiation detector RD1 according to the present modification example has the same configuration as the radiation detector RD1 according to the first embodiment except for configurations of the scintillator 1 and the photodetection regions 23*a*, 23*b*, and 23*c*.

The scintillator 1 according to the present modification example includes a pair of end surfaces 1*a* and 1*b* opposing each other in the first direction D1 and side surfaces 1*c*, 1*g*, and 1*h* extending in the first direction D1 to couple the end surfaces 1*a* and 1*b*. The end surfaces 1*a* and 1*b* and the side surfaces 1*c*, 1*g*, and 1*h* include outer surfaces of the scintillator 1. The end surfaces 1*a* and 1*b* define both end surfaces of the scintillator 1 in the first direction D1. The end surfaces 1*a* and 1*b* are inclined relative to the second direction D2. The pair of end surfaces 1*a* and 1*b* includes one of the end surfaces 1*a* and 1*b* inclined relative to the second direction D2. The end surfaces 1*a* and 1*b* are also inclined relative to the first direction D1. The side surfaces 1*c* and 1*g* are adjacent to each other. The side surfaces 1*c* and 1*h* are adjacent to each other. The side surfaces 1*g* and 1*h* are adjacent to each other. The first direction D1 is a longitudinal direction of the scintillator 1. In the present modification example, a direction perpendicular to the side surface 1*c* coincides with the second direction D2, and a direction parallel to the side surface 1*c* coincides with the third direction D3.

When viewed in the first direction D1, the side surface 1*h* extends, for example, in the second direction D2. When the end surface 1*a* is viewed in the first direction D1, the side surface 1*g* forms, for example, an angle of 10 to 80 degrees in a clockwise direction relative to the second direction D2. The end surfaces 1*a* and 1*b* have, for example, a triangular shape when viewed in the first direction D1. The scintillator 1 has, for example, a triangular shape when viewed in the first direction D1.

Of a pair of edges 2*a* and 2*b* of the side surface 1*c* in the first direction D1, the edge 2*a* on the end surface 1*a* side forms, for example, an angle of 10 to 80 degrees in a clockwise direction relative to the third direction D3, when viewed in the second direction D2. When viewed in the second direction D2, the edge 2*b* on the end surface 1*b* side forms, for example, an angle of 10 to 80 degrees in a clockwise direction relative to the third direction D3.

For example, three photodetection regions 23*a*, 23*b*, and 23*c* are disposed in the portion 21. In the portion 21, for example, the three conductive wires 14*a*, 14*b*, and 14*c* and the conductive wire 14*e* are disposed. For example, the plurality of electrodes 17*a*, 17*b*, and 17*c* and the electrode 18 are disposed in the portion 22. The plurality of quenching resistors 13 included in the corresponding photodetection regions 23*a*, 23*b*, and 23*c* are electrically connected in parallel with the electrodes 17*a*, 17*b*, and 17*c* through the conductive wires 14*a*, 14*b*, and 14*c*, respectively. The electrode 17*a* is connected to the photodetection region 23*a* through the conductive wire 14*a*. The electrode 17*b* is connected to the photodetection region 23*b* through the conductive wire 14*b*. The electrode 17*c* is connected to the photodetection region 23*c* through the conductive wire 14*c*. The other of the anode or the cathode of each of the plurality of avalanche photodiodes 12 is electrically connected in parallel with the electrode 18 through the conductive wire 14*e*.

When viewed in the second direction D2, one region including outlines of the plurality of photodetection regions 23*a*, 23*b*, and 23*c* has a shape corresponding to an outline shape of the side surface 1*c*. In the present modification example, an outline shape of the side surface 1*c* is a parallelogrammatic shape when viewed in the second direction D2. The one region including the outlines of the plurality of photodetection regions 23*a*, 23*b*, and 23*c* has a parallelogrammatic outline shape corresponding to the outline shape of the side surface 1*c*. When viewed in the second direction D2, the photodetection regions 23*a*, 23*b*, and 23*c* have an outline shape corresponding to the outline shape of the side surface 1*c*. The photodetection regions 23*a*, 23*b*, and 23*c* have, for example, a parallelogrammatic outline shape.

The photodetection regions 23*a*, 23*b*, and 23*c* are disposed in the first direction D1, for example. In the present modification example, the photodetection region 23*a*, the photodetection region 23*b*, and the photodetection region 23*c* are disposed in this order. The photodetection region 23*c* is closer to the portion 22 than the photodetection region 23*a* and the photodetection region 23*b*. The photodetection region 23*b* is closer to the portion 22 than the photodetection region 23*a*. In the present modification example, a width of the conductive wire 14*a* is larger than any widths of the conductive wires 14*b* and 14*c*. The width of the conductive wire 14*b* is larger than the width of the conductive wire 14*c*. For example, the conductive wire 14*a* and the conductive wires 14*b* and 14*c* extend between both ends of the semiconductor substrate 11 in the third direction D3 and the photodetection regions 23*a*, 23*b*, and 23*c*, when viewed in the second direction D2. The conductive wires 14*a*, 14*b*, and 14*c* extend in the first direction D1.

When the side surface 1*h* is viewed in the third direction D3, of a pair of edges 2*e* and 2*f* of the side surface 1*h* in the first direction D1, the edge 2*e* on the end surface 1*a* side forms, for example, an angle of 10 to 80 degrees in a clockwise direction relative to the second direction D2. When the side surface 1*h* is viewed in the third direction D3, the edge 2*f* on the end surface 1*b* side forms, for example, an angle of 10 to 80 degrees in a clockwise direction relative to the second direction D2. The side surface 1*h* has, for example, a parallelogrammatic shape when viewed in the third direction D3. The side surface 1*g* has, for example, a rectangular shape when viewed in the third direction D3.

A length of the scintillator 1 in the first direction D1 is longer than a length of the scintillator 1 in the second direction D2. In the present modification example, a length of the side surface 1*c* in the first direction D1 is longer than a width of the side surface 1*c* in the third direction D3. In the present modification example, the end surfaces 1a and 1b and the side surface 1g are inclined relative to the second direction D2 so that a scintillation light tends to be totally reflected toward the side surface 1c. At least one of the side surfaces 1g and 1h and the end surfaces 1a and 1b may include a rough surface. Only the side surface 1h may include a rough surface. The side surface 1g and the end surfaces 1a and 1b may not include rough surfaces. The side surface 1c includes, for example, a mirror surface.

Figure 22:
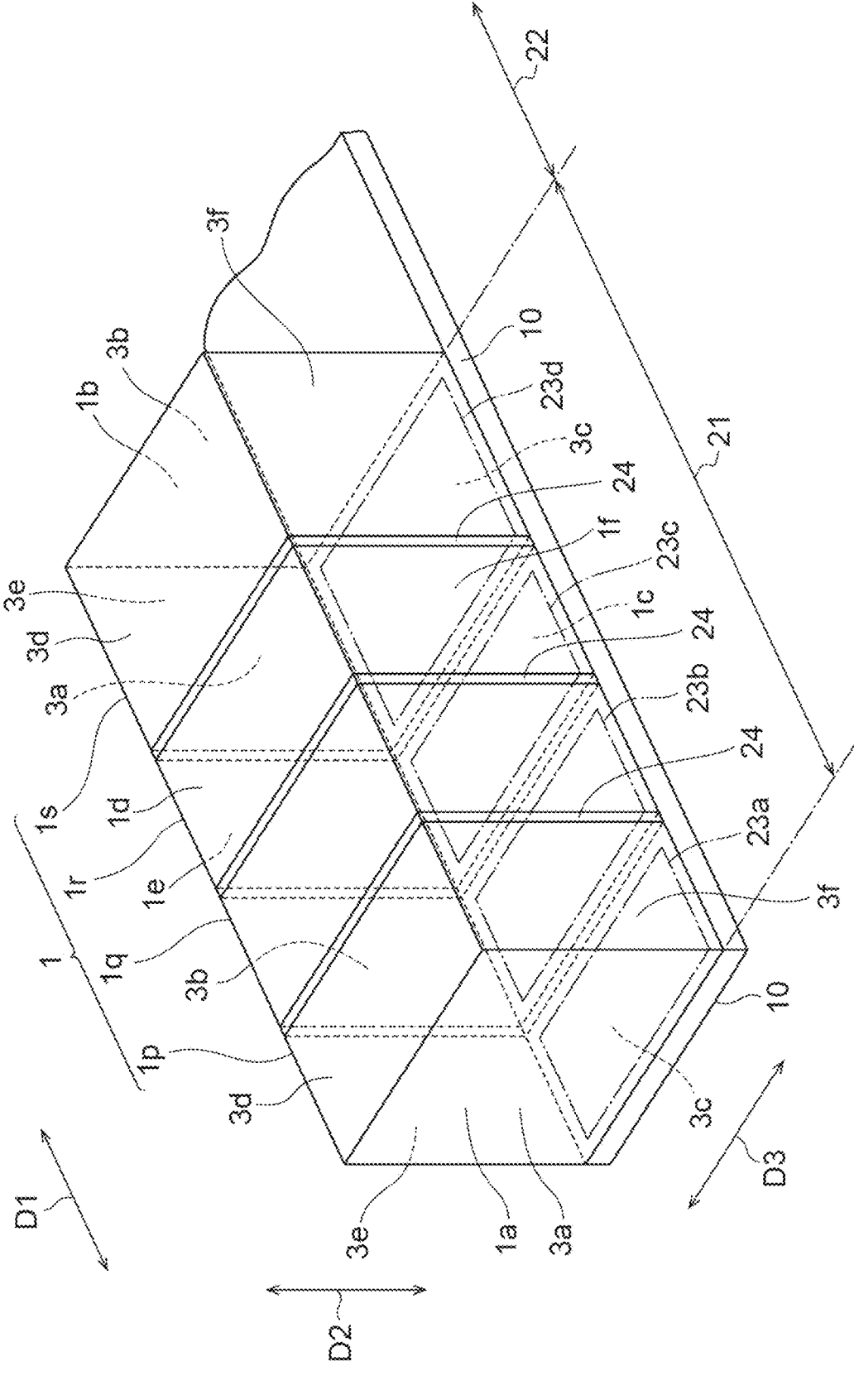
FIG. 22 is a perspective view illustrating a radiation detector according to an eighth modification example of the first embodiment.
Figure 23:
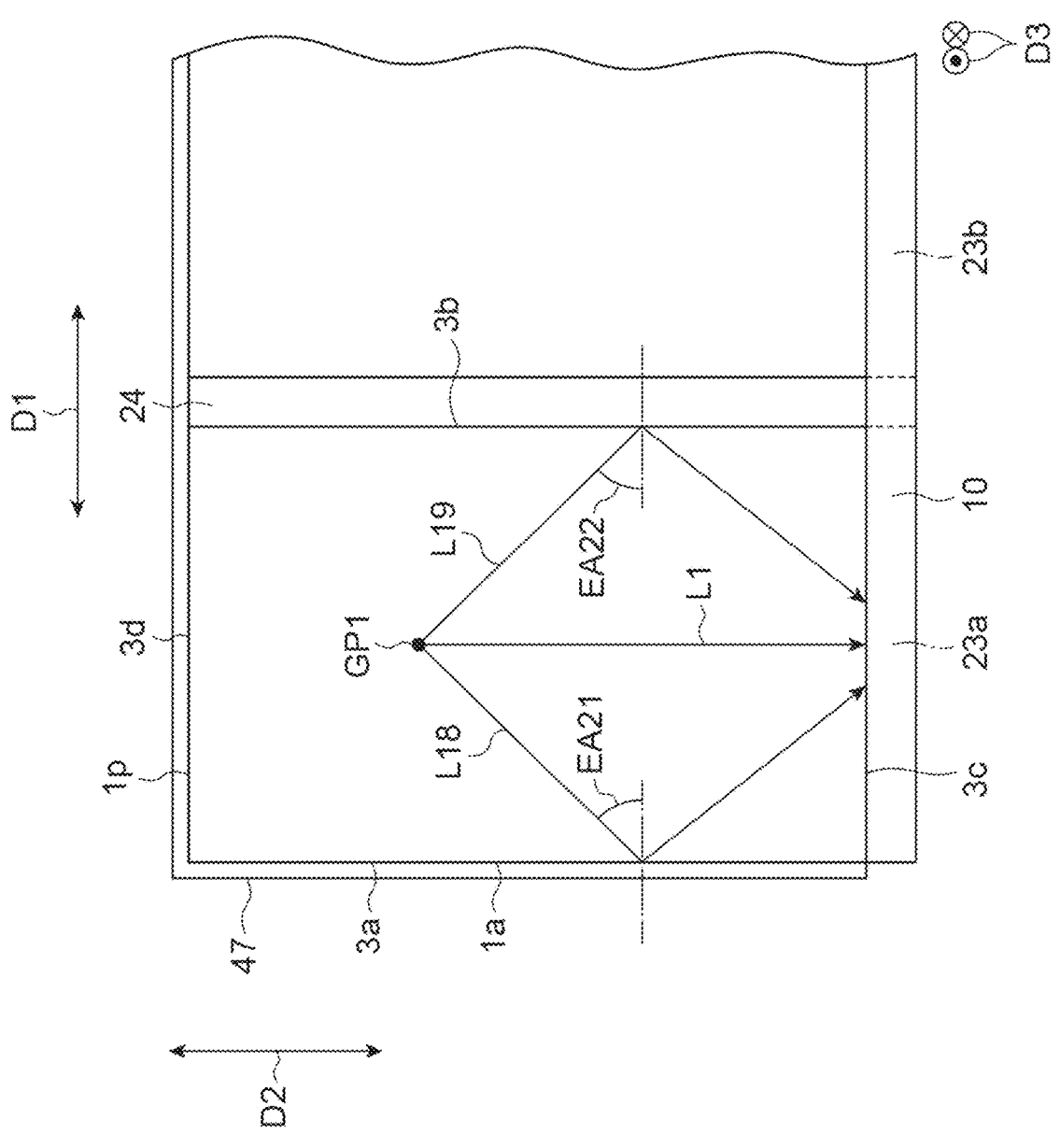
FIG. 23 is a view illustrating paths of some scintillation lights.

An eighth modification example of the radiation detector RD1 according to the first embodiment will be described with reference to FIGS. 22 and 23. FIG. 22 is a perspective view illustrating a radiation detector RD1 according to the eighth modification example of the first embodiment. FIG. 23 is a view illustrating paths of some scintillation lights. FIG. 23 illustrates the paths of some scintillation lights when the scintillator 1 is viewed in the third direction D3. The radiation detector RD1 according to the present modification example has the same configuration as the radiation detector RD1 according to the first embodiment except for a configuration of the scintillator 1.

As illustrated in FIG. 22, the scintillator 1 according to the present modification example includes a plurality of portions 1p, 1q, 1r, and 1s. The plurality of portions 1p, 1q, 1r, and 1s correspond to a plurality of photodetection regions 23a, 23b, 23c, and 23d, respectively. That is, the portion 1p corresponds to the photodetection region 23a. The portion 1q corresponds to the photodetection region 23b. The portion 1r corresponds to the photodetection region 23c. The portion is corresponds to the photodetection region 23d. Each of the plurality of portions 1p, 1q, 1r, and 1s is independent each other.

The portions 1p, 1q, 1r, and 1s include a pair of opposing surfaces 3a and 3b opposing each other, a pair of coupling surfaces 3c and 3d opposing each other, and a pair of coupling surfaces 3e and 3f opposing each other. The opposing surfaces 3a and 3b, the coupling surfaces 3c and 3d, and the coupling surfaces 3e and 3f include outer surfaces of the portions 1p, 1q, 1r, and 1s. The opposing surfaces 3a and 3b oppose each other in the first direction D1. The first direction D1 is a longitudinal direction of the scintillator 1. The coupling surfaces 3c and 3d oppose each other in the second direction D2. The second direction D2 coincides with a direction orthogonal to the coupling surface 3c. The coupling surfaces 3e and 3f oppose each other in the third direction D3. In the present modification example, the opposing surface 3a of the portion 1p coincides with the end surface 1a of the scintillator 1. The opposing surface 3b of the portion is coincides with the end surface 1b of the scintillator 1. The coupling surfaces 3c of the portions 1p, 1q, 1r, and 1s all include a side surface 1c of the scintillator 1. The coupling surfaces 3d of the portions 1p, 1q, 1r, and 1s all include a side surface 1d of the scintillator 1. The coupling surfaces 3e of the portions 1p, 1q, 1r, and 1s all include a side surface 1e of the scintillator 1. The coupling surfaces 3f of the portions 1p, 1q, 1r, and 1s all include a side surface 1f of the scintillator 1.

The opposing surface 3a and the opposing surface 3b extend in the second direction D2 to couple the coupling surface 3c and the coupling surface 3d. The opposing surface 3a and the opposing surface 3b extend in the third direction D3 to couple the coupling surface 3e and the coupling surface 3f. The coupling surface 3c and the coupling surface 3d extend in the first direction D1 to couple the opposing surface 3a and the opposing surface 3b. The coupling surface 3c and the coupling surface 3d extend in the third direction D3 to couple the coupling surface 3e and the coupling surface 3f. The coupling surface 3e and the coupling surface 3f extend in the first direction D1 to couple the opposing surface 3a and the opposing surface 3b. The coupling surface 3e and the coupling surface 3f extend in the second direction D2 to couple the coupling surface 3c and the coupling surface 3d. The coupling surface 3e and the coupling surface 3f are adjacent to the coupling surface 3c.

In the present modification example, the opposing surfaces 3a and 3b each have, for example, a rectangular shape when viewed in a direction orthogonal to the opposing surfaces 3a and 3b. The coupling surfaces 3c and 3d each have, for example, a rectangular shape when viewed in a direction orthogonal to the coupling surfaces 3c and 3d. The coupling surfaces 3e and 3f each have, for example, a rectangular shape when viewed in a direction orthogonal to the coupling surfaces 3e and 3f. The portions 1p, 1q, 1r, and 1s have a rectangular shape when viewed in the second direction D2 and the third direction D3. The portions 1p, 1q, 1r, and is have a rectangular shape when viewed in the first direction D1.

In the present modification example, the portions 1p, 1q, 1r, and 1s are disposed in the first direction D1. A length of the portions 1p, 1q, 1r, and 1s in the first direction D1 is, for example, about 0.05 to 100 mm. A length of the portions 1p, 1q, 1r, and 1s in the second direction D2 are, for example, about 0.05 to 20 mm. A length of the portions 1p, 1q, 1r, and 1s in the third direction D3 are, for example, about 0.05 to 20 mm. The portions 1p, 1q, 1r, and 1s may have different sizes. For example, of the plurality of portions 1p, 1q, 1r, and 1s, some portions 1p, 1q, and 1r may have substantially the same size, and the other portion is may have a different size from that of the portions 1p, 1q, and 1r. Some portions 1p and 1q may have substantially the same size, and the other portions 1r and 1s may be different from the portions 1p and 1q and have substantially the same size. The portions 1p, 1q, 1r, and 1s may have substantially the same size.

A total length of the portions 1p, 1q, 1r, and 1s in the first direction D1 is longer than the length of each of the portions 1p, 1q, 1r, and 1s in the second direction D2. Therefore, the total length of the portions 1p, 1q, 1r, and 1s in the first direction D1 is longer than the length of any portion 1p, 1q, 1r, or 1s having the maximum length in the second direction D2 of the portions 1p, 1q, 1r, and 1s.

The portions 1p, 1q, 1r, and 1s include, for example, the same material as that of the scintillator 1 according to the first embodiment. The portions 1p, 1q, 1r, and 1s include, for example, the same material. The portions 1p, 1q, 1r, and 1s may include different materials from each other, of the materials included in the scintillator 1 according to the first embodiment. Therefore, of the materials of the scintillator 1 according to the first embodiment, for example, the portions 1p and 1r may include the same material, and the portions 1q and 1s may include the same material. In this case, the material included in the portions 1p and 1r is different from the material included in the portions 1q and is.

The portions 1p, 1q, 1r, and 1s are joined to each other, for example. The opposing surface 3b of the portion 1p is joined to the opposing surface 3a of the portion 1q, for example. The opposing surface 3b of the portion 1q is joined to the opposing surface 3a of the portion 1r, for example. The opposing surface 3b of the portion 1r is joined to the opposing surface 3a of the portion is, for example. The joining between the portion 1p and the portion 1q, the joining between the portion 1q and the portion 1r, and the joining between the portion 1r and the portion is are performed with, for example, an adhesive.

The radiation detector RD1 according to the present modification example includes, for example, light reflecting members 24. The light reflecting members 24 are disposed, for example, between the plurality of portions 1p, 1q, 1r, and 1s. The portion 1p, the portion 1q, the portion 1r, and the portion 1s are joined to each other through the light reflecting members 24, for example. The light reflecting members 24 are disposed, for example, at least one positions between the portion 1p and the portion 1q, between the portion 1q and the portion 1r, and between the portion 1r and the portion 1s. The joining between the portion 1p and the portion 1q, the joining between the portion 1q and the portion 1r, and the joining between the portion 1r and the portion is through the corresponding light reflecting members 24 are performed with, for example, an adhesive.

In the present modification example, the portion 1p, the portion 1q, the portion 1r, and the portion is may be separately disposed in the first direction D1. When the portion 1p, the portion 1q, the portion 1r, and the portion 1s are individually separated from each other, for example, atmosphere is present between the portion 1p and the portion 1q, between the portion 1q and the portion 1r, and between the portion 1r and the portion 1s. When the portion 1p, the portion 1q, the portion 1r, and the portion is are individually separated from each other, the light reflecting member 24 may be provided on at least one of the opposing surfaces 3a and 3b of the portions 1p, 1q, 1r, and 1s. In each of the portions 1p, 1q, 1r, and 1s, the light reflecting members 24 may be disposed on both of the opposing surfaces 3a and 3b. The light reflecting member 24 may be disposed on any one of the opposing surfaces 3a and 3b of each of the portions 1p, 1q, 1r, and 1s. of the portion 1p, the portion 1q, the portion 1r, and the portion 1s, for example, the portion 1p and the portion 1q may be joined to each other, and the portion 1p and the portion 1q joined to each other may be separated from the portion 1r and the portion 1s.

The light reflecting member 24 includes, for example, metal, a multilayer optical film, or Teflon (registered trademark). The metal of the light reflecting member 24 includes, for example, Al, Ag, or Au. The light reflecting member 24 is formed through, for example, a plating method, a vapor deposition method, or a sputtering method. A thickness of the light reflecting member 24 is, for example, 0.05 to 100 μm. The light reflecting member 24 can transmit radiation incident on the scintillator 1. A radiation detector RD2 may not include the light reflecting member 24.

In the present modification example, when viewed in the second direction D2, each of the plurality of photodetection regions 23a, 23b, 23c, and 23d has an outline shape corresponding to an outline shape of the coupling surface 3c of a corresponding portion 1p, 1q, 1r, or 1s of the plurality of portions 1p, 1q, 1r, and 1s, the coupling surface 3c opposing the semiconductor substrate 11. In the present modification example, the coupling surface 3c of each of the portions 1p, 1q, 1r, and 1s has a rectangular shape when viewed in the second direction D2. The corresponding photodetection regions 23a, 23b, 23c, and 23d have a rectangular outline shape. For example, when the coupling surface 3c includes a first coupling surface, the coupling surface 3e includes a second coupling surface.

FIG. 23 illustrates paths of scintillation lights that are generated in the portion 1p and incident on the coupling surface 3c. The scintillation lights generated in the portion 1p are confined in the portion 1p, for example. In the present modification example, the light reflecting member 24 is disposed on the opposing surface 3b, and the light reflectors 47 are disposed on the opposing surface 3a and the coupling surface 3d. The radiation is incident from the opposing surface 3a of the portion 1p. The scintillation lights include, for example, a light L1 that is incident on the coupling surface 3c directly from the generation point GP1. The scintillation lights include, for example, a light L18 that is first incident on the opposing surface 3a at an incidence angle EA21, in addition to the light L1. The light L18 is totally reflected by the opposing surface 3a and then is incident on the coupling surface 3c, for example. The light L18 is incident on the coupling surface 3c and is incident on the photodetection region 23a. The scintillation lights include, for example, a light L19 that is first incident on the opposing surface 3b at an incidence angle EA22. The light L19 is totally reflected by the opposing surface 3b and then is incident on the coupling surface 3c, for example. The light L19 is incident on the coupling surface 3c and is incident on the photodetection region 23a. In FIG. 23, when the incidence angle EA21 and the incidence angle EA22 are the same angle, the light L18 and the light L19 may have the same incidence angle when the lights are incident on the coupling surface 3c.

In the present modification example, the scintillation lights generated in the portions 1q, 1r, and 1s are also incident on the photodetection regions 23b, 23c, and 23d, respectively, and are detected by the semiconductor photodetector 10 disposed on the coupling surfaces 3c. The scintillation lights generated in the portions 1q, 1r, and 1s are confined, for example, in the portions 1q, 1r, and 1s, respectively. In the present modification example, for example, electrical signals output in response to the incidence of the scintillation lights on the photodetection regions 23a, 23b, 23c, and 23d are added by a signal processing circuit connected to the wiring member 30. In the present modification example, in the portions 1p, 1q, 1r, and 1s, for example, the light reflectors 47 are disposed on the opposing surfaces 3a and 3b, the coupling surfaces 3c and 3d, and the coupling surfaces 3e and 3f on which the light reflecting member 24 is not disposed.

When the light reflecting members 24 are disposed between the portion 1p and the portion 1q, between the portion 1q and the portion 1r, and between the portion 1r and the portion is, respectively, the scintillation light generated in the scintillator 1 corresponding to each of the photodetection regions 23a, 23b, 23c, and 23d is reliably detected by each of the photodetection regions 23a, 23b, 23c, and 23d. Therefore, the electrical signal output in response to incidence of the scintillation light is processed for each of the photodetection regions 23a, 23b, 23c, and 23d by the signal processing circuit connected to the wiring member 30. Even when the portion 1p, the portion 1q, the portion 1r, and the portion is are separated from each other and disposed in the first direction D1, a scintillation light generated in the portion 1p is not incident on the portion 1q, for example. In this case, a scintillation light generated in the portion 1p corresponding to the photodetection region 23a is detected by the photodetection region 23a. When a scintillation light generated in the portion 1q is confined in the portion 1q, the scintillation light generated in the portion 1q is detected by the photodetection region 23b. When a scintillation light generated in the portion 1r is confined in the portion 1r, the scintillation light generated in the portion 1r is detected by the photodetection region 23c. When a scintillation light generated in the portion 1s is confined in the portion is, the scintillation light generated in the portion 1s is detected by the photodetection region 23d.

In the present modification example, the pair of opposing surfaces 3a and 3b extends in the second direction D2. The opposing surfaces 3a and 3b have, for example, a triangular wave shape in a cross section as exemplified in FIG. 8. The opposing surfaces 3a and 3b include, for example, rough surfaces. In the case where the opposing surfaces 3a and 3b include rough surfaces, the opposing surfaces 3a and 3b may not have a triangular wave shape in a cross section. When the opposing surfaces 3a and 3b have a triangular wave shape in a cross section, the opposing surfaces 3a and 3b may not include rough surfaces. The scintillator 1 of the present modification example may include another coupling surface 3e that couples the opposing surfaces 3a and 3b and is adjacent to the coupling surface 3c. The other coupling surface 3e has, for example, a triangular wave shape in a cross section. The other coupling surface 3e includes, for example, a rough surface.

In the portions 1p, 1q, 1r, and Is, of the coupling surfaces 3e and 3f, at least one of the coupling surfaces 3e and 3f may include a rough surface, and of the opposing surfaces 3a and 3b, at least one of the opposing surfaces 3a and 3b may include a rough surface. All of the coupling surfaces 3e and 3f and the opposing surfaces 3a and 3b may include rough surfaces. The coupling surfaces 3e and 3f may include mirror surfaces, and of the opposing surfaces 3a and 3b, at least one of the coupling surfaces may include a rough surface. Of the coupling surfaces 3e and 3f, at least one of the opposing surfaces 3a and 3b may include a rough surface, and the opposing surfaces 3a and 3b may include mirror surfaces. All of the coupling surfaces 3e and 3f and the opposing surfaces 3a and 3b may include mirror surfaces. For example, when the portions 1p, 1q, 1r, and 1s are joined to each other, the opposing surfaces 3a and 3b positioned between the portion 1p and the portion 1q, between the portion 1q and the portion 1r, and between the portion 1r and the portion 1s may not include rough surfaces.

As described above, in the present modification example, the case where the configuration of the scintillator 1 including the plurality of portions 1p, 1q, 1r, and 1s has the same rectangular parallelepiped shape as the scintillator 1 of the first embodiment has been described. In the present modification example, at least one of the opposing surfaces 3a and 3b of the pair of opposing surfaces 3a and 3b may be inclined relative to the second direction D2. That is, the pair of opposing surfaces 3a and 3b may include one of the opposing surfaces 3a and 3b inclined relative to the second direction D2. The scintillator 1 including the plurality of portions 1p, 1q, 1r, and 1s may have the same configuration as the scintillator 1 of the first to seventh modification examples of the first embodiment. In the case where the scintillator 1 of the present modification example has the same configuration as the scintillator 1 of the first to seventh modification examples of the first embodiment, the scintillation lights generated in the portions 1p, 1q, 1r, and 1s can take the following paths.

When the scintillator 1 including the plurality of portions 1p, 1q, 1r, and 1s has the same configuration as the scintillator 1 of the first modification example of the first embodiment, for example, the opposing surface 3a of the portion 1p is inclined relative to the second direction D2. The scintillation light incident on the opposing surface 3a of the portion 1p tends to be incident on the coupling surface 3c of the portion 1p (see FIG. 10). The scintillation light incident on the coupling surface 3c of the portion 1p is detected by the photodetection region 23a.

When the scintillator 1 including the plurality of portions 1p, 1q, 1r, and 1s has the same configuration as the scintillator 1 of the second modification example of the first embodiment, the opposing surface 3a of the portion 1p is inclined relative to the second direction D2. The scintillation light incident on the opposing surface 3a of the portion 1p tends to be incident on the coupling surface 3c of the portion 1p. The scintillation light incident on the coupling surface 3c of the portion 1p is detected by the photodetection region 23a. The opposing surface 3b of the portion 1s is inclined relative to the second direction D2. The scintillation light incident on the opposing surface 3b of the portion is tends to be incident on the coupling surface 3c of the portion is. The scintillation light incident on the coupling surface 3c of the portion 1s is detected in the photodetection region 23d.

When the scintillator 1 including the plurality of portions 1p, 1q, 1r, and 1s has the same configuration as the scintillator 1 of the third modification example of the first embodiment, the opposing surface 3a of the portion 1p is inclined relative to the second direction D2. The scintillation light incident on the opposing surface 3a of the portion 1p tends to be incident on the coupling surface 3c of the portion 1p (see FIG. 13). The scintillation light incident on the coupling surface 3c of the portion 1p is detected by the photodetection region 23a. The opposing surface 3b of the portion 1s is inclined relative to the second direction D2. The scintillation light incident on the opposing surface 3b of the portion 1s tends to be incident on the coupling surface 3c of the portion is (see FIG. 13). The scintillation light incident on the coupling surface 3c of the portion 1s is detected in the photodetection region 23d.

When the scintillator 1 including the plurality of portions 1p, 1q, 1r, and 1s has the same configuration as the scintillator 1 of the fourth modification example of the first embodiment, of the coupling surfaces of the portions 1p, 1q, 1r, and 1s, a coupling surface including a part of the side surface 1h is inclined relative to the second direction D2. The scintillation light incident on each of the coupling surfaces including a part of the side surface 1h tends to be incident on each of the coupling surfaces 3c of the portions 1p, 1q, 1r, and 1s (see FIG. 15). The scintillation light incident on each of the coupling surfaces 3c of the portions 1p, 1q, 1r, and 1s is detected in each of the photodetection regions 23a, 23b, 23c, and 23d. When viewed in the first direction D1, the scintillator 1 according to the present modification example has, for example, a triangular shape.

When the scintillator 1 including the plurality of portions 1p, 1q, 1r, and 1s has the same configuration as the scintillator 1 of the fifth modification example of the first embodiment, of the coupling surfaces of the portions 1p, 1q, 1r, and 1s, a coupling surface including a part of the side surface 1h is inclined relative to the second direction D2. The scintillation light incident on each of the coupling surfaces including a part of the side surface 1h tends to be incident on each of the coupling surfaces 3c of the portions 1p, 1q, 1r, and 1s. The scintillation light incident on each of the coupling surfaces 3c of the portions 1p, 1q, 1r, and 1s is detected in each of the photodetection regions 23a, 23b, 23c, and 23d. The opposing surface 3a of the portion 1p is inclined relative to the second direction D2. The scintillation light incident on the opposing surface 3a of the portion 1p tends to be incident on the coupling surface 3c of the portion 1p. The scintillation light incident on the coupling surface 3c of the portion 1p is detected by the photodetection region 23a.

When the scintillator 1 of the present modification example has the same configuration as the scintillator 1 of the sixth modification example of the first embodiment, the scintillator 1 includes three portions 1p, 1q, and 1r. The portion 1p corresponds to the photodetection region 23a. The portion 1q corresponds to the photodetection region 23b. The portion 1r corresponds to the photodetection region 23c. In this case, for example, of the coupling surfaces of the portions 1p, 1q, and 1r, a coupling surface including a part of the side surface 1h is inclined relative to the second direction D2. The scintillation light incident on each of the coupling surfaces including a part of the side surface 1h tends to be incident on each of the coupling surfaces 3c of the portions 1p, 1q, and 1r.

The scintillation light incident on each of the coupling surfaces 3c of the portions 1p, 1q, and 1r is detected in each of the photodetection regions 23a, 23b, and 23c. The opposing surface 3a of the portion 1p is inclined relative to the second direction D2. The scintillation light incident on the opposing surface 3a of the portion 1p tends to be incident on the coupling surface 3c of the portion 1p. The scintillation light incident on the coupling surface 3c of the portion 1p is detected by the photodetection region 23a. The opposing surface 3b of the portion 1r is inclined relative to the second direction D2. The scintillation light incident on the opposing surface 3b of the portion 1r tends to be incident on the coupling surface 3c of the portion 1r. The scintillation light incident on the coupling surface 3c of the portion 1r is detected in the photodetection region 23c.

When the scintillator 1 of the present modification example has the same configuration as the scintillator 1 of the seventh modification example of the first embodiment, the scintillator 1 includes three portions 1p, 1q, and 1r. The portion 1p corresponds to the photodetection region 23a. The portion 1q corresponds to the photodetection region 23b. The portion 1r corresponds to the photodetection region 23c. In this case, for example, of the coupling surfaces of the portions 1p, 1q, and 1r, a coupling surface including a part of the side surface 1g is inclined relative to the second direction D2. The scintillation light incident on each of the coupling surfaces including a part of the side surface 1g tends to be incident on each of the coupling surfaces 3c of the portions 1p, 1q, and 1r. The scintillation light incident on each of the coupling surfaces 3c of the portions 1p, 1q, and 1r is detected in each of the photodetection regions 23a, 23b, and 23c. The opposing surface 3a of the portion 1p is inclined relative to the second direction D2. The scintillation light incident on the opposing surface 3a of the portion 1p tends to be incident on the coupling surface 3c of the portion 1p. The scintillation light incident on the coupling surface 3c of the portion 1p is detected by the photodetection region 23a. The opposing surface 3b of the portion 1r is inclined relative to the second direction D2. The scintillation light incident on the opposing surface 3b of the portion 1r tends to be incident on the coupling surface 3c of the portion 1r. The scintillation light incident on the coupling surface 3c of the portion 1r is detected in the photodetection region 23c.

As described above, the radiation detector RD1 includes the scintillator 1 including the pair of end surfaces 1a and 1b opposing each other in the first direction D1 and the side surface 1c coupling the pair of end surfaces 1a and 1b, the semiconductor photodetector 10 including the semiconductor substrate 11 disposed to oppose the side surface 1c, and the wiring member 30 electrically connected to the semiconductor photodetector 10. The length of the scintillator 1 in the first direction D1 is longer than the length of the scintillator 1 in the second direction D2 orthogonal to the side surface 1c. The length of the side surface 1c in the first direction D1 is longer than the width of the side surface 1c in the third direction D3 orthogonal to both the first direction D1 and the second direction D2. The semiconductor substrate 11 includes the portion 21 that is covered with the side surface 1c and in which the plurality of photodetection regions 23a, 23b, 23c, and 23d are disposed and the portion 22 that is exposed from the side surface 1c and the portion 21. The portion 21 and the portion 22 are disposed in the first direction D1. The semiconductor photodetector 10 includes the plurality of photodetection regions 23a, 23b, 23c, and 23d disposed in the portion 21, the plurality of electrodes 17a, 17b, 17c, and 17d disposed in the portion 22, and the electrode 18 disposed in the portion 22. Each of the plurality of photodetection regions 23a, 23b, 23c, and 23d includes at least one avalanche photodiode 12 disposed in the first direction D1 and arranged to operate in Geiger mode and at least one quenching resistor 13 electrically connected in series with one of the anode or the cathode of the corresponding avalanche photodiode 12 of the at least one avalanche photodiode 12. The at least one quenching resistor 13 included in the corresponding photodetection region 23a, 23b, 23c, or 23d of the plurality of photodetection regions 23a, 23b, 23c, and 23d is electrically connected to the plurality of electrodes 17a, 17b, 17c, and 17d. The other of the anode or the cathode of each of the avalanche photodiodes 12 is electrically connected to the electrode 18. The wiring member 30 includes the plurality of conductors 31a, 31b, 31c, and 31d electrically connected to the corresponding electrodes 17a, 17b, 17c, and 17d of the plurality of electrodes 17a, 17b, 17c, and 17d and the conductor 32 connected to the electrode 18.

The radiation detector RD1 includes the scintillator 1 that is longer in the first direction D1 and includes the semiconductor photodetector 10 disposed on the side surface 1c of the scintillator 1. The semiconductor photodetector 10 detects the light from the scintillator 1 that is directly incident on the side surface 1c on which the semiconductor photodetector 10 is disposed. The semiconductor photodetector detects, for example, the scintillation light incident on the side surface 1c after being reflected by the side surface 1d opposing the side surface 1c on which the semiconductor photodetector 10 is disposed. In the radiation detector RD1, the length of the scintillator 1 in the second direction D2 is shorter than the length of the scintillator 1 in the first direction D1. Therefore, the semiconductor photodetector detects, with a small time difference, for example, the scintillation light directly incident on the side surface 1c and the scintillation light incident on the side surface 1c after being reflected by the side surface 1d. As a result, the radiation detector RD1 achieves high time resolution.

The length of the side surface 1c in the first direction D1 is longer than the length of the end surface 1b in the second direction D2, for example. Therefore, for example, as compared with a configuration in which the semiconductor photodetector 10 is disposed on the end surface 1b, the scintillation light incident on the side surface 1c at the larger incidence angle EA1 can be detected.

The radiation detector RD1 includes the semiconductor photodetector in which the plurality of photodetection regions 23a, 23b, 23c, and 23d are disposed in the first direction D1. For example, the distance between the scintillation light generation point GP1 and the one end surface 1a of the scintillator 1 in the first direction D1 is obtained from the position on the photodetection region 23a, 23b, 23c, or 23d where the most scintillation lights are detected, of the plurality of photodetection regions 23a, 23b, 23c, and 23d. As a result, a magnitude of energy of radiation incident on the scintillator 1 is accurately measured. Therefore, the radiation detector RD1 achieves high energy resolution.

In the radiation detector RD1, the pair of end surfaces 1a and 1b include one of the end surfaces 1a and 1b inclined relative to the second direction D2.

In this configuration, the scintillation light is more reliably incident on the side surface 1c. The number of times of reflection of the scintillation lights by the end surfaces 1a and 1b or the side surfaces 1d, 1e, 1f, 1g, and 1h decreases, and the reflection attenuation of the scintillation lights decreases. Therefore, the radiation detector RD1 more reliably increases the amount of light detected by the semiconductor photodetector 10.

In the radiation detector RD1, the pair of end surfaces 1a and 1b includes one of the end surfaces 1a and 1b extending in the second direction D2, and one of the end surfaces 1a and 1b has the triangular wave shape in the cross section.

In this configuration, the scintillation light is still more reliably incident on the side surface 1c. The number of times of reflection of the scintillation lights by the end surfaces 1a and 1b or the side surfaces 1d, 1e, 1f, 1g, and 1h decreases, and the reflection attenuation of the scintillation lights decreases. Therefore, the radiation detector RD1 still more reliably increases the amount of light detected by the semiconductor photodetector 10.

In the configuration in which the end surfaces 1a and 1b have the triangular wave shape in the cross section, the amount of light detected by the semiconductor photodetector 10 is more reliably increased even if the end surfaces 1a and 1b are not inclined relative to the second direction D2. The configuration in which the end surfaces 1a and 1b extend in the second direction D2 decreases the amount of use of the scintillator 1 when the radiation detector RD1 is produced, as compared with the configuration in which the end surfaces 1a and 1b are inclined relative to the second direction D2.

In the radiation detector RD1, the pair of end surfaces 1a and 1b includes one of the end surfaces 1a and 1b extending in the second direction D2, and one of the end surfaces 1a and 1b include a rough surface.

In this configuration, the scintillation light is still more reliably incident on the side surface 1c. The number of times of reflection of the scintillation lights by the end surfaces 1a and 1b or the side surfaces 1d, 1e, 1f, 1g, and 1h decreases, and the reflection attenuation of the scintillation lights decreases. Therefore, the radiation detector RD1 still more reliably increases the amount of light detected by the semiconductor photodetector 10.

In the configuration of the radiation detector RD1, the scintillator 1 includes other side surfaces 1e, 1f, 1g, and 1h having the triangular wave shape in the cross section, and the other side surfaces 1e, 1f, 1g, and 1h couple the pair of end surfaces 1a and 1b and are adjacent to the side surface 1c.

In this configuration, the scintillation light is more reliably incident on the side surface 1c on which the scintillator 1 is disposed. Therefore, the radiation detector RD1 still more reliably increases the amount of light detected by the semiconductor photodetector 10.

In the radiation detector RD1, the scintillator 1 includes the other side surfaces 1e, 1f, 1g, and 1h that include rough surfaces, and the other side surfaces 1e, 1f, 1g, and 1h couple the pair of end surfaces 1a and 1b and are adjacent to the side surface 1c.

In this configuration, the scintillation light is more reliably incident on the side surface 1c on which the scintillator 1 is disposed. Therefore, the radiation detector RD1 still more reliably increases the amount of light detected by the semiconductor photodetector 10.

In the radiation detector RD1, when viewed in the second direction D2, one region including the outlines of the plurality of photodetection regions 23a, 23b, 23c, and 23d has the shape corresponding to the outline shape of the side surface 1c.

In this configuration, the plurality of photodetection regions 23a, 23b, 23c, and 23d tend not to be disposed at positions of the semiconductor substrate 11 where no scintillation lights can be detected. Therefore, in this configuration, increase in dark count and capacitance in the photodetection regions 23a, 23b, 23c, and 23d is suppressed. As a result, this configuration reliably improves the time resolution and the energy resolution of the radiation detector RD1.

In the radiation detector RD1, the scintillator 1 includes the plurality of portions 1p, 1q, 1r, and 1s being independent each other and corresponding to the plurality of photodetection regions 23a, 23b, 23c, and 23d, respectively. Each of the plurality of portions 1p, 1q, 1r, and 1s includes the pair of opposing surfaces 3a and 3b opposing each other in the first direction D1 and the coupling surface 3c that couples the pair of opposing surfaces 3a and 3b and opposes the semiconductor substrate 11.

In this configuration, the scintillation lights generated in the portions 1p, 1q, 1r, and 1s are confined in the portions 1p, 1q, 1r, and 1s, respectively. That is, the scintillation light generated in the portion 1p is confined in the portion 1p. The scintillation light generated in the portion 1q is confined in the portion 1q. The scintillation light generated in the portion 1r is confined in the portion 1r. The scintillation light generated in the portion 1s is confined in the portion 1s. The photodetection regions 23a, 23b, 23c, and 23d corresponding to the portions 1p, 1q, 1r, and 1s reliably detect scintillation lights generated in the corresponding portions 1p, 1q, 1r, and 1s. That is, the photodetection region 23a reliably detects a scintillation light generated in the portion 1p. The photodetection region 23b reliably detects the scintillation light generated in the portion 1q. The photodetection region 23c reliably detects the scintillation light generated in the portion 1r. The photodetection region 23d reliably detects the scintillation light generated in the portion is. Therefore, the radiation detector RD1 reliably achieves high energy resolution.

In the radiation detector RD1, the plurality of portions 1p, 1q, 1r, and is are joined to each other.

This configuration increases the physical strength of the scintillator 1. Therefore, the radiation detector RD1 more reliably achieves high energy resolution.

The radiation detector RD1 includes the light reflecting members 24. The light reflecting members 24 are disposed between the plurality of portions 1p, 1q, 1r, and 1s.

In this configuration, the scintillation light generated in each of the portions 1p, 1q, 1r, and 1s is reliably confined in the corresponding portion 1p, 1q, 1r, or 1s. The photodetection regions 23a, 23b, 23c, and 23d corresponding to the portions 1p, 1q, 1r, and 1s more reliably detect scintillation lights generated in the portions 1p, 1q, 1r, and 1s. Therefore, the radiation detector RD1 still more reliably achieves high energy resolution.

In the radiation detector RD1, the pair of opposing surfaces 3a and 3b includes one of the opposing surfaces 3a and 3b inclined relative to the second direction D2.

In this configuration, the scintillation light is more reliably incident on the coupling surface 3c. The number of times of reflection of the scintillation lights on the opposing surfaces 3a and 3b or the coupling surfaces is reduced, and the reflection attenuation of the scintillation lights is reduced. Therefore, this configuration more reliably increases the amount of light detected by the semiconductor photodetector 10.

In the radiation detector RD1, the pair of opposing surfaces 3a and 3b includes one of the opposing surface 3a or 3b extending in the second direction D2. One of the opposing surfaces 3a and 3b has the triangular wave shape in the cross section.

In this configuration, the scintillation light is more reliably incident on the coupling surface 3c. The number of times of reflection of the scintillation lights on the opposing surfaces 3a and 3b or the coupling surfaces is reduced, and the reflection attenuation of the scintillation lights is reduced. Therefore, this configuration still more reliably increases the amount of light detected by the semiconductor photodetector 10.

In the radiation detector RD1, the pair of opposing surfaces 3a and 3b includes one of the opposing surface 3a or 3b extending in the second direction D2. One of the opposing surfaces 3a and 3b include the rough surface.

In this configuration, the scintillation light is more reliably incident on the coupling surface 3c. The number of times of reflection of the scintillation lights on the opposing surfaces 3a and 3b or the coupling surfaces is reduced, and the reflection attenuation of the scintillation lights is reduced. Therefore, this configuration still more reliably increases the amount of light detected by the semiconductor photodetector 10.

In the radiation detector RD1, the scintillator 1 includes the other coupling surfaces 3e and 3f that couple the pair of opposing surfaces 3a and 3b and are adjacent to the coupling surface 3c. The other coupling surfaces 3e and 3f have the triangular wave shape in the cross section.

In this configuration, the scintillation light is more reliably incident on the coupling surface 3c. Therefore, this configuration still more reliably increases the amount of light detected by the semiconductor photodetector 10.

In the radiation detector RD1, the scintillator 1 includes the other coupling surfaces 3e and 3f that couple the pair of opposing surfaces 3a and 3b and are adjacent to the coupling surface 3c. The other coupling surfaces 3e and 3f include rough surfaces.

In this configuration, the scintillation light is more reliably incident on the coupling surface 3c. Therefore, this configuration still more reliably increases the amount of light detected by the semiconductor photodetector 10.

In the radiation detector RD1, when viewed in the second direction D2, each of the plurality of photodetection regions 23a, 23b, 23c, and 23d has the outline shape of the coupling surface 3c, of a corresponding portion 1p, 1q, 1r, or 1s of the plurality of portions 1p, 1q, 1r, and 1s, opposing the semiconductor substrate 11.

In this configuration, the photodetection regions 23a, 23b, 23c, and 23d tend not to be disposed at positions of the semiconductor substrate 11 where no scintillation lights can be detected. Therefore, in this configuration, increase in dark count and capacitance in the photodetection regions 23a, 23b, 23c, and 23d is suppressed. As a result, this configuration reliably improves the time resolution and the energy resolution of the radiation detector RD1.

In the radiation detector RD1, the scintillator 1 has the rectangular shape or the triangular shape when viewed in the first direction D1.

In this configuration, the scintillation light is more reliably incident on the side surface 1c on which the scintillator

1 is disposed. Therefore, this configuration more reliably increases the amount of light detected by the semiconductor photodetector 10.

In the radiation detector RD1, the plurality of photodetection regions 23a, 23b, 23c, and 23d include the photodetection region 23a and the photodetection region 23d closer to the portion 22 than the photodetection region 23a. The width of the conductive wire 14a electrically connecting the electrode 17a corresponding to the photodetection region 23a and the photodetection region 23a is larger than the width of the conductive wire 14d electrically connecting the electrode 17d corresponding to the photodetection region 23d and the photodetection region 23d.

In this configuration, the length of the conductive wire 14a electrically connecting the electrode 17a corresponding to the photodetection region 23a and the photodetection region 23a, the conductive wire 14a electrically connecting the photodetection region 23a and the electrode 17a corresponding to the photodetection region 23a, in which an electrical resistance difference from the conductive wire 14d electrically connecting the electrode 17d corresponding to the photodetection region 23d and the photodetection region 23d is reduced, is longer than the length of the conductive wire 14d electrically connecting the electrode 17d corresponding to the photodetection region 23d and the photodetection region 23d. As the lengths of the conductive wires 14a and 14d increase, the electrical resistance of the conductive wires 14a and 14d increases. As the widths of the conductive wires 14a and 14d increase, the electrical resistance of the conductive wires 14a and 14d decreases. Therefore, in the configuration in which the width of the long conductive wire 14a is larger than the width of the short conductive wire 14d, an electrical resistance difference between the electrical resistance of the long conductive wire 14a and the electrical resistance of the short conductive wire 14d is reduced. Therefore, this configuration more reliably improves the time resolution of the radiation detector RD1.

The radiation detector RD1 includes the base 40, the wire 43, and the wire 44. The base 40 is disposed such that the semiconductor substrate 11 is positioned between the base 40 and the scintillator 1 and includes the portion 51 covered with the semiconductor substrate 11 and the portion 52 exposed from the semiconductor substrate. The portion 51 and the portion 52 are disposed in the first direction D1. The portion 52 includes the terminals 41a, 41b, 41c, and 41d and the terminal 42. The terminals 41a, 41b, 41c, and 41d, the terminal 42, and the scintillator 1 are disposed in front of the same surface of the base 40. The terminals 41a, 41b, 41c, and 41d are electrically connected to the electrodes 17a, 17b, 17c, and 17d by the wire 43, and the terminal 42 is electrically connected to the electrode 18 by the wire 44.

This configuration increases the mechanical strength of the radiation detector RD1. Therefore, this configuration reliably achieves the radiation detector RD1 having high mechanical strength.

The radiation detector RD1 includes the resin 45 covering the wire 43 and the wire 44.

In this configuration, the resin 45 protects the wires 43 and 44. Therefore, the wires 43 and 44 tend not to be damaged. As a result, this configuration decreases deterioration of the electrical connection between the terminals 41a, 41b, 41c, and 41d and the electrodes 17a, 17b, 17c, and 17d and the electrical connection between the terminal 42 and the electrode 18.

The radiation detector RD1 includes the light reflector 47. The light reflector 47 is disposed such that the semiconductor substrate 11 is positioned between the light reflector 47 and the scintillator 1.

For example, in the configuration in which the plurality of radiation detectors RD1 are provided, the following effects can be achieved in the case where one radiation detector RD1 includes the light reflector 47. That is, the configuration in which the light reflector 47 of the one radiation detector RD1 and the side surface 1d of another radiation detector RD1 oppose each other in the second direction D2 improves reflectance of the scintillation lights on the side surface 1d of the other radiation detector RD1 even when the light reflector 47 is not disposed on the side surface 1d of the other radiation detector RD1. Therefore, this configuration tends to achieve high time resolution in the case where the plurality of radiation detectors RD1 are provided.

In the configuration in which the radiation detector RD1 includes the base 40, the light reflector 47 is disposed such that the semiconductor substrate 11 and the base 40 are positioned between the light reflector 47 and the scintillator 1.

In this configuration, when the one radiation detector RD1 is disposed with the other radiation detector RD1 having the same configuration as the one radiation detector RD1, in the second direction D2, the light reflector 47 disposed on the base 40 of the other radiation detector RD1 improves reflectance of the scintillation lights on the side surface 1d of the one radiation detector RD1. Even in the configuration in which the one radiation detector RD1 does not include the light reflector 47 on the side surface 1d, the side surface 1d of the one radiation detector RD1 has high reflectance of the scintillation light.

In the radiation detector RD1, the wiring member 30 is disposed on the same side as the scintillator 1 relative to the semiconductor substrate 11.

In this configuration, the radiation detector RD1 does not have to include the substrate for connecting the wiring member 30 to the electrodes 17a, 17b, 17c, and 17d and the electrode 18 through, for example, die bonding. Therefore, this configuration more reliably simplifies the configuration of the radiation detector RD1. This configuration improves the space efficiency of the radiation detector RD1 as compared with a configuration in which the wiring member 30 is disposed on the opposite side of the scintillator 1 relative to the semiconductor substrate 11.

In the radiation detector RD1, at least the part of the wiring member 30 and the scintillator 1 are disposed in front of the same surface of the semiconductor substrate 11.

In this configuration, the space efficiency of the radiation detector RD1 is improved as compared with a configuration in which at least the part of the wiring member 30 and the scintillator 1 are disposed in front of the other surfaces of the semiconductor substrate 11.

In the radiation detector RD1, at least a part of the wiring member 30 and the scintillator 1 are disposed in front of the same surface of the base 40.

In this configuration, the wiring member 30 is easily connected to the electrodes 17 and 18 through die bonding.

In the radiation detector RD1, the thickness of the light reflector 47 is 0.05 to 100 μm.

In this configuration, the light reflector 47 reliably improves the reflectance of the scintillation lights on the side surface 1d. Therefore, this configuration reliably simplifies the configuration of the radiation detector RD1.

In the radiation detector RD1, the wiring member 30 and the semiconductor substrate 11 have flexibility. The flexibility of the wiring member 30 is higher than the flexibility of the semiconductor substrate 11.

In this configuration, the vibration of the wiring member 30 tends not to be transmitted to the semiconductor substrate 11. The force from the wiring member 30 tends not to be applied to the semiconductor substrate 11, and the semiconductor substrate 11 tends not to be physically damaged. Therefore, this configuration reliably improves the mechanical strength of the radiation detector RD1.

Second Embodiment

A configuration of a radiation detector RD2 according to a second embodiment will be described with reference to FIGS. 24 and 25. In the explanation of the radiation detector RD2, differences from the above-described radiation detector RD1 will be mainly explained, and overlapped explanation is omitted.

Figure 24:
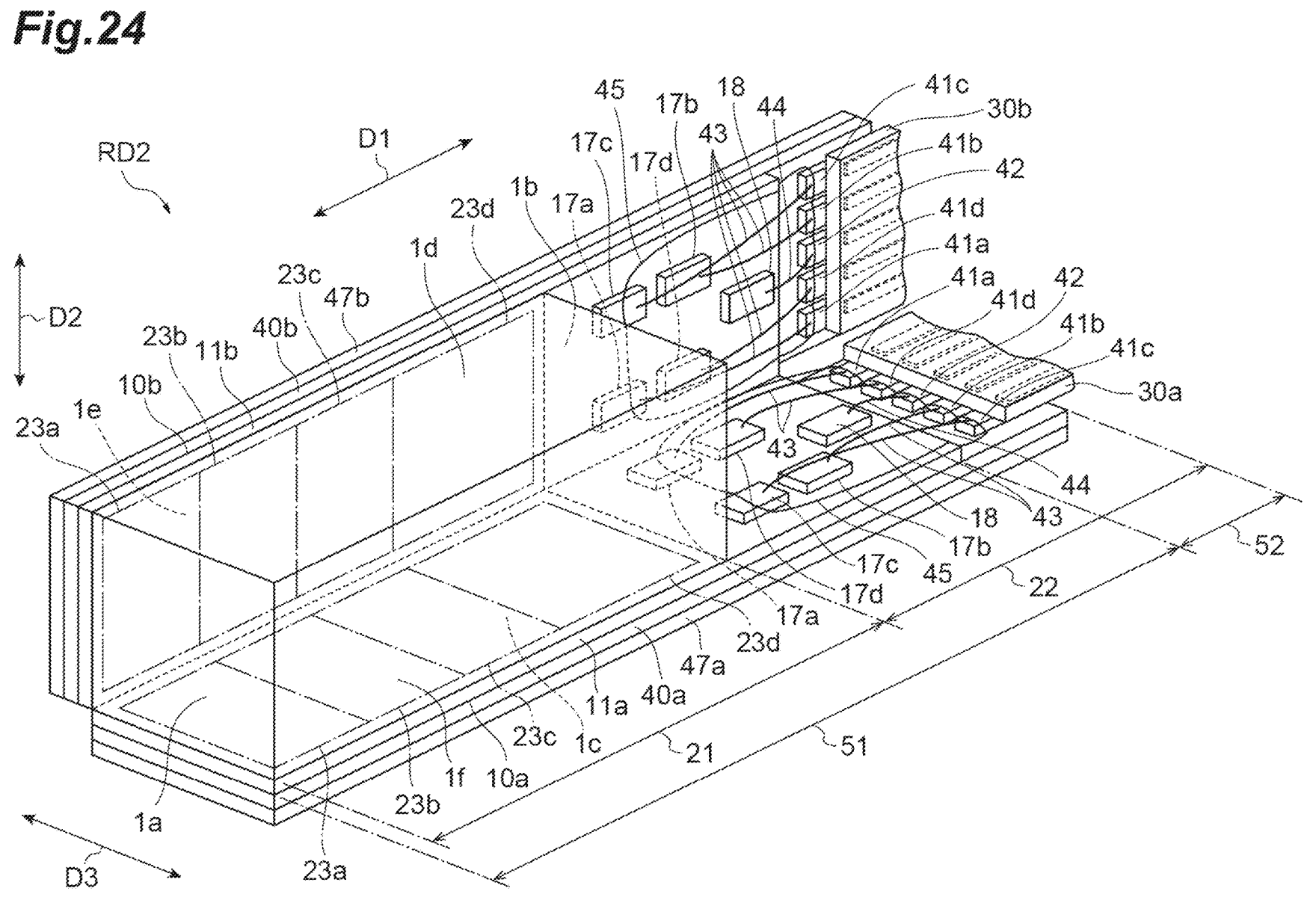

FIG. 24 is a perspective view illustrating the radiation detector RD2 according to the second embodiment. The radiation detector RD2 includes a scintillator 1, a semiconductor photodetector 10a, a semiconductor photodetector 10b, a wiring member 30a, and a wiring member 30b. The semiconductor photodetectors 10a and 10b detect scintillation lights generated in the scintillator 1. The semiconductor photodetector 10a includes a semiconductor substrate 11a and is electrically connected to the wiring member 30a. The semiconductor photodetector 10b includes a semiconductor substrate 11b and is electrically connected to the wiring member 30b. For example, when the semiconductor photodetector 10a includes a first semiconductor photodetector, the semiconductor photodetector 10b includes a second semiconductor photodetector. For example, when the wiring member 30a includes a first wiring member, the wiring member 30b includes a second wiring member. For example, when the semiconductor substrate 11a includes a first semiconductor substrate, the semiconductor substrate 11b includes a second semiconductor substrate.

The scintillator 1 according to the present embodiment includes a pair of end surfaces 1a and 1b opposing each other, a pair of side surfaces 1c and 1d opposing each other, and a pair of side surfaces 1e and 1f opposing each other. The side surface 1d is a surface opposing the side surface 1c, and the side surface 1f is a surface opposing the side surface 1e. In the present embodiment, a length of the side surface 1c in the first direction D1 is longer than a width of the side surface 1c in the third direction D3, and a length of the side surface 1e in the first direction D1 is longer than a width of the side surface 1e in the second direction D2. A length of the scintillator 1 in the first direction D1 is longer than a length of the scintillator 1 in the second direction D2 and a length of the scintillator in the third direction D3. The first direction D1 is a longitudinal direction of the scintillator 1. The second direction D2 is orthogonal to the side surface 1c, and the third direction D3 is orthogonal to the side surface 1e. In the present embodiment and modification examples according to the present embodiment, for example, when the side surface 1c include a first side surface, the side surface 1e includes a second side surface.

The end surfaces 1a and 1b extend in the second direction D2. The end surfaces 1a and 1b also extend in the third direction D3. The end surfaces 1a and 1b each have a rectangular shape when viewed in the direction orthogonal to the end surfaces 1a and 1b. The side surfaces 1c and 1d each have, for example, a rectangular shape when viewed in the direction orthogonal to the side surfaces 1c and 1d. The side surfaces 1e and 1f each have, for example, a rectangular shape when viewed in the direction orthogonal to the side surfaces 1e and 1f. The scintillator 1 has a rectangular shape when viewed in the second direction D2 and the third direction D3. The scintillator 1 has a rectangular shape when viewed in the first direction D1. In the present embodiment, the scintillator 1 has a rectangular parallelepiped shape.

At least one of the end surfaces 1a and 1b includes, for example, a rough surface. Therefore, at least one of the end surfaces 1a and 1b has a triangular wave shape in a cross section. At least one of the end surfaces 1a and 1b includes, for example, a rough surface. The end surfaces 1a and 1b may include mirror surfaces.

The semiconductor substrate 11a is disposed to oppose the side surface 1c. The semiconductor substrate 11b is disposed to oppose the side surface 1e. The side surface 1e is adjacent to the side surface 1c. The semiconductor substrate 11a has, for example, the same configuration and the same function as the semiconductor substrate 11 according to the first embodiment. The semiconductor substrate 11b has the same configuration and the same function as, for example, the semiconductor substrate 11a disposed on the side surface 1c except that the semiconductor substrate 11b is disposed on the side surface 1e. The semiconductor substrate 11a is disposed on the side surface 1c with an adhesive, for example. The semiconductor substrate 11b is disposed on the side surface 1e with an adhesive, for example.

Each of the semiconductor substrate 11a and the semiconductor substrate 11b includes a portion 21 and a portion 22. In the present embodiment, the portion 21 of the semiconductor substrate 11a is covered with the side surface 1c. The portion 22 of the semiconductor substrate 11a is disposed with the portion 21 of the semiconductor substrate 11a in the first direction D1 and is exposed from the side surface 1c. The portion 21 of the semiconductor substrate 11b is covered with the side surface 1e. The portion 22 of the semiconductor substrate 11b is disposed with the portion 21 of the semiconductor substrate 11b in the first direction D1 and is exposed from the side surface 1e.

Each of the semiconductor photodetector 10a and the semiconductor photodetector 10b includes a plurality of photodetection regions 23a, 23b, 23c, and 23d, and the photodetection regions 23a, 23b, 23c, and 23d are disposed in the portion 21. In the present embodiment, the four photodetection regions 23a, 23b, 23c, and 23d are disposed. The plurality of photodetection regions 23a, 23b, 23c, and 23d are disposed in the first direction D1. Each of the plurality of photodetection regions 23a, 23b, 23c, and 23d includes a plurality of avalanche photodiodes 12 and a plurality of quenching resistors 13. One photodetection section 15 is configured to include one avalanche photodiode 12 and one quenching resistor 13 electrically connected in series with the corresponding avalanche photodiode 12. A plurality of photodetection sections 15 are disposed in the portion 21.

In the portion 22, the electrodes 17a, 17b, 17c, and 17d and the electrode 18 are disposed. That is, each of the semiconductor photodetector 10a and the semiconductor photodetector 10b includes the electrodes 17a, 17b, 17c, and 17d and the electrode 18. The plurality of quenching resistors 13 are electrically connected in parallel with the electrodes 17a, 17b, 17c, and 17d through conductive wires 14a, 14b, 14c, and 14d, respectively. Each of the plurality of quenching resistors 13 is electrically connected in series with one of an anode or a cathode of the corresponding avalanche photodiode 12 of the plurality of avalanche photodiodes 12. Another of the anode or the cathode of each of the plurality of avalanche photodiodes 12 is electrically connected in parallel with the electrode 18 through the conductive wire 14e.

The wiring member 30a is disposed on the same side as the scintillator 1 relative to the semiconductor substrate 11a. The wiring member 30b is disposed on the same side as the scintillator 1 relative to the semiconductor substrate 11b. That is, at least a part of the wiring member 30a and the scintillator 1 are disposed in front of the same surface of the semiconductor substrate 11a, for example. That is, at least a part of the wiring member 30b and the scintillator 1 are disposed in front of the same surface of the semiconductor substrate 11b, for example. The wiring member 30a has, for example, the same configuration and the same function as the wiring member 30 according to the first embodiment. The wiring member 30b has the same configuration and the same function as, for example, the wiring member 30a electrically connected to the semiconductor substrate 11a except that the wiring member 30b is electrically connected to the semiconductor substrate 11b.

The wiring members 30a and 30b each include conductors 31a, 31b, 31c, and 31d and a conductor 32. The conductors 31a, 31b, 31c, and 31d are electrically connected to the electrodes 17a, 17b, 17c, and 17d, respectively. That is, the conductor 31a is electrically connected to the electrode 17a. The conductor 31b is electrically connected to the electrode 17b. The conductor 31c is electrically connected to the electrode 17c. The conductor 31d is electrically connected to the electrode 17d. The conductor 32 is connected to the electrode 18. The wiring member 30a, the wiring member 30b, the semiconductor substrate 11a, and the semiconductor substrate 11b have flexibility. The flexibility of the wiring member 30a is higher than the flexibility of the semiconductor substrate 11a. The flexibility of the wiring member 30b is higher than the flexibility of the semiconductor substrate 11b.

When viewed in the second direction D2, one region including outlines of the plurality of photodetection regions 23a, 23b, 23c, and 23d of the semiconductor substrate 11a has a shape corresponding to an outline shape of the side surface 1c. The photodetection sections 15 are all disposed such that the photodetection regions 23a, 23b, 23c, and 23d have an outline shape corresponding to the outline shape of the side surface 1c when viewed in the second direction D2. In the present embodiment, the outline shape of the side surface 1c is a rectangular shape when viewed in the second direction D2. The one region including the outlines of the plurality of photodetection regions 23a, 23b, 23c, and 23d has a rectangular outline shape corresponding to the outline shape of the side surface 1c.

When viewed in the third direction D3, one region including outlines of the plurality of photodetection regions 23a, 23b, 23c, and 23d of the semiconductor substrate 11b has a shape corresponding to an outline shape of the side surface 1e. The photodetection sections 15 are all disposed such that the photodetection regions 23a, 23b, 23c, and 23d have an outline shape corresponding to the outline shape of the side surface 1e when viewed in the third direction D3. In the present embodiment, the outline shape of the side surface 1e is a rectangular shape when viewed in the third direction D3. The one region including the outlines of the plurality of photodetection regions 23a, 23b, 23c, and 23d has a rectangular outline shape corresponding to the outline shape of the side surface 1e.

In the semiconductor substrates 11a and 11b, the photodetection regions 23a, 23b, 23c, and 23d are disposed in the first direction D1, for example. In the present embodiment, the photodetection region 23a, the photodetection region 23b, the photodetection region 23c, and the photodetection region 23d are disposed in this order. The photodetection region 23d is closer to the portion 22 than the photodetection region 23a, the photodetection region 23b, and the photodetection region 23c. The photodetection region 23c is closer to the portion 22 than the photodetection region 23a and the photodetection region 23b. The photodetection region 23b is closer to the portion 22 than the photodetection region 23a. In the present embodiment, a width of the conductive wire 14a is larger than any widths of the conductive wires 14b, 14c, and 14d. The width of the conductive wire 14b is larger than any widths of the conductive wires 14c and 14d. The width of the conductive wire 14c is larger than the width of the conductive wire 14d. For example, when the photodetection region 23a includes a first photodetection region, the photodetection region 23d includes a second photodetection region.

The radiation detector RD2 includes a base 40a and a base 40b. The base 40a is disposed such that the semiconductor substrate 11 is positioned between the base 40a and the scintillator 1. The base 40b is disposed such that the semiconductor substrate 11 is positioned between the base 40b and the scintillator 1.

In a configuration in which the radiation detector RD2 includes the base 40a and the base 40b, at least a part of the wiring member 30a and the scintillator 1 are disposed in front of the same surface of the base 40a, for example. At least a part of the wiring member 30b and the scintillator 1 are disposed in front of the same surface of the base 40b, for example.

The base 40a has, for example, the same configuration and the same function as the base 40 according to the first embodiment. The base 40b has, for example, the same configuration and the same function as the base 40a. For example, when the base 40a includes a first base, the base 40b includes a second base.

The base 40a and the base 40b include a portion 51 and a portion 52. The portion 51 of the base 40a is covered with the semiconductor substrate 11a. The portion 52 of the base 40a is disposed with the portion 51 of the base 40a in the first direction D1 and is exposed from the semiconductor substrate 11a. The portion 51 of the base 40b is covered with the semiconductor substrate 11b. The portion 52 of the base 40b is disposed with the portion 51 of the base 40b in the first direction D1 and is exposed from the semiconductor substrate 11b.

The radiation detector RD2 includes, for example, wires 43 and wires 44, and the portion 52 of the base 40a includes terminals 41a, 41b, 41c, and 41d and a terminal 42. The portion 52 of the base 40b includes the terminals 41 and the terminal 42. The terminals 41a, 41b, 41c, and 41d and the scintillator 1 are disposed in front of the same surface of the corresponding base 40a. The terminal 42 and the scintillator 1 are disposed in front of the same surface of the corresponding base 40b. The terminals 41a, 41b, 41c, and 41d of the base 40a and the base 40b are electrically connected to the electrodes 17 by the wires 43, and the terminals 42 of the base 40a and the base 40b are electrically connected to the electrodes 18 by the wires 44. The radiation detector RD2 may not include any one of the base 40a and the base 40b. The radiation detector RD2 may not include both the base 40a and the base 40b.

The radiation detector RD2 includes, for example, resins 45. The wires 43 and the wires 44 are covered with, for example, the resins 45. The resin 45 covers the wire 43 and the wire 44 individually or covers both the wire 43 and the wire 44. In the configuration in which the resins 45 individually cover the wire 43 and the wire 44, the resins may be separated from each other or connected to each other.

The radiation detector RD2 includes, for example, a light reflector 47a and a light reflector 47b. The light reflector 47a is disposed such that the semiconductor substrate 11a is positioned between the light reflector 47a and the scintillator 1. The light reflector 47b is disposed such that the semiconductor substrate 11b is positioned between the light reflector 47b and the scintillator 1. In the configuration in which the radiation detector RD2 includes the base 40a, the light reflector 47a is disposed such that the semiconductor substrate 11a and the base 40a are positioned between the light reflector 47a and the scintillator 1. In this configuration, for example, the scintillator 1, the semiconductor substrate 11a, the base 40a, and the light reflector 47a are disposed in this order. In a configuration in which the radiation detector RD2 does not include the base 40a, the scintillator 1, the semiconductor substrate 11a, and the light reflector 47a are disposed in this order. In the configuration in which the radiation detector RD2 includes the base 40b, the light reflector 47b is disposed such that the semiconductor substrate 11b and the base 40b between the light reflector 47b and the scintillator 1. In this configuration, for example, the scintillator 1, the semiconductor substrate 11b, the base 40b, and the light reflector 47b are disposed in this order. In a configuration in which the radiation detector RD2 does not include the base 40b, the scintillator 1, the semiconductor substrate 11b, and the light reflector 47b are disposed in this order. The radiation detector RD2 may not include any one of the light reflector 47a and the light reflector 47b. For example, when the light reflector 47a includes a first light reflector, the light reflector 47b includes a second light reflector.

The light reflectors 47a and 47b are made of, for example, the same material and have the same configuration as the light reflector 47 according to the first embodiment. Thicknesses of the light reflectors 47a and 47b are, for example, 0.05 to 100 μm.

Figure 25:
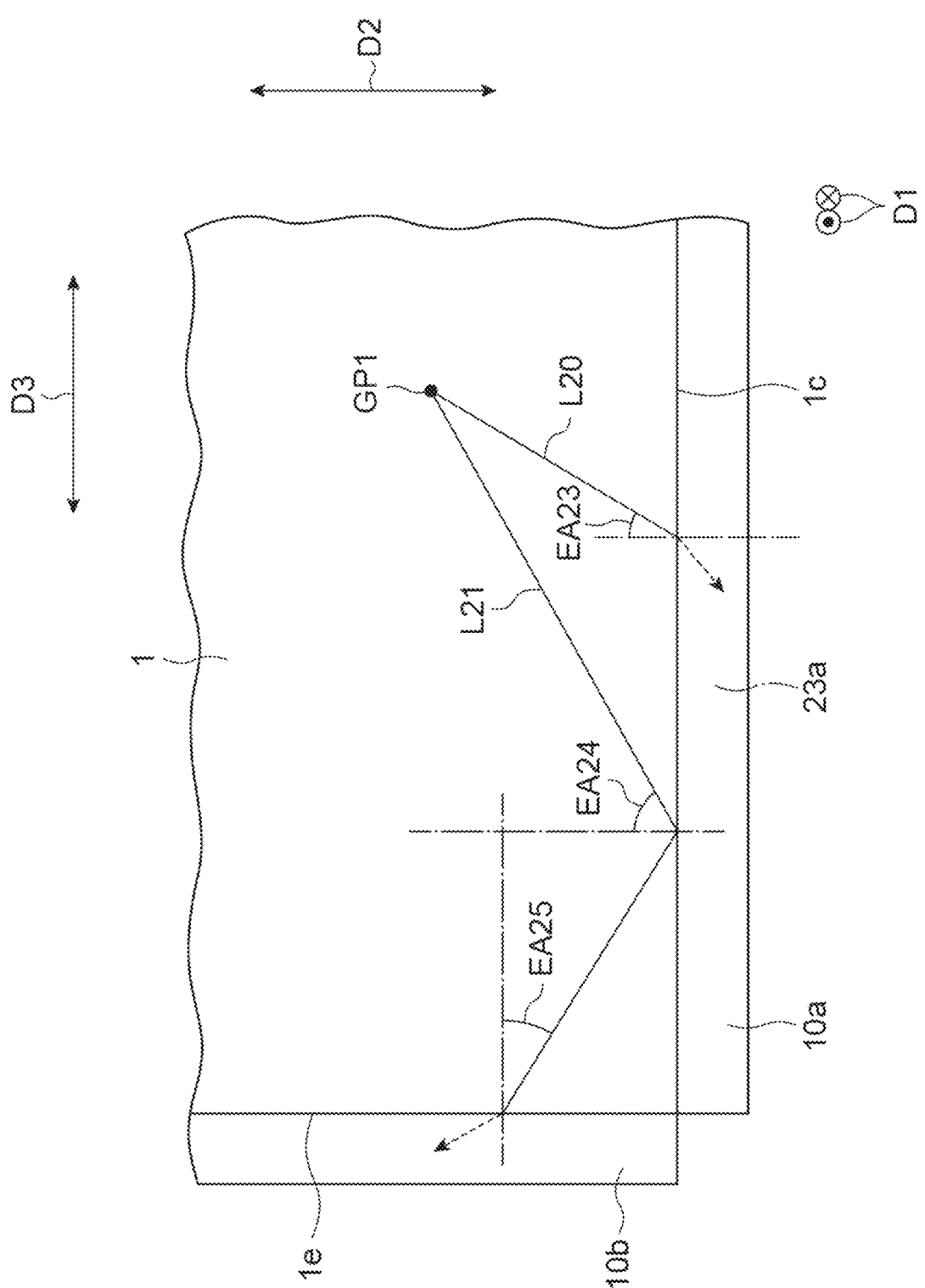
FIG. 25 is a view illustrating paths of some scintillation lights.

FIG. 25 is a view illustrating paths of some scintillation lights. FIG. 25 illustrates the paths of some scintillation lights when the scintillator 1 is viewed in the first direction D1. The scintillation lights include, for example, a light L20 and a light L21 incident on the side surface 1c from the generation point GP1. The light L20 is incident on the side surface 1c at an incidence angle EA23. The light L21 is incident on the side surface 1c at an incidence angle EA24. The incidence angle EA23 is smaller than the critical angle on the side surface 1c. The incidence angle EA24 is larger than the critical angle on the side surface 1c. In the present embodiment, the semiconductor photodetectors 10a and 10b can adhere to the scintillator 1 with adhesives having the same refractive index. In this case, the critical angle on the side surface 1e is equal to the critical angle on the side surface 1c.

As illustrated in FIG. 25, the light L20 is incident on the side surface 1c at the incidence angle EA23 and is emitted from the side surface 1c. The light L20 is detected by the semiconductor photodetector 10a disposed on the side surface 1c. The light L21 is incident on the side surface 1c at the incidence angle EA24 and is totally reflected by the side surface 1c. The light L21 tends not to be detected by the semiconductor photodetector 10a disposed on the side surface 1c. However, the light L21 is totally reflected by the side surface 1c and then is incident on the side surface 1e, for example. An incidence angle EA25 of the light L21 incident on the side surface 1e may be smaller than the critical angle on the side surface 1e. In this case, the light L21 is incident on the side surface 1e and is detected by the semiconductor photodetector 10b disposed on the side surface 1e. That is, even when the incidence angle of the light on the side surface 1c exceeds the critical angle and the light is not detected by the semiconductor photodetector 10a disposed on the side surface 1c, the scintillation light is detected by any one of the photodetection regions 23a, 23b, 23c, and 23d of the semiconductor photodetector 10b disposed on the side surface 1e adjacent to the side surface 1c. This scintillation light is detected by, for example, the photodetection region 23a.

As an example, the incidence angle EA25 is 90 degrees— the incidence angle EA24. For example, when the incidence angle EA24 is 60 degrees or larger, the incidence angle EA25 is 30 degrees or smaller. As described above, when a refractive index of the scintillator 1 is 1.8, and a refractive index of the adhesive for causing the semiconductor photodetectors 10a and 10b to adhere to the side surfaces 1c and 1e is 1.5, respectively, the critical angles on the side surfaces 1c and 1e are about 56.4 degrees. In this case, a scintillation light having the incidence angle EA24 of 60 degrees or larger is totally reflected by the side surface 1c even if the scintillation light is incident on the side surface 1c. However, when the scintillation light is incident on the side surface 1e adjacent to the side surface 1c, the scintillation light is incident on the side surface 1e and is detected by any one of the photodetection regions 23a, 23b, 23c, and 23d of the semiconductor photodetector 10b disposed on the side surface 1e, for example, the photodetection region 23a. When the incidence angle EA24 of the scintillation light is, for example, 50 degrees or smaller, the scintillation light is emitted from the side surface 1c and is detected by any one of the photodetection regions 23a, 23b, 23c, and 23d of the semiconductor photodetector 10a disposed on the side surface 1c. In the present embodiment, for example, signal processing circuits connected to the wiring members 30a and 30b performs calculation by adding electrical signals output in response to light incidence on the photodetection regions 23a, 23b, 23c, and 23d.

Figure 26:
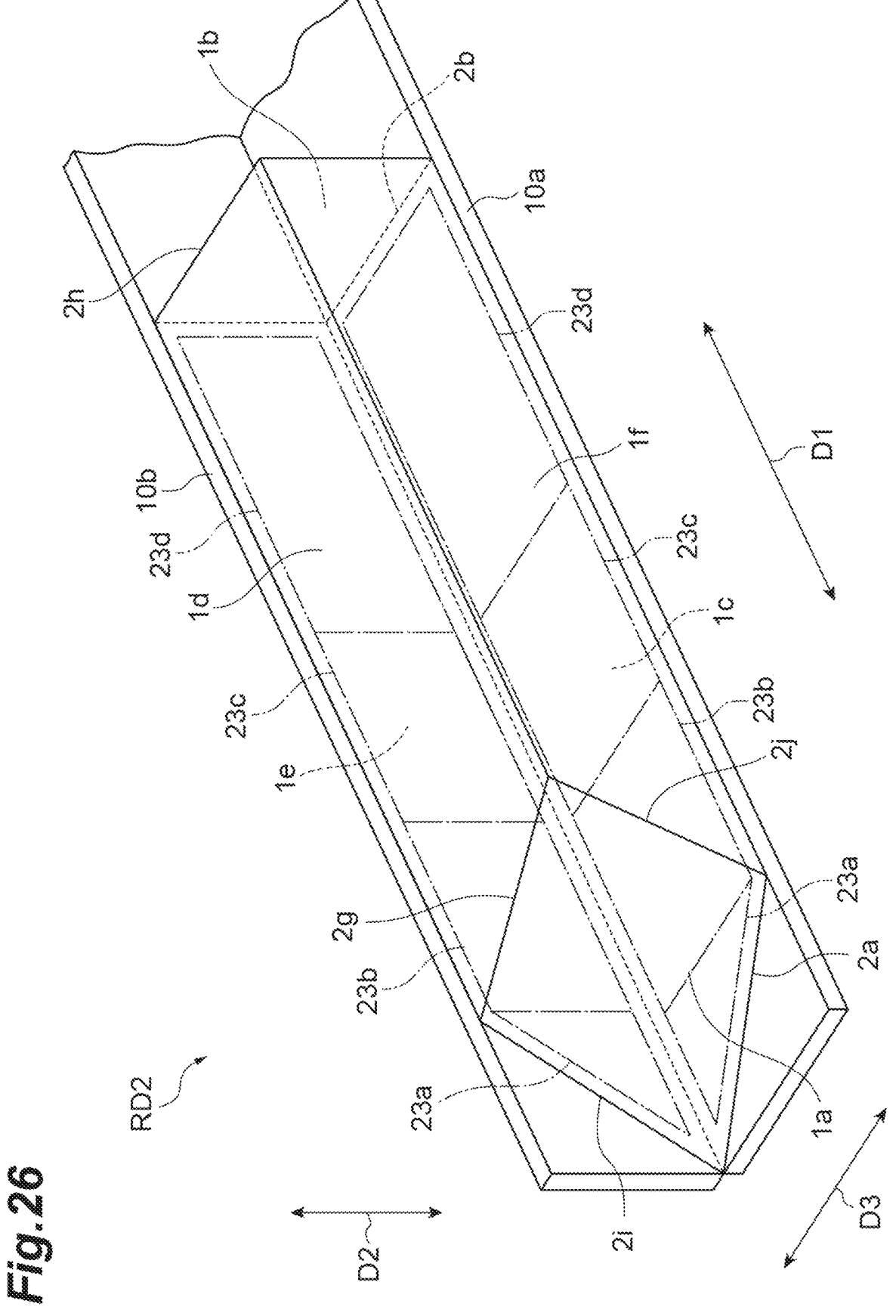
FIG. 26 is a perspective view illustrating a radiation detector according to a first modification example of the second embodiment.

A first modification example of the radiation detector RD2 according to the second embodiment will be described with reference to FIG. 26. FIG. 26 is a perspective view illustrating a radiation detector RD2 according to the first modification example of the second embodiment. The radiation detector RD2 according to the present modification example has the same configuration as the radiation detector RD2 according to the second embodiment except for configurations of the scintillator 1 and the photodetection regions 23a, 23b, 23c, and 23d.

The scintillator 1 according to the present modification example includes a pair of end surfaces 1a and 1b opposing each other in the first direction D1, a pair of side surfaces 1c and 1d opposing each other in the second direction D2, and a pair of side surfaces 1e and 1f opposing each other in the third direction D3. The end surfaces 1a and 1b, the side surfaces 1c and 1d, and the side surfaces 1e and 1f include outer surfaces of the scintillator 1. In the present modification example, unlike the second embodiment, the end surface 1a is inclined relative to the second direction D2. The pair of end surfaces 1a and 1b includes one end surface 1a inclined relative to the second direction D2. The end surface 1a is also inclined relative to the third direction D3. The end surface 1b extends in both the second direction D2 and the third direction D3. In the present modification example, a direction perpendicular to the side surface 1c coincides with the second direction D2, and a direction perpendicular to the side surface 1e coincides with the third direction D3. The first direction D1 is a longitudinal direction of the scintillator 1. The end surfaces 1a and 1b have a rectangular shape when viewed in the first direction D1. The scintillator 1 has, for example, a rectangular shape when viewed in the first direction D1.

When viewed in the second direction D2, an edge 2a of the side surface 1c on the end surface 1a side is inclined relative to the third direction D3. When viewed in the second direction D2, an edge 2g of the side surface 1d on the end surface 1a side is inclined relative to the third direction D3. The edge 2a and the edge 2g extend substantially parallel to each other, for example, when viewed in the second direction D2. When viewed in the second direction D2, the edge 2a and the edge 2g form, for example, an angle of 10 to 80 degrees in a counterclockwise direction relative to the third direction D3. When viewed in the second direction D2, an edge 2b of the side surface 1c on the end surface 1b side and an edge 2h of the side surface 1d on the end surface 1b side extend in the third direction D3, for example.

The photodetection regions 23a, 23b, 23c, and 23d of the semiconductor substrate 11a are disposed in the first direction D1, for example. When viewed in the second direction D2, one region including outlines of the plurality of photodetection regions 23a, 23b, 23c, and 23d of the semiconductor substrate 11a has a shape corresponding to an outline shape of the side surface 1c. The photodetection region 23a has, for example, a triangular outline shape corresponding to the outline shape of the side surface 1c. The photodetection regions 23b, 23c, and 23d have, for example, a rectangular outline shape.

When viewed in the third direction D3, an edge 2i of the side surface 1e on the end surface 1a side is inclined relative to the second direction D2, and an edge 2j of the side surface 1f on the end surface 1a side is inclined relative to the second direction D2. The edge 2i and the edge 2j extend substantially parallel to each other when viewed in the third direction D3. When the side surface 1f is viewed in the third direction D3, the edge 2i and the edge 2j form, for example, an angle of 10 to 80 degrees in a clockwise direction relative to the second direction D2.

The photodetection regions 23a, 23b, 23c, and 23d of the semiconductor substrate 11b are disposed in the first direction D1, for example. The one region including the outlines of the plurality of photodetection regions 23a, 23b, 23c, and 23d of the semiconductor substrate 11b has a shape corresponding to the outline shape of the side surface 1e. The photodetection region 23a has, for example, a triangular outline shape corresponding to the outline shape of the side surface 1e. The photodetection regions 23b, 23c, and 23d have, for example, a rectangular outline shape.

In the present modification example, a length of the side surface 1c in the first direction D1 is longer than a width of the side surface 1c in the third direction D3, and a length of the side surface 1e in the first direction D1 is longer than a width of the side surface 1e in the second direction D2. A length of the scintillator 1 in the first direction D1 is longer than a length of the scintillator 1 in the second direction D2 and a length of the scintillator in the third direction D3. At least one of the end surfaces 1a and 1b includes, for example, a rough surface. Only the end surface 1b may include a rough surface, and the end surface 1a may not include a rough surface. The side surfaces 1c and 1e include, for example, mirror surfaces.

In the present modification example, the end surface 1a is inclined relative to both the second direction D2 and the third direction D3 so that a scintillation light tends to be totally reflected toward the side surfaces 1c and 1e. Therefore, of scintillation lights, a light incident on the end surface 1a and reflected by the end surface 1a tends to be incident on the side surfaces 1c and 1e.

Figure 27:
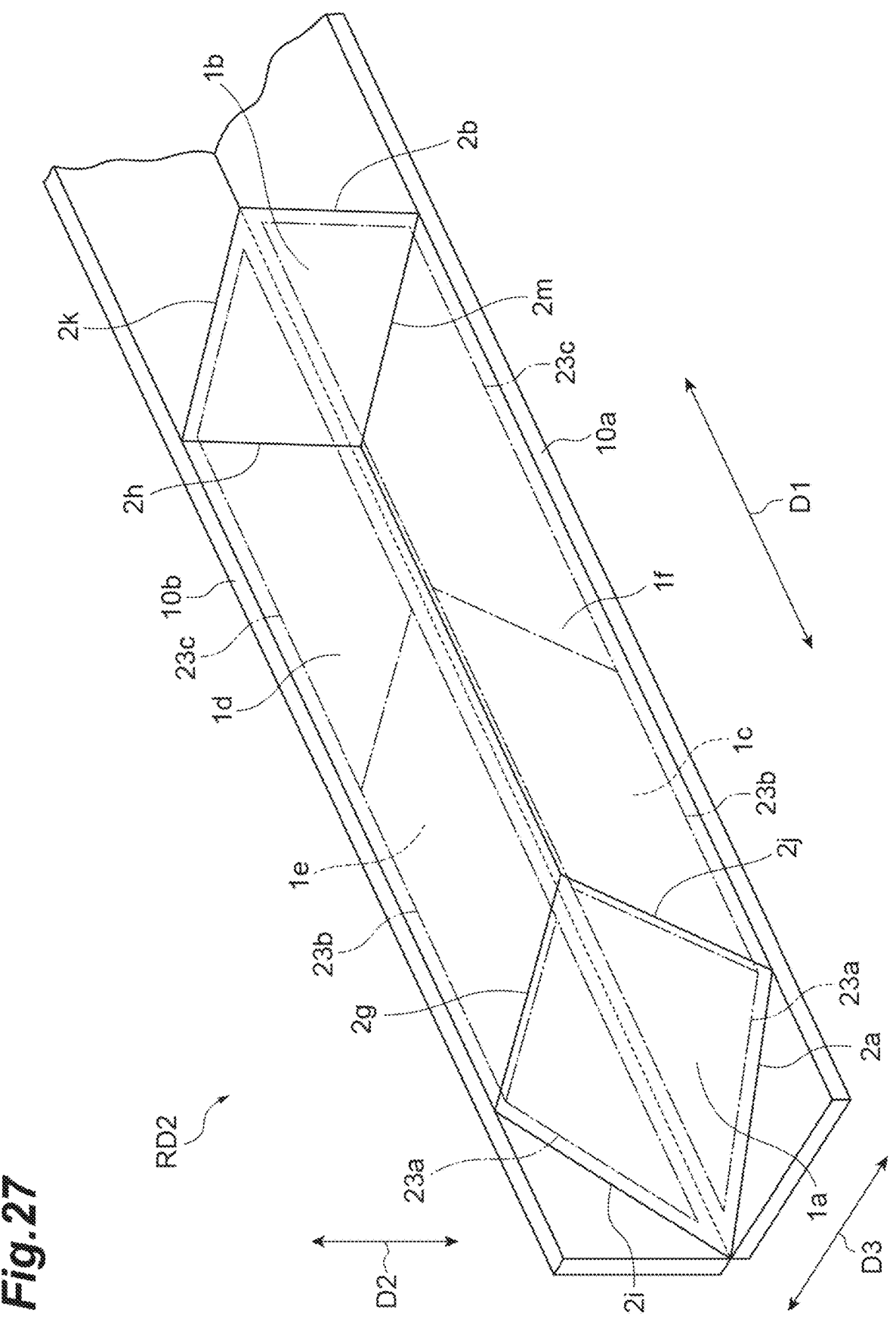
FIG. 27 is a perspective view illustrating a radiation detector according to a second modification example of the second embodiment.

A second modification example of the radiation detector RD2 according to the second embodiment will be described with reference to FIG. 27. FIG. 27 is a perspective view illustrating a radiation detector RD2 according to the second modification example of the second embodiment. The radiation detector RD2 according to the present modification example has the same configuration as the radiation detector RD2 according to the second embodiment except for configurations of the scintillator 1 and the photodetection regions 23a, 23b, and 23c.

The scintillator 1 according to the present modification example includes a pair of end surfaces 1a and 1b opposing each other in the first direction D1, a pair of side surfaces 1c and 1d opposing each other in the second direction D2, and a pair of side surfaces 1e and 1f opposing each other in the third direction D3. The end surfaces 1a and 1b, the side surfaces 1c and 1d, and the side surfaces 1e and 1f include outer surfaces of the scintillator 1. In the present modification example, unlike the second embodiment, the end surfaces 1a and 1b are inclined relative to the second direction D2. The pair of end surfaces 1a and 1b includes one of the end surfaces 1a and 1b inclined relative to the second direction D2. The end surfaces 1a and 1b are also inclined relative to the third direction D3. In the present modification example, a direction perpendicular to the side surface 1c coincides with the second direction D2, and a direction perpendicular to the side surface 1e coincides with the third direction D3. The first direction D1 is a longitudinal direction of the scintillator 1. The end surfaces 1a and 1b have a rectangular shape when viewed in the first direction D1. The scintillator 1 has, for example, a rectangular shape when viewed in the first direction D1.

When viewed in the second direction D2, an edge 2a of the side surface 1c on the end surface 1a side is inclined relative to the third direction D3. When viewed in the second direction D2, an edge 2g of the side surface 1d on the end surface 1a side is inclined relative to the third direction D3. The edge 2a and the edge 2g extend substantially parallel to each other, for example, when viewed in the second direction D2. When viewed in the second direction D2, the edge 2a and the edge 2g form, for example, an angle of 10 to 80 degrees in a counterclockwise direction relative to the third direction D3.

When viewed in the second direction D2, an edge 2b of the side surface 1c on the end surface 1b side is inclined relative to the third direction D3. When viewed in the second direction D2, an edge 2h of the side surface 1d on the end surface 1b side is inclined relative to the third direction D3. The edge 2b and the edge 2h extend substantially parallel to each other, for example, when viewed in the second direction D2. When viewed in the second direction D2, the edge 2b and the edge 2h form, for example, an angle of 10 to 80 degrees in a clockwise direction relative to the third direction D3. The side surfaces 1c and 1d have, for example, a trapezoidal shape when viewed in the second direction D2.

The photodetection regions 23a, 23b, and 23c of the semiconductor substrate 11a are disposed in the first direction D1, for example. When viewed in the second direction D2, one region including outlines of a plurality of photodetection regions 23a, 23b, and 23c of the semiconductor substrate 11a has a shape corresponding to an outline shape of the side surface 1c. In the present modification example, the outline shape of the side surface 1c is a trapezoidal shape when viewed in the second direction D2. The one region including the outlines of the plurality of photodetection regions 23a, 23b, and 23c of the semiconductor substrate 11a has a trapezoidal shape corresponding to the outline shape of the side surface 1c.

When viewed in the third direction D3, an edge 2i of the side surface 1e on the end surface 1a side is inclined relative to the second direction D2. When viewed in the third direction D3, an edge 2j of the side surface 1f on the end surface 1a side is inclined relative to the second direction D2. For example, the edge 2i and the edge 2j extend substantially parallel to each other when viewed in the third direction D3. When the side surface 1f is viewed in the third direction D3, the edge 2i and the edge 2j form, for example, an angle of 10 to 80 degrees in a clockwise direction relative to the second direction D2.

When viewed in the third direction D3, an edge 2k of the side surface 1e on the end surface 1b side is inclined relative to the second direction D2. When viewed in the third direction D3, an edge 2m of the side surface 1f on the end surface 1b side is inclined relative to the second direction D2. For example, the edge 2k and the edge 2m extend substantially parallel to each other when viewed in the third direction D3. When the side surface 1f is viewed in the third direction D3, the edge 2k and the edge 2m form, for example, an angle of 10 to 80 degrees in a counterclockwise direction relative to the second direction D2. The side surfaces 1e and 1f have, for example, a trapezoidal shape when viewed in the third direction D3.

The photodetection regions 23a, 23b, and 23c of the semiconductor substrate 11b are disposed in the first direction D1, for example. When viewed in the third direction D3, one region including outlines of the plurality of photodetection regions 23a, 23b, and 23c of the semiconductor substrate 11b has a shape corresponding to an outline shape of the side surface 1e. In the present modification example, the outline shape of the side surface 1e is a trapezoidal shape when viewed in the third direction D3. The one region including the outlines of the plurality of photodetection regions 23a, 23b, and 23c of the semiconductor substrate 11b has a trapezoidal shape corresponding to the outline shape of the side surface 1e.

In the present modification example, a length of the side surface 1c in the first direction D1 is longer than a width of the side surface 1c in the third direction D3, and a length of the side surface 1e in the first direction D1 is longer than a width of the side surface 1e in the second direction D2. A length of the scintillator 1 in the first direction D1 is longer than a length of the scintillator 1 in the second direction D2 and a length of the scintillator in the third direction D3.

At least one of the end surfaces 1a and 1b includes, for example, a rough surface. Therefore, at least one of the end surfaces 1a and 1b has a triangular wave shape in a cross section. At least one of the end surfaces 1a and 1b includes, for example, a rough surface. The end surfaces 1a and 1b may include mirror surfaces. The side surfaces 1c and 1e include, for example, mirror surfaces.

In the present modification example, the end surfaces 1a and 1b are inclined relative to both the second direction D2 and the third direction D3 so that a scintillation light tends to be totally reflected toward the side surfaces 1c and 1e. Therefore, of scintillation lights, a light incident on the end surface 1a and reflected by the end surface 1a tends to be incident on the side surfaces 1c and 1e. The light incident on the end surface 1b and reflected by the end surface 1b tends to be incident on the side surfaces 1c and 1e.

Figure 28:
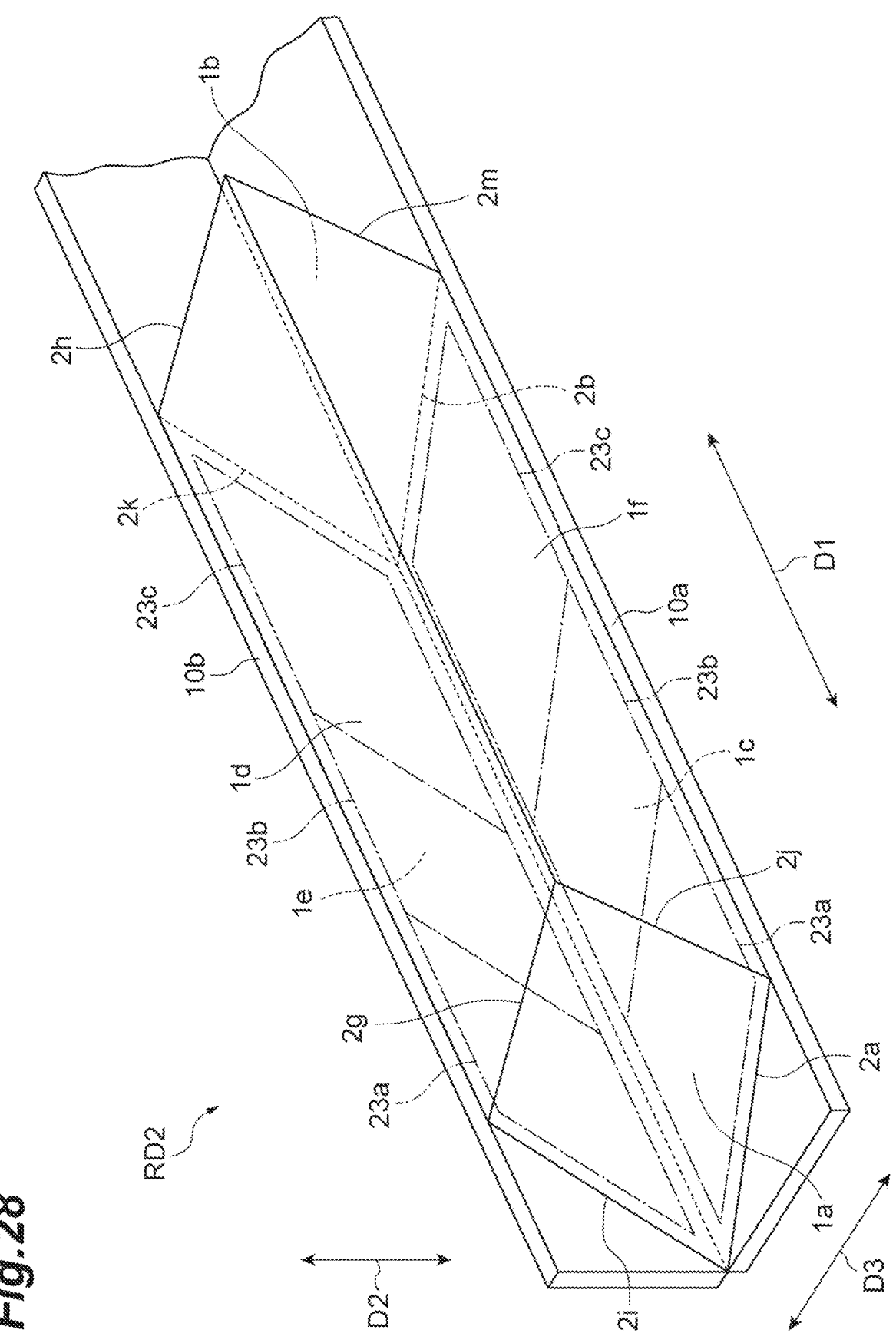
FIG. 28 is a perspective view illustrating a radiation detector according to a third modification example of the second embodiment.

A third modification example of the radiation detector RD2 according to the second embodiment will be described with reference to FIG. 28. FIG. 28 is a perspective view illustrating a radiation detector RD2 according to the third modification example of the second embodiment. The radiation detector RD2 according to the present modification example has the same configuration as the radiation detector RD2 according to the second embodiment except for configurations of the scintillator 1 and the photodetection regions 23a, 23b, and 23c.

The scintillator 1 according to the present modification example includes a pair of end surfaces 1a and 1b opposing each other in the first direction D1, a pair of side surfaces 1c and 1d opposing each other in the second direction D2, and a pair of side surfaces 1e and 1f opposing each other in the third direction D3. The end surfaces 1a and 1b, the side surfaces 1c and 1d, and the side surfaces 1e and 1f include outer surfaces of the scintillator 1. In the present modification example, unlike the second embodiment, the end surfaces 1a and 1b are inclined relative to the second direction D2. The pair of end surfaces 1a and 1b includes one of the end surfaces 1a and 1b inclined relative to the second direction D2. The end surfaces 1a and 1b are also inclined relative to the third direction D3. In the present modification example, a direction perpendicular to the side surface 1c coincides with the second direction D2, and a direction perpendicular to the side surface 1e coincides with the third direction D3. The first direction D1 is a longitudinal direction of the scintillator 1. The end surfaces 1a and 1b have a rectangular shape when viewed in the first direction D1. The scintillator 1 has, for example, a rectangular shape when viewed in the first direction D1.

When viewed in the second direction D2, an edge 2a of the side surface 1c on the end surface 1a side is inclined relative to the third direction D3. When viewed in the second direction D2, an edge 2g of the side surface 1d on the end surface 1a side is inclined relative to the third direction D3. The edge 2a and the edge 2g extend substantially parallel to each other, for example, when viewed in the second direction D2. When viewed in the second direction D2, the edge 2a and the edge 2g form, for example, an angle of 10 to 80 degrees in a counterclockwise direction relative to the third direction D3.

When viewed in the second direction D2, an edge 2b of the side surface 1c on the end surface 1b side is inclined relative to the third direction D3. When viewed in the second direction D2, an edge 2h of the side surface 1d on the end surface 1b side is inclined relative to the third direction D3. The edge 2b and the edge 2h extend substantially parallel to each other, for example, when viewed in the second direction D2. When viewed in the second direction D2, the edge 2b and the edge 2h form, for example, an angle of 10 to 80 degrees in a counterclockwise direction relative to the third direction D3.

The photodetection regions 23a, 23b, and 23c of the semiconductor substrate 11a are disposed in the first direction D1, for example. When viewed in the second direction D2, one region including outlines of a plurality of photodetection regions 23a, 23b, and 23c of the semiconductor substrate 11a has a shape corresponding to an outline shape of the side surface 1c. In the present modification example, an outline shape of the side surface 1c is a parallelogrammatic shape when viewed in the second direction D2. The one region including the outlines of the plurality of photodetection regions 23a, 23b, and 23c of the semiconductor substrate 11a has a parallelogrammatic shape corresponding to the outline shape of the side surface 1c.

When viewed in the third direction D3, an edge 2i of the side surface 1e on the end surface 1a side is inclined relative to the second direction D2, and an edge 2j of the side surface 1f on the end surface 1a side is inclined relative to the second direction D2. The edge 2i and the edge 2j extend substantially parallel to each other when viewed in the third direction D3. When the side surface 1f is viewed in the third direction D3, the edge 2i and the edge 2j form, for example, an angle of 10 to 80 degrees in a clockwise direction relative to the second direction D2.

When viewed in the third direction D3, an edge 2k of the side surface 1e on the end surface 1b side is inclined relative to the second direction D2, and an edge 2m of the side surface 1f on the end surface 1b side is inclined relative to the second direction D2. The edge 2k and the edge 2m extend substantially parallel to each other when viewed in the third direction D3. When the side surface 1f is viewed in the third direction D3, the edge 2k and the edge 2m form, for example, an angle of 10 to 80 degrees in a clockwise direction relative to the second direction D2. The side surfaces 1e and 1f have, for example, a parallelogrammatic shape when viewed in the third direction D3.

The photodetection regions 23a, 23b, and 23c of the semiconductor substrate 11b are disposed in the first direction D1, for example. When viewed in the third direction D3, one region including outlines of the plurality of photodetection regions 23a, 23b, and 23c of the semiconductor substrate 11b has a shape corresponding to an outline shape of the side surface 1e. In the present modification example, an outline shape of the side surface 1e is a parallelogrammatic shape when viewed in the third direction D3. The one region including the outlines of the plurality of photodetection regions 23a, 23b, and 23c of the semiconductor substrate 11b has a parallelogrammatic shape corresponding to the outline shape of the side surface 1e.

In the present modification example, a length of the side surface 1c in the first direction D1 is longer than a width of the side surface 1c in the third direction D3, and a length of the side surface 1e in the first direction D1 is longer than a width of the side surface 1e in the second direction D2. A length of the scintillator 1 in the first direction D1 is longer than a length of the scintillator 1 in the second direction D2 and a length of the scintillator in the third direction D3. The end surfaces 1a and 1b may not include a rough surface. The side surfaces 1c and 1e include, for example, mirror surfaces.

In the present modification example, the end surfaces 1a and 1b are inclined relative to both the second direction D2 and the third direction D3 so that a scintillation light tends to be totally reflected toward the side surfaces 1c and 1e. Therefore, of scintillation lights, a light incident on the end surface 1a and reflected by the end surface 1a tends to be incident on the side surfaces 1c and 1e. The light incident on the end surface 1b and reflected by the end surface 1b tends to be incident on the side surfaces 1c and 1e.

Figure 29:
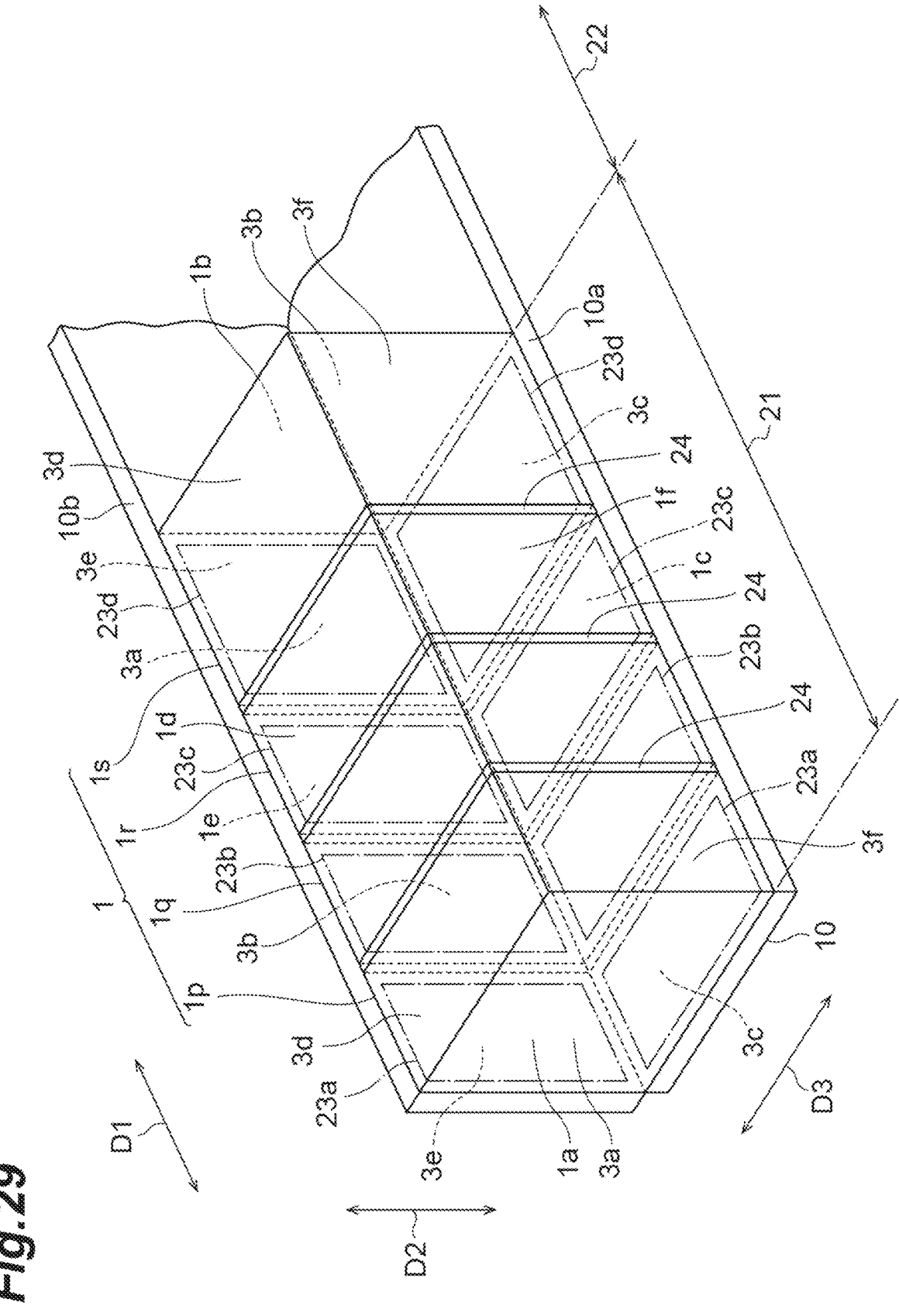
FIG. 29 is a perspective view illustrating a radiation detector according to a fourth modification example of the second embodiment.

A fourth modification example of the radiation detector RD2 according to the second embodiment will be described with reference to FIG. 29. FIG. 29 is a perspective view illustrating a radiation detector RD2 according to the fourth modification example of the second embodiment. The radiation detector RD2 according to the present modification example has the same configuration as the radiation detector RD2 according to the second embodiment except for a configuration of the scintillator 1.

As illustrated in FIG. 29, the scintillator 1 according to the present modification example includes a plurality of portions 1p, 1q, 1r, and 1s. The plurality of portions 1p, 1q, 1r, and 1s correspond to a plurality of photodetection regions 23a, 23b, 23c, and 23d, respectively.

That is, the portion 1p corresponds to the photodetection region 23a. The portion 1q corresponds to the photodetection region 23b. The portion 1r corresponds to the photodetection region 23c. The portion is corresponds to the photodetection region 23d. Each of the plurality of portions 1p, 1q, 1r, and 1s is independent each other. The scintillator 1 according to the present modification example has, for example, the same configuration as the scintillator 1 according to the eighth modification example of the first embodiment and includes the same material. The radiation detector RD2 according to the present modification example includes, for example, light reflecting members 24. The light reflecting members 24 are disposed, for example, between the plurality of portions 1p, 1q, 1r, and 1s. That is, the light reflecting members 24 are disposed, for example, between the portion 1p and the portion 1q, between the portion 1q and the portion 1r, and between the portion 1r and the portion 1s.

In the present modification example, when viewed in the second direction D2, each of the plurality of photodetection regions 23a, 23b, 23c, and 23d has an outline shape corresponding to an outline shape of a coupling surface 3c of a corresponding portion 1p, 1q, 1r, or 1s of the plurality of portions 1p, 1q, 1r, and 1s, the coupling surface 3c opposing the semiconductor substrate 11a. That is, the photodetection region 23a has an outline shape corresponding to the outline shape of the coupling surface 3c of the corresponding portion 1p, the coupling surface 3c opposing the semiconductor substrate 11a. The photodetection region 23b has an outline shape corresponding to the outline shape of the coupling surface 3c of the corresponding portion 1q, the coupling surface 3c opposing the semiconductor substrate 11a. The photodetection region 23c has an outline shape corresponding to the outline shape of the coupling surface 3c of the corresponding portion 1r, the coupling surface 3c opposing the semiconductor substrate 11a. The photodetection region 23d has an outline shape corresponding to the outline shape of the coupling surface 3c of the corresponding portion is, the coupling surface 3c opposing the semiconductor substrate 11a. In the present modification example, the coupling surface 3c of each of the portions 1p, 1q, 1r, and 1s has a rectangular shape when viewed in the second direction D2. The corresponding photodetection regions 23a, 23b, 23c, and 23d have a rectangular outline shape. For example, the coupling surface 3c of the portion 1p has a rectangular shape when viewed in the second direction D2. The photodetection region 23a corresponding to the portion 1p has a rectangular outline shape.

When viewed in the third direction D3, each of the plurality of photodetection regions 23a, 23b, 23c, and 23d has an outline shape corresponding to an outline shape of a coupling surface 3e of a corresponding portion 1p, 1q, 1r, or 1s of the plurality of portions 1p, 1q, 1r, and 1s, the coupling surface 3e opposing the semiconductor substrate 11b. That is, the photodetection region 23a has an outline shape corresponding to the outline shape of the coupling surface 3e of the corresponding portion 1p, the coupling surface 3c opposing the semiconductor substrate 11b. The photodetection region 23b has an outline shape corresponding to the outline shape of the coupling surface 3e of the corresponding portion 1q, the coupling surface 3e opposing the semiconductor substrate 11b. The photodetection region 23c has an outline shape corresponding to the outline shape of the coupling surface 3e of the corresponding portion 1r, the coupling surface 3e opposing the semiconductor substrate 11b. The photodetection region 23d has an outline shape corresponding to the outline shape of the coupling surface 3e of the corresponding portion 1s, the coupling surface 3e opposing the semiconductor substrate 11b. In the present modification example, the coupling surface 3e of each of the portions 1p, 1q, 1r, and 1s has a rectangular shape when viewed in the third direction D3. The corresponding photodetection regions 23a, 23b, 23c, and 23d have a rectangular outline shape. For example, the coupling surface 3e of the portion 1p has a rectangular shape when viewed in the third direction D3. The photodetection region 23a corresponding to the portion 1p has a rectangular outline shape.

As described above, in the present modification example, the case where the configuration of the scintillator 1 including the plurality of portions 1p, 1q, 1r, and 1s has the same rectangular parallelepiped shape as the scintillator 1 of the second embodiment has been described. In the present modification example, at least one of the opposing surfaces 3a and 3b of the pair of opposing surfaces 3a and 3b may be inclined relative to the second direction D2. The scintillator 1 including the plurality of portions 1p, 1q, 1r, and 1s may have the same configuration as the scintillator 1 of the first to third modification examples of the second embodiment. In the case where the scintillator 1 of the present modification example has the same configuration as the scintillator 1 of the first to third modification examples of the second embodiment, the scintillation lights generated in the portions 1p, 1q, 1r, and 1s can take the following paths.

When the scintillator 1 including the plurality of portions 1p, 1q, 1r, and 1s has the same configuration as the scintillator 1 of the first modification example of the second embodiment, for example, the opposing surface 3a of the portion 1p is inclined relative to the second direction D2. The scintillation light incident on the opposing surface 3a of the portion 1p tends to be incident on the coupling surface 3c or 3e of the portion 1p. The scintillation light incident on the coupling surface 3c or 3e of the portion 1p is detected in the photodetection region 23a.

When the scintillator 1 of the present modification example has the same configuration as the scintillator 1 of the second modification example of the second embodiment, the scintillator 1 includes three portions 1p, 1q, and 1r. The portion 1p corresponds to the photodetection region 23a. The portion 1q corresponds to the photodetection region 23b. The portion 1r corresponds to the photodetection region 23c. In this case, the opposing surface 3a of the portion 1p is inclined relative to the second direction D2. The scintillation light incident on the opposing surface 3a tends to be incident on the coupling surface 3c or 3e of the portion 1p. The scintillation light incident on the coupling surface 3c or 3e of the portion 1p is detected in the photodetection region 23a. The opposing surface 3b of the portion 1r is inclined relative to the second direction D2. The scintillation light incident on the opposing surface 3b of the portion 1r tends to be incident on the coupling surface 3c or 3e of the portion 1r. The scintillation light incident on the coupling surface 3c or 3e of the portion 1r is detected in the photodetection region 23c.

When the scintillator 1 of the present modification example has the same configuration as the scintillator 1 of the third modification example of the second embodiment, the scintillator 1 includes the three portions 1p, 1q, and 1r. The portion 1p corresponds to the photodetection region 23a. The portion 1q corresponds to the photodetection region 23b. The portion 1r corresponds to the photodetection region 23c. In this case, the opposing surface 3a of the portion 1p is inclined relative to the second direction D2. The scintillation light incident on the opposing surface 3a of the portion $1p$ tends to be incident on the coupling surface $3c$ or $3e$ of the portion $1p$. The scintillation light incident on the coupling surface $3c$ or $3e$ of the portion $1p$ is detected in the photodetection region $23a$. The opposing surface $3b$ of the portion $1r$ is inclined relative to the second direction D2. The scintillation light incident on the opposing surface $3b$ tends to be incident on the coupling surface $3c$ or $3e$ of the portion $1r$. The scintillation light incident on the coupling surface $3c$ or $3e$ of the portion $1r$ is detected in the photodetection region $23c$.

As described above, the radiation detector RD2 includes the scintillator 1 having the rectangular shape when viewed in the first direction D1 and include the pair of end surfaces $1a$ and $1b$ opposing each other in the first direction D1, the side surface $1c$ coupling the pair of end surfaces $1a$ and $1b$, and the side surface $1e$ coupling the pair of end surfaces $1a$ and $1b$ and being adjacent to the side surface $1c$, the semiconductor photodetector $10a$ including the semiconductor substrate $11a$ disposed to oppose the side surface $1c$, the semiconductor photodetector $10b$ including the semiconductor substrate $11b$ disposed to oppose the side surface $1e$, the wiring member $30a$ electrically connected to the semiconductor photodetector $10a$, and the wiring member $30b$ electrically connected to the semiconductor photodetector $10b$. The scintillator 1 has the rectangular shape when viewed in the first direction.

The length of the scintillator 1 in the first direction D1 is longer than both of the length of the scintillator 1 in the second direction D2 orthogonal to the side surface $1c$ and the length of the scintillator 1 in the third direction D3 orthogonal to the side surface $1e$. A length of the side surface $1c$ in the first direction D1 is longer than the width of the side surface $1c$ in the third direction D3. The length of the side surface $1e$ in the first direction D1 is longer than the width of the side surface $1e$ in the second direction D2. Each of the semiconductor substrate $11a$ and the semiconductor substrate $11b$ includes the portion 21 covered with any one of the corresponding side surface $1c$ and the side surface $1e$, and the portion 22 exposed from any one of the corresponding side surface $1c$ and the side surface $1e$. The portion 21 and the portion 22 are disposed in the first direction D1. Each of the semiconductor photodetector $10a$ and the semiconductor photodetector $10b$ includes the plurality of photodetection regions $23a$, $23b$, $23c$, and $23d$ disposed in the portion 21, the plurality of electrodes $17a$, $17b$, $17c$, and $17d$ disposed in the portion 22, and an electrode 18 disposed in the portion 22. Each of the plurality of photodetection regions $23a$, $23b$, $23c$, and $23d$ includes at least one avalanche photodiode 12 disposed in the first direction D1 and arranged to operate in Geiger mode and at least one quenching resistor 13 electrically connected in series with one of an anode or a cathode of a corresponding avalanche photodiode 12 of the at least one avalanche photodiode 12. The at least one quenching resistor 13 included in the corresponding photodetection region $23a$, $23b$, $23c$, or $23d$ of the plurality of photodetection regions $23a$, $23b$, $23c$, and $23d$ is electrically connected to the plurality of electrodes $17a$, $17b$, $17c$, and $17d$. The other of the anode or the cathode of each of the avalanche photodiodes 12 is electrically connected to the electrode 18. Each of the wiring member $30a$ and the wiring member $30b$ includes the plurality of conductors $31a$, $31b$, $31c$, and $31d$ electrically connected to the corresponding electrodes $17a$, $17b$, $17c$, and $17d$ of the plurality of electrodes $17a$, $17b$, $17c$, and $17d$ and the conductor 32 connected to the electrode 18.

In the present embodiment, the radiation detector RD2 includes the scintillator 1 that is longer in the first direction D1 and includes the semiconductor photodetectors $10a$ and $10b$ disposed on the side surfaces $1c$ and $1e$ of the scintillator 1, respectively. The semiconductor photodetectors $10a$ and $10b$ detect scintillation lights directly incident on the side surfaces $1c$ and $1e$ on which the semiconductor photodetectors $10a$ and $10b$ are disposed, respectively. The semiconductor photodetectors $10a$ and $10b$ detect, for example, scintillation lights that are reflected by the surfaces $1d$ and $1f$ opposing the side surfaces $1c$ and $1e$ and then are incident on the side surfaces $1c$ and $1e$. In the radiation detector RD2, the length of the scintillator 1 in the second direction D2 is shorter than the length of the scintillator in the first direction D1. Therefore, the semiconductor photodetectors $10a$ and $10b$ detect, with a small time difference, scintillation lights directly incident on the side surfaces $1c$ and $1e$, respectively, and scintillation lights incident on the side surfaces $1c$ and $1e$ after being reflected by the surfaces $1d$ and $1f$ opposing the side surfaces $1c$ and $1e$, respectively. As a result, the radiation detector RD2 achieves high time resolution.

When the incidence angle of the scintillation light on the side surface $1c$ exceeds the critical angle on the side surface $1c$, the scintillation light may not be detected by the semiconductor photodetector $10a$ disposed on the side surface $1c$. In the radiation detector RD2, the scintillation light can be detected by the semiconductor photodetector $10b$ disposed on the side surface $1e$ adjacent to the side surface $1c$. Therefore, the radiation detector RD2 achieves the radiation detector having high time resolution and reliably increases the amount of scintillation lights detected by the semiconductor photodetectors $10a$ and $10b$.

The radiation detector RD2 includes the semiconductor photodetectors $10a$ and $10b$ in which the plurality of photodetection regions $23a$, $23b$, $23c$, and $23d$ are disposed in the first direction D1. For example, the distance between a scintillation light generation point and the one end surface $1a$ of the scintillator 1 in the first direction D1 is obtained from the position on the photodetection region $23a$, $23b$, $23c$, or $23d$ where the most scintillation lights are detected, of the plurality of photodetection regions $23a$, $23b$, $23c$, and $23d$. As a result, the magnitude of energy of radiation incident on the scintillator 1 is accurately measured. Therefore, the radiation detector RD2 achieves high energy resolution.

In the radiation detector RD2, the pair of end surfaces $1a$ and $1b$ includes one of the end surfaces $1a$ and $1b$ inclined relative to the second direction D2.

In this configuration, the scintillation lights are more reliably incident on the side surface $1c$ and the side surface $1e$ opposing the semiconductor substrate $11a$ and the semiconductor substrate $11b$, respectively. The number of times of reflection of the scintillation lights on the end surfaces $1a$ and $1b$ or the side surfaces is reduced, and reflection attenuation of the scintillation lights is reduced. Therefore, the radiation detector RD2 more reliably increases the amount of light detected by the semiconductor photodetectors $10a$ and $10b$.

In the radiation detector RD2, the pair of end surfaces $1a$ and $1b$ includes one of the end surfaces $1a$ and $1b$ extending in the second direction D2. One of the end surfaces $1a$ and $1b$ has the triangular wave shape in the cross section.

In this configuration, the scintillation lights are still more reliably incident on the side surface $1c$ and the side surface $1e$ opposing the semiconductor substrates $11a$ $11b$, respectively. The number of times of reflection of the scintillation lights on the end surfaces $1a$ and $1b$ or the side surfaces is reduced, and reflection attenuation of the scintillation lights is reduced. Therefore, the radiation detector RD2 still more reliably increases the amount of light detected by the semiconductor photodetectors 10a and 10b.

In the configuration in which the end surfaces 1a and 1b have the triangular wave shape in the cross section, the amount of light detected by the semiconductor photodetectors 10a and 10b is more reliably increased even if the end surfaces 1a and 1b are not inclined relative to the second direction D2. The configuration in which the end surfaces 1a and 1b extend in the second direction D2 decreases an amount of use of the scintillator 1 when the radiation detector RD1 is produced, as compared with the configuration in which the end surfaces 1a and 1b are inclined relative to the second direction D2.

In the radiation detector RD2, the pair of end surfaces 1a and 1b includes one of the end surfaces 1a and 1b extending in the second direction D2. One of the end surfaces 1a and 1b includes the rough surface.

In this configuration, the scintillation lights are still more reliably incident on the side surface 1c and the side surface 1e opposing the semiconductor substrate 11a and the semiconductor substrate 11b, respectively. The number of times of reflection of the scintillation lights on the end surfaces 1a and 1b or the side surfaces is reduced, and reflection attenuation of the scintillation lights is reduced. Therefore, the radiation detector RD2 still more reliably increases the amount of light detected by the semiconductor photodetectors 10a and 10b.

In the case where the end surfaces 1a and 1b include the rough surfaces, the amount of light detected by the semiconductor photodetectors 10a and 10b is more reliably increased even if the end surfaces 1a and 1b are not inclined relative to the second direction D2. The configuration in which the end surfaces 1a and 1b extend in the second direction D2 decreases the amount of use of the scintillator 1 when the radiation detector RD1 is produced, as compared with the configuration in which the end surfaces 1a and 1b are inclined relative to the second direction D2.

In the radiation detector RD2, when viewed in the second direction D2, one region including the outlines of the plurality of photodetection regions 23a, 23b, 23c, and 23d has the shape corresponding to the outline shape of the side surface 1c. When viewed in the third direction D3, one region including the outlines of the plurality of photodetection regions 23a, 23b, 23c, and 23d has the shape corresponding to the outline shape of the side surface 1e.

In this configuration, the photodetection regions 23a, 23b, 23c, and 23d tend not to be disposed at corresponding positions of the semiconductor substrates 11a and 11b where no scintillation lights can be detected. Therefore, suppress in dark count and capacitance in the photodetection regions 23a, 23b, 23c, and 23d is suppressed. As a result, this configuration reliably improves the time resolution and the energy resolution of the semiconductor photodetectors 10a and 10b.

In the radiation detector RD2, the scintillator 1 includes the plurality of portions 1p, 1q, 1r, and 1s being independent each other and corresponding to the plurality of photodetection regions 23a, 23b, 23c, and 23d, respectively. Each of the plurality of portions 1p, 1q, 1r, and 1s include the pair of opposing surfaces 3a and 3b opposing each other in the first direction D1, the coupling surface 3c that couples the pair of opposing surfaces 3a and 3b and opposes the semiconductor substrate 11a, and the coupling surface 3e that couples the pair of opposing surfaces 3a and 3b, opposes the semiconductor substrate 11b, and is adjacent to the coupling surface 3c.

In this configuration, the scintillation lights generated in the portions 1p, 1q, 1r, and 1s are confined in the portions 1p, 1q, 1r, and 1s, respectively. That is, the scintillation light generated in the portion 1p is confined in the portion 1p. The scintillation light generated in the portion 1q is confined in the portion 1q. The scintillation light generated in the portion 1r is confined in the portion 1r. The scintillation light generated in the portion 1s is confined in the portion 1s. The photodetection regions 23a, 23b, 23c, and 23d corresponding to the portions 1p, 1q, 1r, and 1s reliably detect scintillation lights generated in the corresponding portions 1p, 1q, 1r, and 1s. That is, the photodetection region 23a reliably detects the scintillation light generated in the portion 1p. The photodetection region 23b reliably detects the scintillation light generated in the portion 1q. The photodetection region 23c reliably detects the scintillation light generated in the portion 1r. The photodetection region 23d reliably detects the scintillation light generated in the portion is. Therefore, the radiation detector RD2 reliably achieves high energy resolution.

In the radiation detector RD2, the plurality of portions 1p, 1q, 1r, and is are joined to each other.

This configuration increases the physical strength of the scintillator 1. Therefore, the radiation detector RD2 more reliably achieves high energy resolution.

The radiation detector RD2 includes light reflecting members. The light reflecting members 24 are disposed between the plurality of portions 1p, 1q, 1r, and 1s.

In this configuration, the scintillation light generated in each of the portions 1p, 1q, 1r, and 1s is reliably confined in the corresponding portion 1p, 1q, 1r, or 1s. The photodetection regions 23a, 23b, 23c, and 23d corresponding to the portions 1p, 1q, 1r, and 1s more reliably detect scintillation lights generated in the portions 1p, 1q, 1r, and 1s. Therefore, the radiation detector RD2 still more reliably achieves high energy resolution.

In the radiation detector RD2, the pair of opposing surfaces 3a and 3b includes one of the opposing surfaces 3a and 3b inclined relative to the second direction D2.

In this configuration, the scintillation light is more reliably incident on the coupling surface 3c or 3e. The number of times of reflection of the scintillation lights on the opposing surfaces 3a and 3b or the coupling surfaces is reduced, and the reflection attenuation of the scintillation lights is reduced. Therefore, this configuration more reliably increases the amount of light detected by the semiconductor photodetectors 10a and 10b.

In the radiation detector RD2, the pair of opposing surfaces 3a and 3b includes one of the opposing surfaces 3a and 3b extending in the second direction D2. One of the opposing surfaces 3a and 3b has the triangular wave shape in the cross section.

In this configuration, the scintillation light is still more reliably incident on the coupling surface 3c or 3e. The number of times of reflection of the scintillation lights on the opposing surfaces 3a and 3b or the coupling surfaces is reduced, and the reflection attenuation of the scintillation lights is reduced. Therefore, this configuration still more reliably increases the amount of light detected by the semiconductor photodetectors 10a and 10b.

In the radiation detector RD2, the pair of opposing surfaces 3a and 3b includes one of the opposing surfaces 3a and 3b extending in the second direction D2. One of the opposing surfaces 3a and 3b includes the rough surface.

In this configuration, the scintillation light is still more reliably incident on the coupling surface 3c or 3e. The number of times of reflection of the scintillation lights on the opposing surfaces 3a and 3b or the coupling surfaces is reduced, and the reflection attenuation of the scintillation lights is reduced. Therefore, this configuration still more reliably increases the amount of light detected by the semiconductor photodetectors 10a and 10b.

In the radiation detector RD2, when viewed in the second direction D2, each of the plurality of photodetection regions 23a, 23b, 23c, and 23d has the outline shape of the first coupling surface 3c, of a corresponding portion 1p, 1q, 1r, or 1s of the plurality of portions 1p, 1q, 1r, or 1s, opposing the first semiconductor substrate 11a. When viewed in the third direction D3, each of the plurality of photodetection regions 23a, 23b, 23c, and 23d has the outline shape of the first coupling surface 3e, of a corresponding portion 1p, 1q, 1r, or 1s of the plurality of portions 1p, 1q, 1r, or 1s, opposing the first semiconductor substrate 11b.

In this configuration, the photodetection regions 23a, 23b, 23c, and 23d tend not to be disposed at corresponding positions of the semiconductor substrates 11a and 11b where no scintillation lights can be detected. Therefore, increase in dark count and capacitance in the photodetection regions 23a, 23b, 23c, and 23d is suppressed. As a result, this configuration reliably improves the time resolution and the energy resolution of the semiconductor photodetectors 10a and 10b.

In the radiation detector RD2, the plurality of photodetection regions 23a, 23b, 23c, and 23d include the photodetection region 23a and the photodetection region 23d closer to the portion 22 than the photodetection region 23a. The width of the conductive wire 14a electrically connecting the electrode 17a corresponding to the photodetection region 23a and the photodetection region 23a is larger than the width of the conductive wire 14d electrically connecting the electrode 17d corresponding to the photodetection region 23d and the photodetection region 23d.

In this configuration, the electrical resistance difference between the conductive wire 14a electrically connecting the electrode 17a corresponding to the photodetection region 23a and the photodetection region 23a and the conductive wire 14d electrically connecting the electrode 17d corresponding to the photodetection region 23d and the photodetection region 23d is reduced. The length of the conductive wire 14a electrically connecting the electrode 17a corresponding to the photodetection region 23a and the photodetection region 23a is longer than the length of the conductive wire 14d electrically connecting the electrode 17d corresponding to the photodetection region 23d and the photodetection region 23d. As the lengths of the conductive wires 14a and 14d increase, the electrical resistance of the conductive wires 14a and 14d increases. As the widths of the conductive wires 14a and 14d increase, the electrical resistance of the conductive wires 14a and 14d decreases. Therefore, in the configuration in which the width of the long conductive wire 14a is larger than the width of the short conductive wire 14d, the electrical resistance difference between the electrical resistance of the long conductive wire 14a and the electrical resistance of the short conductive wire 14d is reduced. Therefore, this configuration reliably improves the time resolution and the energy resolution of the radiation detector RD2.

The radiation detector RD2 includes the base 40a, the base 40b, the wire 43, and the wire 44. The base 40a is disposed such that the semiconductor substrate 11a is positioned between the base 40a and the scintillator 1. The base 40b is disposed such that the semiconductor substrate 11b is positioned between the base 40b and the scintillator 1. The first base 40a includes the portion 51 covered with the semiconductor substrate 11a and the portion 52 exposed from the semiconductor substrate 11a. The base 40b includes the portion 51 covered with the semiconductor substrate 11b and the portion 52 exposed from the semiconductor substrate 11b. The portion 51 and the portion 52 are disposed in the first direction D1. The portion 52 includes the terminals 41a, 41b, 41c, and 41d and the terminal 42. The first terminal 41 and the scintillator 1 are disposed in front of the same surface of the first base 40a. The second terminal 42 and the scintillator 1 are disposed in front of the same surface of the second base 40b. The terminals 41a, 41b, 41c, and 41d are electrically connected to the electrodes 17a, 17b, 17c, and 17d by the wire 43, and the terminal 42 is electrically connected to the electrode 18 by the wire 44.

A configuration in which the bases 40a and 40b are provided increases the mechanical strength of the radiation detector RD2. Therefore, this configuration reliably achieves the radiation detector RD2 having high mechanical strength.

The radiation detector RD2 includes the resin 45 covering the wire 43 and the wire 44.

In this configuration, the resin 45 protects the wires 43 and 44. Therefore, the wires 43 and 44 tend not to be damaged. As a result, the radiation detector RD2 decreases deterioration of electrical connection between the terminals 41 and 42 and the electrodes 17 and 18.

The radiation detector RD2 includes, for example, the light reflector 47a and the light reflector 47b. The light reflector 47a is disposed such that the semiconductor substrate 11a is positioned between the light reflector 47a and the scintillator 1. The light reflector 47b is disposed such that the semiconductor substrate 11b is positioned between the light reflector 47b and the scintillator 1.

For example, in a configuration in which the plurality of radiation detectors RD2 are provided, the following effects can be achieved in the case where one radiation detector RD2 includes the light reflector 47a. That is, the configuration in which the light reflector 47a of the one radiation detector RD2 and the side surface 1d of another radiation detector RD2 oppose each other in the second direction D2 improves reflectance of the scintillation lights on the side surface 1d of the other radiation detector RD2 even when the light reflector 47a is not disposed on the side surface 1d of the other radiation detector RD2.

For example, in the configuration in which the plurality of radiation detectors RD2 are provided, the following effects can be achieved in the case where one radiation detector RD2 includes the light reflector 47b. That is, the configuration in which the light reflector 47b of the one radiation detector RD2 and the side surface 1f of the other radiation detector RD2 oppose each other in the third direction D3 improves reflectance of the scintillation lights on the side surface 1f of the other radiation detector RD2 even when the light reflector 47b is not disposed on the side surface 1f of the other radiation detector RD2.

Therefore, this configuration tends to achieve high time resolution in the case where the plurality of radiation detectors RD2 are provided.

In the configuration in which the radiation detector RD2 includes the base 40a, the light reflector 47a is disposed such that the semiconductor substrate 11a and the base 40a are positioned between the light reflector 47a and the scintillator 1. In the configuration in which the radiation detector RD2 includes the base 40b, the light reflector 47b is disposed such that the semiconductor substrate 11b and the base 40b are positioned between the light reflector 47b and the scintillator 1.

In the radiation detector RD2, the wiring member 30*a* is disposed on the same side as the scintillator 1 relative to the semiconductor substrate 11*a*. The wiring member 30*b* is disposed on the same side as the scintillator 1 relative to the semiconductor substrate 11*b*.

In this configuration, the radiation detector RD2 does not have to include the substrate for connecting the wiring members 30*a* and 30*b* to the electrodes 17 and 18 through, for example, die bonding. Therefore, the configuration in which the wiring members 30*a* and 30*b* are disposed on the same side as the scintillator 1 relative to the semiconductor substrates 11*a* and 11*b*, respectively, more reliably simplifies the configuration of the radiation detector RD2. This configuration improves the space efficiency of the radiation detector RD2 as compared with a configuration in which the wiring members 30*a* and 30*b* are disposed on the opposite side of the scintillator 1 relative to the semiconductor substrates 11*a* and 11*b*.

In the radiation detector RD2, at least the part of the wiring member 30*a* and the scintillator 1 are disposed in front of the same surface of the semiconductor substrate 11*a*. That is, at least the part of the wiring member 30*b* and the scintillator 1 are disposed in front of the same surface of the semiconductor substrate 11*b*, for example.

In this configuration, for example, the space efficiency of the radiation detector RD2 is improved as compared with a configuration in which at least the part of each of the wiring members 30*a* and 30*b* and the scintillator 1 are disposed in front of the other surface of each of the semiconductor substrates 11*a* and 11*b*.

In the radiation detector RD2, at least the part of the wiring member 30*a* and the scintillator 1 are disposed in front of the same surface of the base 40*a*. At least the part of the wiring member 30*b* and the scintillator 1 are disposed in front of the same surface of the base 40*b*, for example.

In this configuration, for example, the wiring members 30*a* and 30*b* are easily connected to the electrodes 17 and 18 through die bonding.

In the radiation detector RD2, the thickness of each of the light reflector 47*a* and the light reflector 47*b* is 0.05 to 100 μm.

In this configuration, the configuration in which the light reflectors 47*a* and 47*b* have the above-described thickness reliably improves reflectance of the scintillation lights on the side surfaces 1*d* and 1*f*. Therefore, this configuration reliably simplifies the configuration of the radiation detector RD2.

In the radiation detector RD2, the wiring members 30*a* and 30*b*, the semiconductor substrate 11*a*, and the semiconductor substrate 11*b* have flexibility. The flexibility of the wiring member 30*a* is higher than the flexibility of the semiconductor substrate 11*a*. The flexibility of the wiring member 30*b* is higher than the flexibility of the semiconductor substrate 11*b*.

In this configuration, the vibration of the wiring members 30*a* and 30*b* tends not to be transmitted to the semiconductor substrates 11*a* and 11*b*. Forces from the wiring members 30*a* and 30*b* tend not to be applied to the semiconductor substrates 11*a* and 11*b*, and the semiconductor substrates 11*a* and 11*b* tend not to be physically damaged. Therefore, the configuration in which the flexibility of the wiring members 30*a* and 30*b* is higher than the flexibility of the semiconductor substrates 11*a* and 11*b* reliably improves the mechanical strength of the radiation detector RD2.

Third Embodiment

Figure 30:
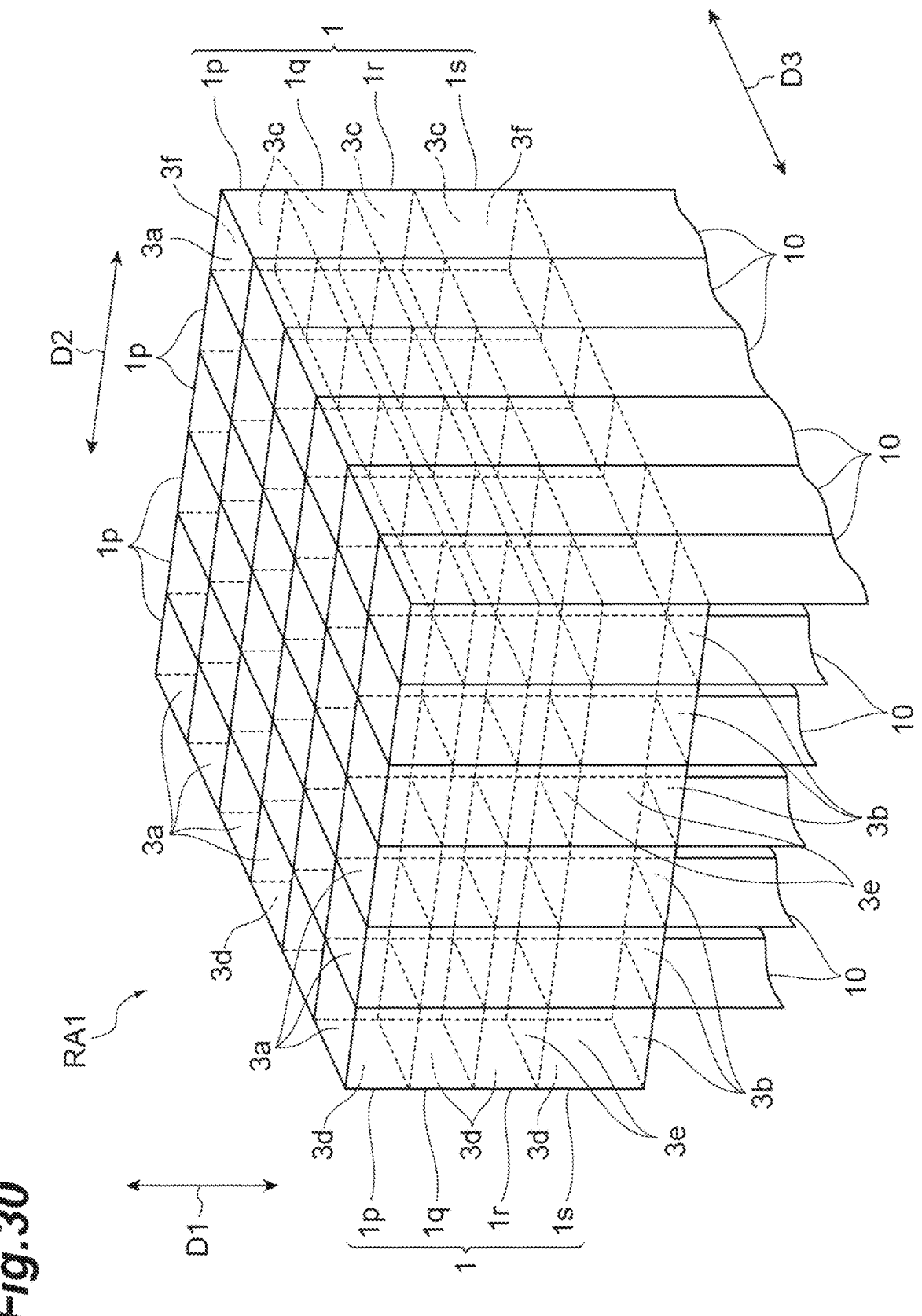
FIG. 30 is a perspective view illustrating a radiation detector array according to a third embodiment.

A configuration of a radiation detector array RA1 according to a third embodiment will be described with reference to FIG. 30. FIG. 30 is a perspective view illustrating the radiation detector array RA1 according to the third embodiment. In the radiation detector array RA1, a plurality of radiation detectors RD1 according to the first embodiment are two-dimensionally disposed in a matrix.

The plurality of radiation detectors RD1 are individually disposed, for example, in the second direction D2 and are further disposed in the third direction D3. In the example illustrated in FIG. 30, six radiation detectors RD1 according to the eighth modification example of the first embodiment are disposed in the second direction D2, and six radiation detectors RD1 are also disposed in the third direction D3. The radiation detector array RA1 includes, for example, a total of 36 radiation detectors RD1.

The opposing surface 3*a* of the portion 1*p* included in one radiation detector RD1 is, for example, flush with the opposing surface 3*a* of the portion 1*p* included in another radiation detector RD1 adjacent thereto in the second direction D2 or the third direction D3. The semiconductor photodetector 10 of the one radiation detector RD1 is disposed with the semiconductor photodetector 10 of the other radiation detector RD1 adjacent thereto in the third direction D3. The semiconductor photodetectors 10 adjacent to each other in the third direction D3 are, for example, integrally formed with each other. The semiconductor photodetectors 10 adjacent to each other in the third direction D3 may not be integrally formed with each other.

The radiation detector array RA1 may be configured to include the radiation detectors RD1 according to any one of the first embodiment and the first to seventh modification examples of the first embodiment, in addition to the radiation detectors RD1 according to the eighth modification example of the first embodiment. Also in this case, the semiconductor photodetector 10 of the one radiation detector RD1 is disposed with the semiconductor photodetector 10 of the other radiation detector RD1 adjacent thereto in the third direction D3. The semiconductor photodetectors 10 adjacent to each other in the third direction D3 are, for example, integrally formed with each other. The semiconductor photodetectors 10 adjacent to each other in the third direction D3 may not be integrally formed with each other.

As described above, the radiation detector array RA1 includes the plurality of radiation detectors RD1 two-dimensionally disposed a matrix when viewed in the first direction D1. Each of the plurality of radiation detectors RD1 is the radiation detector RD1. The semiconductor photodetector 10 of the one radiation detector RD1 is disposed with the semiconductor photodetector 10 of the other radiation detector RD1 adjacent thereto in the direction parallel to the side surface 1*c*. In the present embodiment, the direction parallel to the side surface 1*c* is the third direction D3.

In the present embodiment, the radiation detector array RA1 in which the radiation detectors RD1 having high time resolution and high energy resolution are two-dimensionally disposed in the matrix is achieved.

The radiation detector array RA1 has, for example, a configuration in which the light reflector 47 of one radiation detector RD1 and the side surface 1*d* of another radiation detector RD1 oppose each other in the second direction D2. This configuration improves reflectance of the scintillation lights from the side surface 1*d* of the other radiation detector RD1, even when the light reflector 47 is not disposed on the side surface 1*d* of the other radiation detector RD1. The configuration in which the light reflector 47 is not disposed on the side surface 1*d* of the other radiation detector RD1 decreases the gap between the radiation detectors RD1 in the second direction D2 in the radiation detector array RA1.

In the radiation detector array RA1, the semiconductor photodetectors 10 adjacent to each other in the direction parallel to the side surface 1c, that is, in the third direction D3, are integrally formed with each other.

In this configuration, when the radiation detector array RA1 in which the plurality of radiation detectors RD1 are two-dimensionally disposed in the matrix is produced, forming the semiconductor photodetectors 10 is simplified.

Fourth Embodiment

Figure 31:
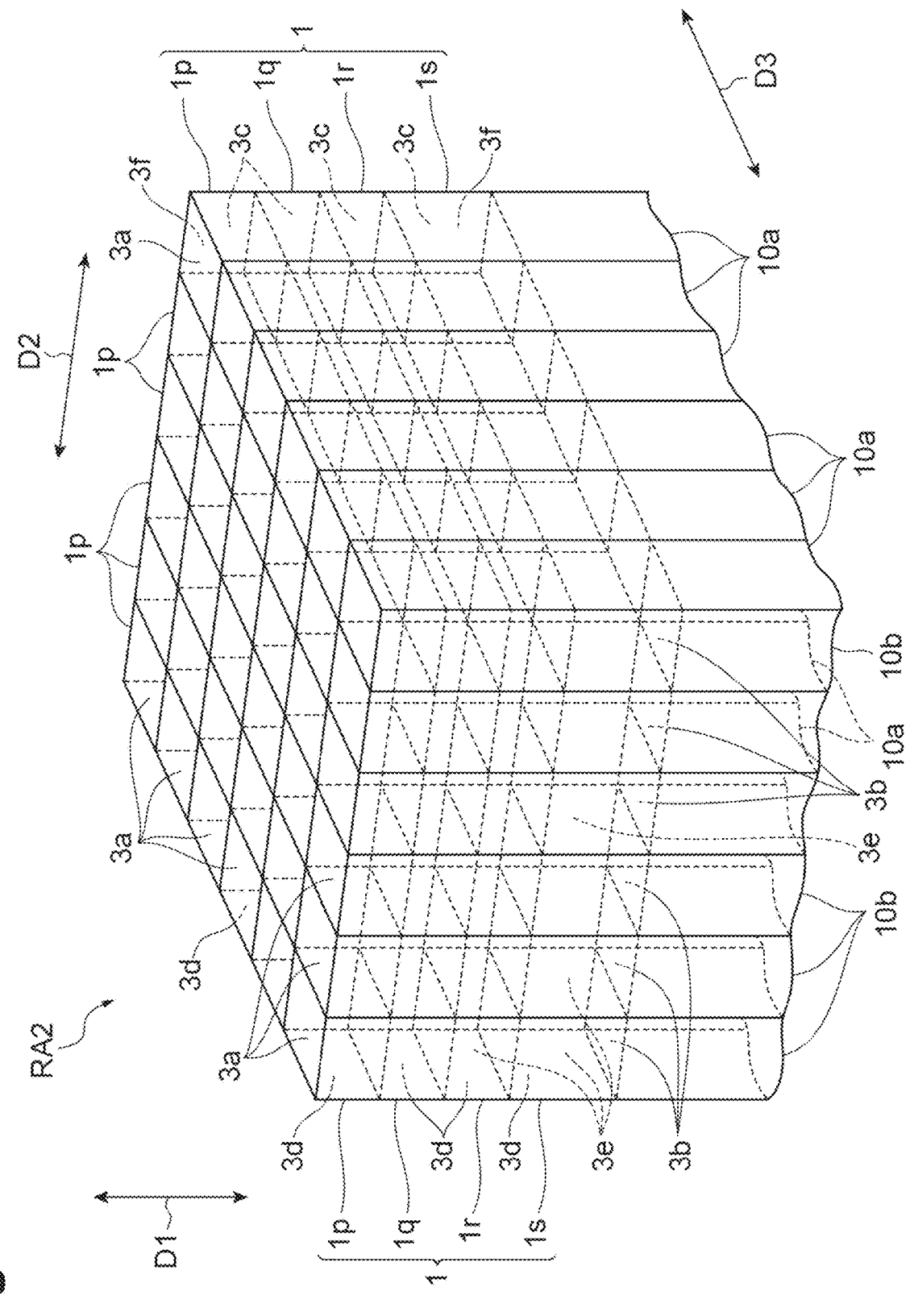
FIG. 31 is a perspective view illustrating a radiation detector array according to a fourth embodiment.

A configuration of a radiation detector array RA2 according to a fourth embodiment will be described with reference to FIG. 31. FIG. 31 is a perspective view illustrating the radiation detector array RA2 according to the fourth embodiment. In the radiation detector array RA2, the plurality of radiation detectors RD2 according to the second embodiment are two-dimensionally disposed in a matrix.

The plurality of radiation detectors RD2 are individually disposed, for example, in the second direction D2 and are further disposed in the third direction D3. In the example illustrated in FIG. 31, six radiation detectors RD2 according to the fourth modification example of the second embodiment are disposed in the second direction D2, and six radiation detectors RD2 are also disposed in the third direction D3. The radiation detector array RA2 includes, for example, a total of 36 radiation detectors RD2.

The opposing surface 3a of the portion 1p included in one radiation detector RD2 is, for example, flush with the opposing surface 3a of the portion 1p included in another radiation detector RD2 adjacent thereto in the second direction D2 or the third direction D3. The semiconductor photodetector 10a of the one radiation detector RD2 is disposed with the semiconductor photodetector 10a of the other radiation detector RD2 adjacent thereto in the third direction D3. The semiconductor photodetector 10b of the one radiation detector RD2 is disposed with the semiconductor photodetector 10b of the other radiation detector RD2 adjacent thereto in the second direction D2. The semiconductor photodetectors 10a adjacent to each other in the third direction D3 are, for example, integrally formed with each other. The semiconductor photodetectors 10b adjacent to each other in the second direction D2 are, for example, integrally formed with each other. The semiconductor photodetectors 10a adjacent to each other in the third direction D3 may not be integrally formed with each other. The semiconductor photodetectors 10b adjacent to each other in the second direction D2 may not be integrally formed with each other.

The radiation detector array RA2 may be configured to include the radiation detectors RD2 according to any one of the second embodiment and the first to third modification examples of the second embodiment, in addition to the radiation detectors RD2 according to the fourth modification example of the second embodiment. Also in this case, the semiconductor photodetector 10a of one radiation detector RD2 is disposed with the semiconductor photodetector 10a of another radiation detector RD2 adjacent thereto in the third direction D3. The semiconductor photodetector 10b of the one radiation detector RD2 is disposed with the semiconductor photodetector 10b of the other radiation detector RD2 adjacent thereto in the second direction D2. The semiconductor photodetectors 10a adjacent to each other in the third direction D3 are, for example, integrally formed with each other. The semiconductor photodetectors 10b adjacent to each other in the second direction D2 are, for example, integrally formed with each other. The semiconductor photodetectors 10a adjacent to each other in the third direction D3 may not be integrally formed with each other. The semiconductor photodetectors 10b adjacent to each other in the second direction D2 may not be integrally formed with each other.

As described above, the radiation detector array RA2 includes the plurality of radiation detectors RD2 two-dimensionally disposed in the matrix when viewed in first direction D1. Each of the plurality of radiation detectors RD2 is the radiation detector RD2. The semiconductor photodetector 10a of one radiation detector RD2 is disposed with the semiconductor photodetector 10a of another radiation detector RD2 adjacent thereto in the third direction D3. The semiconductor photodetector 10b of one radiation detector RD2 is disposed with the semiconductor photodetector 10b of another radiation detector RD2 adjacent thereto in the second direction D2.

In the present embodiment, the radiation detector array RA2 in which the radiation detectors RD2 having the high time resolution are two-dimensionally disposed in the matrix is achieved.

The radiation detector array RA2 has, for example, a configuration in which the light reflector 47a of one radiation detector RD2 and the coupling surface 3d of another radiation detector RD2 oppose each other in the second direction D2. This configuration improves the reflectance of the scintillation lights from the coupling surface 3d of the other radiation detector RD2, even when the light reflector 47a is not disposed on the coupling surface 3d of the other radiation detector RD2. The configuration in which the light reflector 47a is not disposed on the coupling surface 3d of the other radiation detector RD2 decreases the gap between the radiation detectors RD2 in the second direction D2 in the radiation detector array RA2.

The radiation detector array RA2 has, for example, a configuration in which the light reflector 47b of one radiation detector RD2 and the coupling surface 3f of another radiation detector RD2 oppose each other in the third direction D3. This configuration improves the reflectance of the scintillation lights from the coupling surface 3f of the other radiation detector RD2, even when the light reflector 47b is not disposed on the coupling surface 3f of the other radiation detector RD2. The configuration in which the light reflector 47b is not disposed on the coupling surface 3f of the other radiation detector RD2 decreases the gap between the radiation detectors RD2 in the third direction D3 in the radiation detector array RA2.

In the radiation detector array RA2, the semiconductor photodetectors 10a adjacent to each other in the third direction D3 are integrally formed with each other.

In this configuration, when the radiation detector array RA2 in which the plurality of radiation detectors RD2 are two-dimensionally disposed in the matrix is produced, forming the semiconductor photodetectors 10a is simplified.

In the radiation detector array RA2, the semiconductor photodetectors 10b adjacent to each other in the second direction D2 are integrally formed with each other.

In this configuration, when the radiation detector array RA2 in which the plurality of radiation detectors RD2 are two-dimensionally disposed in the matrix is produced, forming the semiconductor photodetectors 10b is simplified.

The embodiments and modification examples of the present invention have been described; however, the present invention is not absolutely limited to the above-described embodiments and modification examples and can be variously modified without departing from the gist of the present invention.

In the radiation detectors RD1 and RD2, when viewed in the second direction D2, the photodetection regions 23a, 23b, 23c, and 23d may have the outline shape corresponding to the outline shape of the side surface 1c or 1e. In the configuration in which the photodetection regions 23a, 23b, 23c, and 23d have the shape corresponding to the outline shape of the side surface 1c or 1e, as described above, the plurality of photodetection regions 23a, 23b, 23c, and 23d tend not to be disposed at positions of the semiconductor substrate 11 where no scintillation lights can be detected. Therefore, in this configuration, increase in dark count and capacitance in the photodetection regions 23a, 23b, 23c, and 23d is suppressed. As a result, this configuration reliably improves the time resolution and the energy resolution of the radiation detectors RD1 and RD2.

The radiation detectors RD1 and RD2 may not include the light reflecting member 24. In the configuration in which the radiation detectors RD1 and RD2 include the light reflecting member 24, as described above, the scintillation light generated in each of the portions 1p, 1q, 1r, and 1s is reliably confined in the corresponding portion 1p, 1q, 1r, or 1s. The photodetection regions 23a, 23b, 23c, and 23d corresponding to the portions 1p, 1q, 1r, and 1s more reliably detect scintillation lights generated in the portions 1p, 1q, 1r, and 1s. Therefore, the radiation detectors RD1 and RD2 still more reliably achieve high time resolution.

The width of the conductive wire 14a electrically connecting the electrode 17a corresponding to the photodetection region 23a and the photodetection region 23a may be larger than the width of the conductive wire 14d electrically connecting the electrode 17d corresponding to the photodetection region 23d and the photodetection region 23d. In the configuration in which the width of the conductive wire 14a electrically connecting the electrode 17a corresponding to the photodetection region 23a and the photodetection region 23a is larger than the width of the conductive wire 14d electrically connecting the electrode 17d corresponding to the photodetection region 23d and the photodetection region 23d, as described above, the electrical resistance difference between the conductive wire 14a electrically connecting the electrode 17a corresponding to the photodetection region 23a and the photodetection region 23a and the conductive wire 14d electrically connecting the electrode 17d corresponding to the photodetection region 23d and the photodetection region 23d is reduced.

The radiation detectors RD1 and RD2 may not include the base 40, 40a, or 40b. The configuration in which the radiation detectors RD1 and RD2 include the base 40, 40a, or 40b increases the mechanical strength of the semiconductor substrate 11, 11a, or 11b as described above. Therefore, the radiation detectors RD1 and RD2 reliably achieve the semiconductor photodetector 10, 10a, or 10b having the high mechanical strength.

The radiation detectors RD1 and RD2 may not include the resin 45. The configuration in which the radiation detectors RD1 and RD2 include the resin 45 protects the wires 43 and 44 from damage as described above. Therefore, the radiation detectors RD1 and RD2 reliably achieve the semiconductor photodetector 10, 10a, or 10b having higher mechanical strength.

The radiation detectors RD1 and RD2 may not include the light reflector 47, 47a, or 47b.

In the configuration in which the radiation detectors RD1 include the light reflectors 47, respectively, as described above, the radiation detector array RA1 has, for example, the configuration in which the light reflector 47 of one radiation detector RD1 and the side surface 1d of another radiation detector RD1 oppose each other in the second direction D2. This configuration improves reflectance of the scintillation lights from the side surface 1d of the other radiation detector RD1, even when the light reflector 47 is not disposed on the side surface 1d of the other radiation detector RD1. The configuration in which the light reflector 47 is not disposed on the side surface 1d of the other radiation detector RD1 decreases the gap between the radiation detectors RD1 in the second direction D2 in the radiation detector array RA1.

In the configuration in which the radiation detectors RD2 include the light reflectors 47a, respectively, as described above, the radiation detector array RA2 has, for example, the configuration in which the light reflector 47a of one radiation detector RD2 and the side surface 1d of another radiation detector RD2 oppose each other in the second direction D2. This configuration improves reflectance of the scintillation lights from the side surface 1d of the other radiation detector RD2, even in the case where the light reflector 47a is not disposed on the side surface 1d of the other radiation detector RD2. The configuration in which the light reflector 47a is not disposed on the side surface 1d of the other radiation detector RD2 decreases the gap between the radiation detectors RD2 in the second direction D2 in the radiation detector array RA2.

In the configuration in which the radiation detectors RD2 include the light reflectors 47b, respectively, as described above, the radiation detector array RA2 has, for example, the configuration in which the light reflector 47b of one radiation detector RD2 and the side surface 1f of another radiation detector RD2 oppose each other in the third direction D3. This configuration improves reflectance of the scintillation lights from the side surface 1f of the other radiation detector RD2, even in the case where the light reflector 47b is not disposed on the side surface 1f of the other radiation detector RD2. The configuration in which the light reflector 47b is not disposed on the side surface 1f of the other radiation detector RD2 decreases the gap between the radiation detectors RD2 in the third direction D3 in the radiation detector array RA2.

The wiring member 30, 30a, or 30b may not be disposed on the same side as the scintillator 1 relative to the semiconductor substrate 11, 11a, or 11b. In the configuration in which the wiring member 30, 30a, or 30b is disposed on the same side as the scintillator 1 relative to the semiconductor substrate 11, 11a, or 11b, as described above, the substrate for connecting the wiring member 30, 30a, or 30b to the electrodes 17 and 18 through, for example, die bonding does not need to be provided. Therefore, this configuration more reliably simplifies the configurations of the radiation detectors RD1 and RD2.

The flexibility of the wiring members 30, 30a, and 30b may not be higher than the flexibility of the semiconductor substrates 11, 11a, and 11b. In the configuration in which the flexibility of the wiring members 30, 30a, and 30b is higher than the flexibility of the semiconductor substrates 11, 11a, and 11b, as described above, the vibration of the wiring members 30, 30a, and 30b tends not to be transmitted to the semiconductor substrates 11, 11a, and 11b. Therefore, this configuration reliably improves the mechanical strength of the radiation detectors RD1 and RD2.

REFERENCE SIGNS LIST 1 scintillator
1a, 1b end surface
1c side surface
1p, 1q, 1r, 1s portion 3*a*, 3*b* opposing surface
3*c*, 3*d*, 3*e* coupling surface
10, 10*a*, 10*b* semiconductor photodetector
11, 11*a*, 11*b* semiconductor substrate
12 avalanche photodiode
13 quenching resistor
14*a*, 14*b* conductive wire
17*a*, 17*b*, 17*c*, 17*d* electrode
18 electrode
21 portion
22 portion
23*a*, 23*b*, 23*c*, 23*d* photodetection region
24 light reflecting member
30*a*, 30*b* wiring member
41*a*, 41*b*, 41*c*, 41*d* terminal
42 terminal
43, 44 wire
45 resin
47, 47*a*, 47*b* light reflector
51 portion
52 portion
D1 first direction
D2 second direction
D3 third direction
RA1 radiation detector array
RA2 radiation detector array
RD1 radiation detector
RD2 radiation detector.

The invention claimed is:

1. A radiation detector comprising:
a scintillator including a pair of end surfaces opposing each other in a first direction and one side surface coupling the pair of end surfaces;
a semiconductor photodetector including a semiconductor substrate disposed to oppose the one side surface;
a wiring member electrically connected to the semiconductor photodetector; and
a base; and a first wire and a second wire, wherein
a length of the scintillator in the first direction is longer than a length of the scintillator in a second direction orthogonal to the one side surface,
a length of the one side surface in the first direction is longer than a width of the one side surface in a third direction orthogonal to the first direction and the second direction,
the semiconductor substrate includes
a first portion that is covered with the one side surface and in which a plurality of photodetection regions are disposed, and
a second portion that is exposed from the one side surface and the first portion,
the first portion and the second portion are disposed in the first direction,
the semiconductor photodetector includes the plurality of photodetection regions disposed in the first portion, a plurality of first electrodes disposed in the second portion, and a second electrode disposed in the second portion,
each of the plurality of photodetection regions includes at least one avalanche photodiode disposed in the first direction and arranged to operate in Geiger mode and at least one quenching resistor electrically connected in series with one of an anode or a cathode of a corresponding avalanche photodiode of the at least one avalanche photodiode,
the at least one quenching resistor included in a corresponding photodetection region of the plurality of photodetection regions is electrically connected to the plurality of first electrodes,
another of the anode or the cathode of each of the avalanche photodiodes is electrically connected to the second electrode,
the wiring member includes a plurality of conductors electrically connected to a corresponding first electrode of the plurality of first electrodes and a conductor connected to the second electrode,
the base is disposed such that the semiconductor substrate is positioned between the base and the scintillator and includes a third portion covered with the semiconductor substrate and a fourth portion exposed from the semiconductor substrate,
the third portion and the fourth portion are disposed in the first direction,
the fourth portion includes a first terminal and a second terminal,
the first terminal and the second terminal and the scintillator are disposed in front of the same surface of the base, and
the first terminal is electrically connected to the first electrode by the first wire, and the second terminal is electrically connected to the second electrode by the second wire.

2. The radiation detector according to claim 1, further comprising
a resin covering the first wire and the second wire.

3. The radiation detector according to claim 1, further comprising
a light reflector, wherein
the light reflector is disposed such that the semiconductor substrate and the base are positioned between the light reflector and the scintillator.

4. The radiation detector according to claim 1, wherein
the wiring member is disposed on the same side as the scintillator relative to the semiconductor substrate.

5. The radiation detector according to claim 1, wherein
at least a part of the wiring member and the scintillator are disposed in front of the same surface of the base.

6. The radiation detector according to claim 3, wherein
the light reflector has a thickness of 0.05 to 100 μm.

7. The radiation detector according to claim 1, wherein
the wiring member and the semiconductor substrate have flexibility, and
the flexibility of the wiring member is higher than the flexibility of the semiconductor substrate.

8. A radiation detector array comprising
a plurality of radiation detectors two-dimensionally disposed in a matrix when viewed in a first direction, wherein
each of the plurality of radiation detectors is the radiation detector according to claim 1, and
the semiconductor photodetector of one of the radiation detectors is disposed with the semiconductor photodetector of another one of the radiation detectors adjacent to the one of the radiation detectors in a direction parallel to the one side surface.

9. The radiation detector array according to claim 8, wherein
the semiconductor photodetectors adjacent to each other in the direction parallel to the one side surface are integrally formed with each other.

10. A radiation detector comprising:
a scintillator having a rectangular shape when viewed in a first direction and including a pair of end surfaces opposing each other in the first direction, a first side surface coupling the pair of end surfaces, and a second side surface coupling the pair of end surfaces and being adjacent to the first side surface;

a first semiconductor photodetector including a first semiconductor substrate disposed to oppose the first side surface;

a second semiconductor photodetector including a second semiconductor substrate disposed to oppose the second side surface;

a first wiring member electrically connected to the first semiconductor photodetector;

a second wiring member electrically connected to the second semiconductor photodetector; and a first base and a second base; and a first wire and a second wire, wherein a length of the scintillator in the first direction is longer than both of a length of the scintillator in a second direction orthogonal to the first side surface and a length of the scintillator in a third direction orthogonal to the second side surface, a length of the first side surface in the first direction is longer than a width of the first side surface in the third direction, a length of the second side surface in the first direction is longer than a width of the second side surface in the second direction, each of the first semiconductor substrate and the second semiconductor substrate includes a first portion covered with any one of corresponding first side surface and second side surface, and a second portion exposed from the any one of the corresponding first side surface and second side surface, the first portion and the second portion are disposed in the first direction, each of the first semiconductor photodetector and the second semiconductor photodetector includes a plurality of photodetection regions disposed in the first portion, a plurality of first electrodes disposed in the second portion, and a second electrode disposed in the second portion, each of the plurality of photodetection regions includes at least one avalanche photodiode disposed in the first direction and arranged to operate in Geiger mode and at least one quenching resistor electrically connected in series with one of an anode or a cathode of a corresponding avalanche photodiode of the at least one avalanche photodiode, the at least one quenching resistor included in the corresponding photodetection region of the plurality of photodetection regions is electrically connected to the plurality of first electrodes, another of the anode or the cathode of each of the avalanche photodiodes is electrically connected to the second electrode, the first wiring member and the second wiring member include a plurality of conductors electrically connected to a corresponding first electrode of the plurality of first electrodes and a conductor connected to the second electrode, the first base is disposed such that the first semiconductor substrate is positioned between the first base and the scintillator, the second base is disposed such that the second semiconductor substrate is positioned between the second base and the scintillator, the first base includes a third portion covered with the first semiconductor substrate and a fourth portion exposed from the first semiconductor substrate, and the second base includes a third portion covered with the second semiconductor substrate and a fourth portion exposed from the second semiconductor substrate, the third portion and the fourth portion are disposed in the first direction, each of the fourth portions includes a first terminal and a second terminal, the first terminal and the scintillator are disposed in front of the same surface of the first base, and the second terminal and the scintillator are disposed in front of the same surface of the second base, and the first terminal is electrically connected to the first electrode by the first wire, and the second terminal is electrically connected to the second electrode by the second wire.

11. The radiation detector according to claim 10, further comprising a resin covering the first wire and the second wire.

12. The radiation detector according to claim 10, further comprising:

a first light reflector; and a second light reflector, wherein the first light reflector is disposed such that the first semiconductor substrate and the first base are positioned between the first light reflector and the scintillator, and the second light reflector is disposed such that the second semiconductor substrate and the second base are positioned between the second light reflector and the scintillator.

13. The radiation detector according to claim 10, wherein the first wiring member is disposed on the same side as the scintillator relative to the first semiconductor substrate, and the second wiring member is disposed on the same side as the scintillator relative to the second semiconductor substrate.

14. The radiation detector according to claim 10, wherein at least a part of the first wiring member and the scintillator are disposed in front of the same surface of the first base, and at least a part of the second wiring member and the scintillator are disposed in front of the same surface of the second base.

15. The radiation detector according to claim 12, wherein the first light reflector and the second light reflector have a thickness of 0.05 to 100 μm.

16. The radiation detector according to claim 10, wherein the first wiring member and the second wiring member and the first semiconductor substrate and the second semiconductor substrate have flexibility, the flexibility of the first wiring member is higher than the flexibility of the first semiconductor substrate, and the flexibility of the second wiring member is higher than the flexibility of the second semiconductor substrate.

17. A radiation detector array comprising a plurality of radiation detectors two-dimensionally disposed in a matrix when viewed in a first direction, wherein each of the plurality of radiation detectors is the radiation detector according to claim 10, the first semiconductor photodetector of one of the radiation detectors is disposed with the first semiconductor photodetector of another one of the radiation detectors adjacent in the third direction, and the second semiconductor photodetector of the one radiation detector is disposed with the second semiconductor photodetector of the other one of the radiation detectors adjacent in the second direction.

18. The radiation detector array according to claim 17, wherein the first semiconductor photodetectors adjacent to each other in the third direction are integrally formed with each other.

19. The radiation detector array according to claim 17, wherein the second semiconductor photodetectors adjacent to each other in the second direction are integrally formed with each other.

\* \* \* \* \*